US008846817B2

(12) United States Patent
Yontz et al.

(10) Patent No.: US 8,846,817 B2
(45) Date of Patent: Sep. 30, 2014

(54) IONIC POLYMERS, METHOD OF MANUFACTURE, AND USES THEREOF

(75) Inventors: Dorie J. Yontz, Bloomington, MN (US); Brian D. Mullen, Delano, MN (US); Cora M. Leibig, Maple Grove, MN (US); Marc D. Rodwogin, Minneapolis, MN (US); Vivek Badarinarayana, St. Louis Park, MN (US); Feng Jing, Snellville, GA (US); Friederike T. Stollmaier, Rheinmuenster (DE)

(73) Assignee: Segetis, Inc., Golden Valley, MN (US)

(*) Notice: Subject to any disclaimer, the term of this patent is extended or adjusted under 35 U.S.C. 154(b) by 195 days.

(21) Appl. No.: 13/294,926

(22) Filed: Nov. 11, 2011

(65) Prior Publication Data

US 2012/0118832 A1 May 17, 2012

Related U.S. Application Data

(60) Provisional application No. 61/449,384, filed on Mar. 4, 2011, provisional application No. 61/412,776, filed on Nov. 11, 2010.

(51) Int. Cl.

| | |
|---|---|
| ***C08F 8/12*** | (2006.01) |
| ***C08F 218/10*** | (2006.01) |
| ***B01J 20/26*** | (2006.01) |
| ***C08F 224/00*** | (2006.01) |
| ***B01J 20/30*** | (2006.01) |
| ***C08F 220/16*** | (2006.01) |
| ***B01J 20/28*** | (2006.01) |
| *C08F 226/10* | (2006.01) |
| *C08F 220/06* | (2006.01) |

(52) U.S. Cl.

CPC ............ *B01J 20/3042* (2013.01); *B01J 20/267* (2013.01); *C08F 224/00* (2013.01); *C08F 226/10* (2013.01); *B01J 20/264* (2013.01); *C08F 2800/10* (2013.01); *B01J 2220/46* (2013.01); *C08F 220/16* (2013.01); *C08F 220/06* (2013.01); *B01J 20/2803* (2013.01); *B01J 2220/68* (2013.01)

USPC ......................... 525/327.2; 525/384; 526/270

(58) Field of Classification Search

USPC ................................ 525/327.2, 384; 526/270

See application file for complete search history.

(56) References Cited

U.S. PATENT DOCUMENTS

| | | | |
|---|---|---|---|
| 2,556,135 | A | 6/1954 | Croxall |
| 4,540,736 | A | 9/1985 | Herten et al. |
| 6,232,474 | B1 | 5/2001 | Brandenburg et al. |
| 6,313,318 | B1 | 11/2001 | Coulson et al. |
| 6,388,036 | B1 | 5/2002 | Gridnev et al. |
| 6,489,406 | B1 | 12/2002 | Mahbub et al. |
| 6,617,417 | B1 | 9/2003 | Airola et al. |
| 6,642,346 | B2 | 11/2003 | Brandenburg et al. |
| 6,649,776 | B2 | 11/2003 | Manzer et al. |
| 6,841,627 | B2 | 1/2005 | Brandenburg |

(Continued)

FOREIGN PATENT DOCUMENTS

| | | | |
|---|---|---|---|
| DE | 3913127 | A1 | 10/1990 |
| JP | 56161419 | A | 12/1981 |

(Continued)

OTHER PUBLICATIONS

Pittmann, Journal of Polymer Science Part A: Polymer Chemistry, vol. 41, issue 12, 2003, pp. 1759-1777.*

(Continued)

*Primary Examiner* — Robert C Boyle
(74) *Attorney, Agent, or Firm* — Cantor Colburn LLP

(57) ABSTRACT

An ionic polymer of formula VI

VI

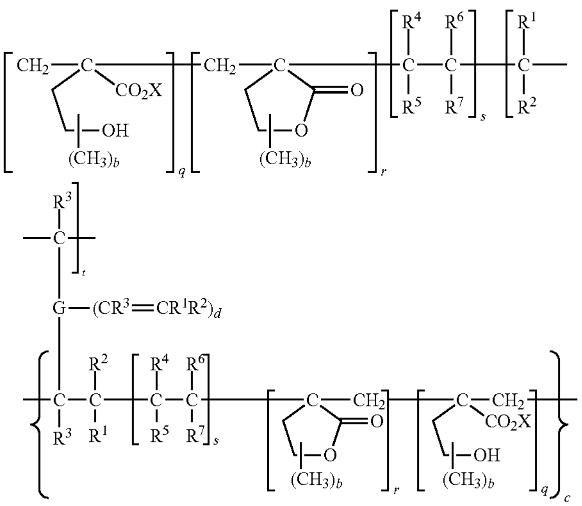

wherein each b=0 or 1; X is hydrogen, 1/z of a metal ion of charge z, a protonated nitrogen base, or a tetrasubstituted organic ammonium compound; the molar ratio of q:r:s:t=(100-0.1):(0-99.9):(0-50):(0-30); $R^1$, $R^2$ and $R^3$ are hydrogen or $C_{1-4}$ alkyl; $R^4$, $R^5$, $R^6$ and $R^7$ are hydrogen, $C_{1-4}$ alkyl or F, wherein F is a functional group that imparts a property to polymer VI, at least one and no more than two of $R^4$, $R^5$, $R^6$ and $R^7$ are F and F is the same or different; G is a single bond or a $C_{1-30}$ hydrocarbyl group; and for each instance of t when t is not zero, c=0-5 and d=0-5, provided that c+d=1-5, and wherein q, r and s as present in c are independent of any other value of q, r and s.

41 Claims, No Drawings

(56) References Cited

U.S. PATENT DOCUMENTS

| | | | | |
|---|---|---|---|---|
| 7,141,682 | B2 | 11/2006 | Hutchenson et al. | |
| 7,151,185 | B2 | 12/2006 | Hutchenson et al. | |
| 7,153,981 | B2 | 12/2006 | Hutchenson et al. | |
| 7,161,014 | B2 | 1/2007 | Hutchenson et al. | |
| 7,164,032 | B2 | 1/2007 | Hutchenson et al. | |
| 7,164,033 | B2 | 1/2007 | Hutchenson et al. | |
| 7,166,727 | B2 | 1/2007 | Hutchenson et al. | |
| 7,199,254 | B2 | 4/2007 | Hutchenson et al. | |
| 7,205,416 | B2 | 4/2007 | Hutchenson et al. | |
| 7,314,942 | B2 | 1/2008 | Hutchenson et al. | |
| 7,348,442 | B2 | 3/2008 | Manzer et al. | |
| 2002/0028881 | A1 * | 3/2002 | Brandenburg et al. | 525/191 |
| 2004/0106721 | A1 | 6/2004 | Soerens | |
| 2007/0122625 | A1 * | 5/2007 | Pickett et al. | 428/412 |
| 2008/0125568 | A1 | 5/2008 | Endo et al. | |
| 2008/0210253 | A1 | 9/2008 | Carballada et al. | |
| 2008/0293901 | A1 | 11/2008 | Ohrbom | |
| 2009/0022681 | A1 | 1/2009 | Carballada et al. | |
| 2009/0088545 | A1 | 4/2009 | Sahade et al. | |

FOREIGN PATENT DOCUMENTS

| | | | |
|---|---|---|---|
| JP | 07186539 | | 1/1997 |
| JP | 09012644 | A | 1/1997 |
| JP | 09012646 | A | 1/1997 |
| KR | 1020030026915 | A | 4/2003 |
| WO | WO 0035960 | A2 | 6/2000 |
| WO | 2008150335 | A1 | 12/2008 |
| WO | 2009032905 | A1 | 3/2009 |
| WO | 2011038337 | A1 | 3/2011 |
| WO | 2012130959 | A1 | 10/2012 |
| WO | 2012130960 | A1 | 10/2012 |
| WO | 2012130963 | A1 | 10/2012 |
| WO | 2012130967 | A1 | 10/2012 |
| WO | 2012130971 | A1 | 10/2012 |
| WO | 2012130975 | A1 | 10/2012 |

OTHER PUBLICATIONS

Argarwal, Macromolecular Chemistry and Physics, vol. 212, issue 6, pp. 603-612, Jan. 2011.*

Hu, Yangjian, et al., "Anionic Polymerization of MMA and Renewable Methylene Butyrolactones by Resorbable Potassium Salts", Journal of Polymer Science, published online in Wiley Online Library (wileyonlinelibrary.com), received Jan. 21, 2011, p. 1-10.

Lemonidou, Angeliki, et al., "Dynamic microbalance studies of RbOx/SiO2 catalyst deactivation/regeneration for a-methylene -y-valerolactone synthesis", Applied Catalysis A: General 272 (2004) 241-248.

Manzer, Leo E., "Catalytic synthesis of a-methylene-y-valerolactone: a biomass-derived acrylic monomer", Applied Catalysis A: General 272 (2004) p. 249-256.

Mosnacek, Jaroslav , et al., "Synthesis, morphology and mechanical properties of linear triblock copolymers based on poly(a-methylene-y-butyrolactone", Polymer 50 (2009) p. 2087-2094.

Akkapeddi, Murali K., "The free radical copolymerization characteristics of a-methylene ?-butyrolactone", Polymer, vol. 20, Issue 10, Oct. 1979, pp. 1215-1216, Abstract.

CoREZYN Vinyl Ester Resins Brochure, "The Right Chemistry. That's What We Bring to Vinyl Ester Resins", www.interplastic.com, 2008, 4 pages.

Li, Hui "Synthesis, Characterization and Properties of Vinyl Ester Matrix Resins", Dissertation, Virginia Polytech Institute and State University @ etds@vt, ETD etd-42198-113329, Jan. 21, 1998, pp. 1-154.

Akkapeddi, Murali K., "Poly(a-methylene-y-butyrolactone) Synthesis, Configurational Structure, and Properties", Macromolecules, vol. 12, No. 4, Jul.-Aug. 1979, pp. 546-551.

Cockburn, Robert A., et al, "Free Radical Copolymerization Kinetics of y-Methyl-a-methylene-y-butyrolactone (MeMBL)", Biomacromolecules, 2011, pubs.acs.org/Biomac, pp. A-H.

Hu, Yangjian, et al, "Polymerization of Naturally Renewable Methylene Butyrolactones by Half-Sandwich Indenyl Rare Earth Metal Dialkyls with Exceptional Activity", Macromolecules, 2010, vol. 43, 9328-9336.

Kumar, Rimpu, "Synthesis, Characterization, and Properties Evaluation of New Degradable Materials", dissertation performed from Sep. 2007-Aug. 2010 under the supervision of PD Dr. Seema Agarwal, Fachbereich Chemie, in the Macromolecular Chemistry department, Philipps-Universität Marburg,133 pages.

Miyake, Garret, et al., "Living Polymerization of Naturally Renewable Butyrolactone-Based Vinylidene Monomers by Ambiphilic Silicon Propagators" Macromolecules, 2010, vol. 43, 4902-4908.

Nolan, Michael, "MeMBL: Ring-Opening a Pathway to Renewable, Chemically Customizable Plastic", The Tower Undergraduate Research Journal at the Georgia Institute of Technology, Spring 2009, pp. 11-16.

Qi, Genggeng, et al, "Emulsion and Controlled Miniemulsion Polymerization of the Renewable Monomer c-Methyl-a-Methylene-c-Butyrolactone", Journal of Polymer Science, 2008, vol. 46, 5929-5944.

Suenaga, J., et al., "Polymerization of (RS)- and (R)-a-Methylene-y-methyl-y-buryrolactone", Macromolecules, 1984, vol. 17, 2913-2918.

Toncheva, Veska, et al, "Synthesis and Environmental Degradation of Polyesters Based on Poly (e-caprolactone)", Journal of Environmental Polymer Degradation, 1996, vol. 4, No. 2, 71-83.

Trumbo, David L., "The copolymerization of substituted styrenes with a-methylene-y-butyrolactone", Polymer Bulletin, 1995, vol. 35, 265-269.

Ueda, Mitsuru and Takahashi, Masami, "Synthesis and Homopolymerization Kinetics of a-Methylene-d-valerolactone, an Exo-Methylene Cyclic Monomer with a Nonplanar Ring System Spanning the Radical Center", Macromolecules, vol. 16 (1983) pp. 1300-1305.

Ueda, Mitsuru and Takahashi, Masami, "Radical-Initiated Homo- and Copolymerization of a-Methylene-y-Butyrolactone", Journal of Polymer Science: Polymer Chemistry Edition, vol. 20, (1982) pp. 2819-2828.

Ueda, Mitsuru, et al., "Radical Copolymerization of Styrene with a-Methylene-d-valerolactone: Role of Depropagation in the Mechanism", Macromolecules, vol. 19 (1986) pp. 558-565.

Hedge, Sayee G. and Myles, David C., "The Kinetics and Thermodynamics of Bicyclic Ketal Formation: An Application to the Synthesis of the Zaragozic Acids", Tetrahedron, vol. 53, No. 32, pp. 11179-11190 (1997).

International Preliminary Report on Patentability for PCT/US/2011/060456 mailed May 23, 2013, 8 pages.

Transmittal and International Search Report for PCT/US2011/060456, mailed May 29, 2012, 7 pages.

Written Opinion of the International Searching Authority, mailed May 29, 2012, for PCT/US2011/056741, 6 pages.

Supplementary European Search Report for EP 11 83 9591, Feb. 27, 2014, 2 pages.

Supplementary European Written Opinion for EP 11 83 9591, Feb. 27, 2014, 3 pages.

* cited by examiner

IONIC POLYMERS, METHOD OF MANUFACTURE, AND USES THEREOF

CROSS-REFERENCE TO RELATED APPLICATION

This application claims the benefit of U.S. Provisional Application Ser. No. 61/412,776, filed on Nov. 11, 2010 and of U.S. Provisional Application Ser. No. 61/449,384, filed Mar. 4, 2011, the entire contents of both being incorporated by reference herein.

BACKGROUND

This disclosure relates to biosourced ionic polymers containing carboxy and hydroxyl groups, methods for the manufacture of the polymers, and uses thereof.

Ionic polymers are polymers that contain ionic groups, e.g., carboxylate, sulfonate, or phosphonate groups. "Ionomers" are a type of ionic polymer that contain up to 15 mole % of units bearing ionic groups. Ionomers can be random, that is, having ionic groups distributed along the backbone of the chain, or telechelic, where ionic groups are only present at the chain ends. Representative ionomers include the sodium or zinc salts of poly(ethylene-co-methacrylic acid). "Polyelectrolytes," on the other hand, are a type of ionic polymer having greater than 15 mole % of units that bear ionic groups. Exemplary polyelectrolytes are the salts of poly(acrylic acid).

SUMMARY

While a number of ionic polymers are known, there remains a continuing need in the art for new types of ionic polymers, particularly where the number of ionic groups in the polymer can be readily adjusted. It would be a further advantage if ionic polymers could be readily crosslinked.

Accordingly, in an aspect, an ionic polymer comprises units of formula I

I

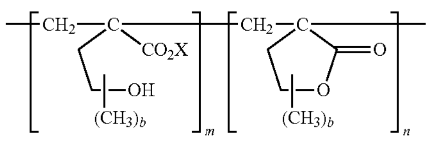

wherein each b=0 or 1 (i.e. the polymer can contain m units wherein b=1 and m units wherein b=0);

the molar ratio of m:n=(99.9-0.1):(0.1-99.9), wherein m+n=2-30,000; and each X is independently a hydrogen, 1/z of a metal ion of charge z, a protonated nitrogen base, or a tetrasubstituted organic ammonium compound.

In another aspect, an ionic polymer comprises units of formula I

I

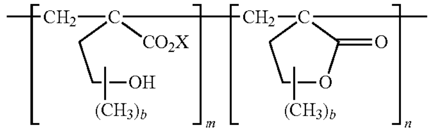

wherein each b=0 or 1; the molar ratio of m:n is (100-0.1):(0-99.9), wherein m+n=2,000-30,000; and each X is independently a hydrogen, 1/x of a metal ion of valence x, a protonated nitrogen base, or a tetrasubstituted organic ammonium compound.

In another aspect, a method of preparing the foregoing ionic polymers I includes contacting a base and a polymer of formula II

II

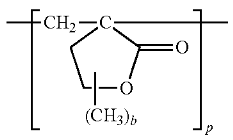

wherein each b=0 or 1 and p=2-30,000, to provide the ionic polymer I.

In another aspect, a crosslinked ionic polymer is described, which includes a crosslinked product of polymer I, or the reaction product of ionic polymer I and a crosslinking agent.

A method forming the foregoing crosslinked ionic polymer comprises crosslinking ionic polymer I.

Another aspect is a composition including ionic polymer I or the crosslinked ionic polymer I.

In still another aspect, an ionic polymer comprises units of formula VI

VI

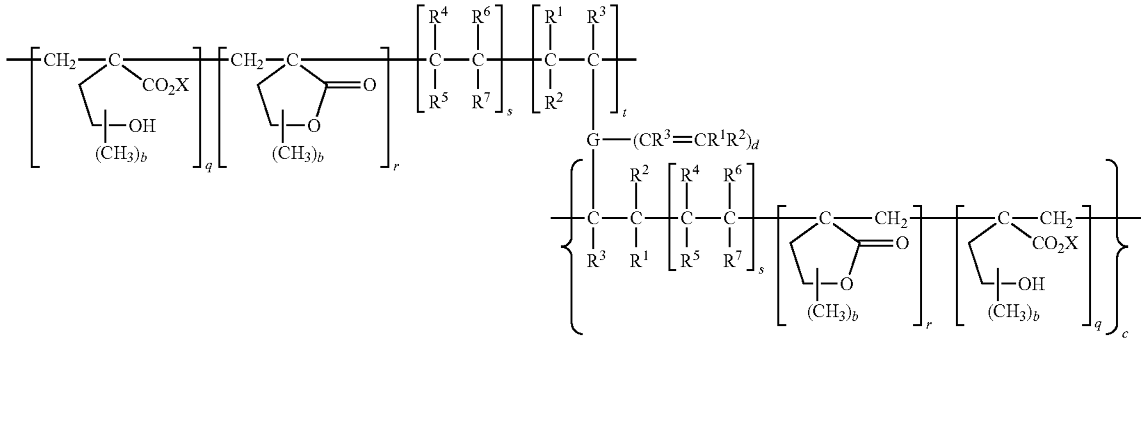

wherein each b=0 or 1 (i.e. the polymer can contain q units wherein b=1 and q units wherein b=0);

each X is independently a hydrogen, 1/z of a metal ion of charge z, a protonated nitrogen base, or a tetrasubstituted organic ammonium compound;

the molar ratio of q:r:s:t=(99.99-0.1):(0-99.9):(0-98):(0-30), wherein s+t is at least 1;

$R^1$, $R^2$, and $R^3$ are each independently a hydrogen or $C_{1-4}$ alkyl;

$R^4$, $R^5$, $R^6$, and $R^7$ are each independently a hydrogen, $C_{1-4}$ alkyl or F, wherein F is a functional group that imparts a property to the polymer VI, at least one and no more than two of $R^4$, $R^5$, $R^6$, and $R^7$ are F, and F is the same or different in each instance;

G is a single bond or a $C_{1-30}$ hydrocarbyl group; and for each instance of t when t is not zero, c=0-5 and d=0-5, provided that c+d=1-5, and wherein q, r and s as present in c are independent of any other value of q, r and s.

A method of preparing an ionic polymer is disclosed, the method comprising contacting a base and a polymer of formula VII

VII

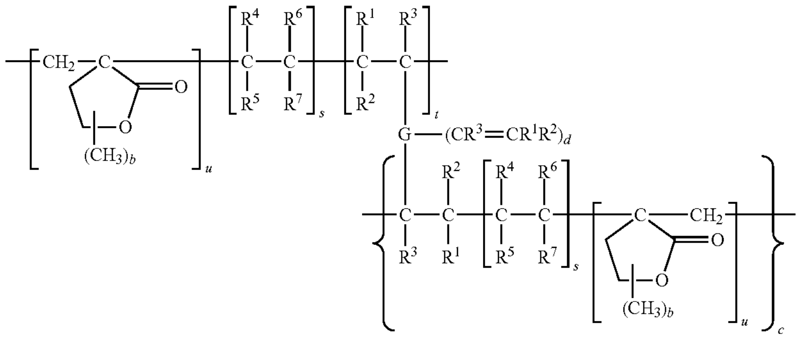

wherein each b=0 or 1;

the molar ratio of u:s:t=(99.99-2):(0-98):(0-30), wherein s+t is at least 1;

$R^1$, $R^2$, and $R^3$ are each independently a hydrogen or $C_{1-4}$ alkyl;

G is a single bond or a $C_{1-30}$ hydrocarbyl group;

$R^4$, $R^5$, $R^6$, and $R^7$ are each independently a hydrogen, $C_{1-4}$ alkyl or F, wherein F is a functional group that imparts a property to the polymer VI, at least one and no more than two of $R^4$, $R^5$, $R^6$, and $R^7$ are F, and F is the same or different in each instance; and for each instance of t when t is not zero, c=0-5 and d=0-5, provided that c+d=1-5, and wherein u and s present in c are independent of any other values of u and s, to provide ionic polymer VI.

In another aspect, the molar ratio of u:s:t=(99.99):(0-50):(0-30).

Also disclosed is a method of preparing a polymer of formula VII

VII

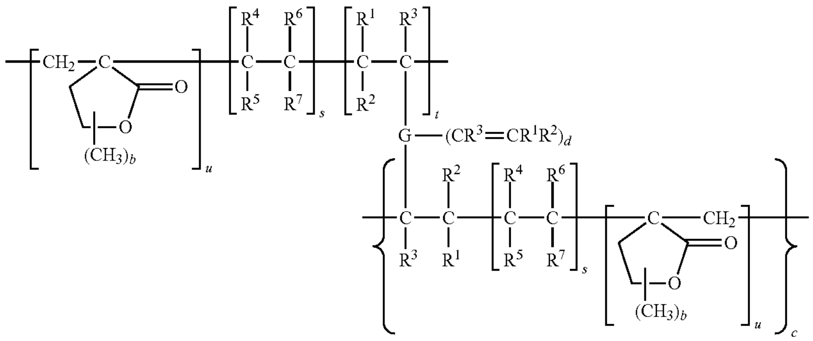

wherein each b=0 or 1;

the molar ratio of u:s:t=(99.99-2):(0-98):(0-30), wherein s+t is at least 1;

$R^1$, $R^2$, and $R^3$ are each independently a hydrogen or $C_{1-4}$ alkyl;

G is a single bond or a $C_{1-30}$ hydrocarbyl group;

$R^4$, $R^5$, $R^6$, and $R^7$ are each independently a hydrogen, $C_{1-4}$ alkyl or F, wherein F is a functional group that imparts a property to the polymer VI, at least one and no more than two of $R^4$, $R^5$, $R^6$, and $R^7$ are F and F is the same or different in each instance; and for each instance of t, c=0-5 and d=0-5, provided that c+d=1-5, the method comprising polymerizing an ethylenically unsaturated lactone of formula III

III

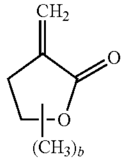

wherein each b=0 or 1 with a crosslinking monomer of formula VIII

VIII

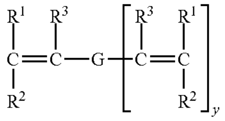

wherein $R^1$, $R^2$, and $R^3$ are each independently hydrogen or $C_{1-4}$ alkyl;

G is a single bond or a $C_{1-30}$ hydrocarbyl group;

and y=1-5, and optionally at least one comonomer of formula XI

XI

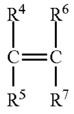

wherein $R^1$, $R^2$, and $R^3$ are each independently hydrogen or $C_{1-4}$ alkyl; and $R^4$, $R^5$, $R^6$ and $R^7$ are each independently a hydrogen, $C_{1-4}$ alkyl or F, wherein F is a functional group that imparts a property to the polymer VI, at least one and no more than two of $R^4$, $R^5$, $R^6$ and $R^7$ are F, and F is the same or different in each instance. Also disclosed is a composition including ionic polymer VI.

A crosslinked ionic polymer is further described, comprising the crosslinked product of ionic polymer VI or the reaction product of the polymers VI and a crosslinking agent.

A method forming the foregoing crosslinked ionic polymer comprises crosslinking ionic polymer VI.

Another aspect is a composition including ionic polymer VI or the crosslinked ionic polymer VI.

In still another aspect, an ionic polymer includes units of formula VIa

VIa

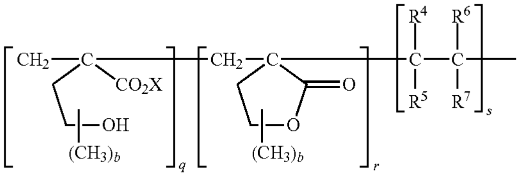

wherein each b=0 or 1;

each X is independently a hydrogen, 1/z of a metal ion of charge z, a protonated nitrogen base, or a tetrasubstituted organic ammonium compound;

the molar ratio of q:r:s=(99.99-0.1):(0-99.89):(0.01-98); and $R^4$, $R^5$, $R^6$, and $R^7$ are each independently a hydrogen, $C_{1-4}$ alkyl or F, wherein F is a functional group that imparts a property to polymer VIa, at least one and no more than two of $R^4$, $R^5$, $R^6$ and $R^7$ are F, and F is the same or different in each instance.

In another aspect, the molar ratio of q:r:s=(99.99-0.1):(0-99.89):(0.01-50).

In still another aspect, a method of preparing an ionic polymer VIa comprises contacting a base and a polymer of formula VIIa VIa

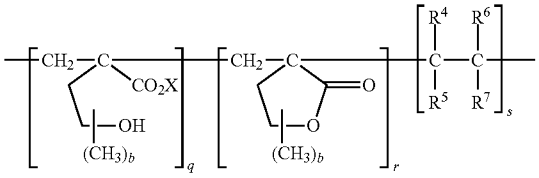

wherein each b=0 or 1;

each X is independently a hydrogen, 1/z of a metal ion of charge z, a protonated nitrogen base, or a tetrasubstituted organic ammonium compound; the molar ratio of v:s=(0.1-99.99):(0.01:99.9); and $R^4$, $R^5$, $R^6$ and $R^7$ are each independently a hydrogen, $C_{1-4}$ alkyl or F, wherein F is a functional group that imparts a property to polymer VIa, and at least one and no more than two of $R^4$, $R^5$, $R^6$ and $R^7$ are F, wherein F is the same or different in each instance.

In another aspect, a crosslinked ionic polymer is described, which includes a crosslinked product of polymer VIa, or the reaction product of ionic polymer VIa and a crosslinking agent.

A method forming the foregoing crosslinked ionic polymer comprises crosslinking ionic polymer VIa.

Another aspect is a composition including ionic polymer VIa or the crosslinked ionic polymer VIa.

In still another aspect, an ionic polymer includes units of formula VIb

VIb

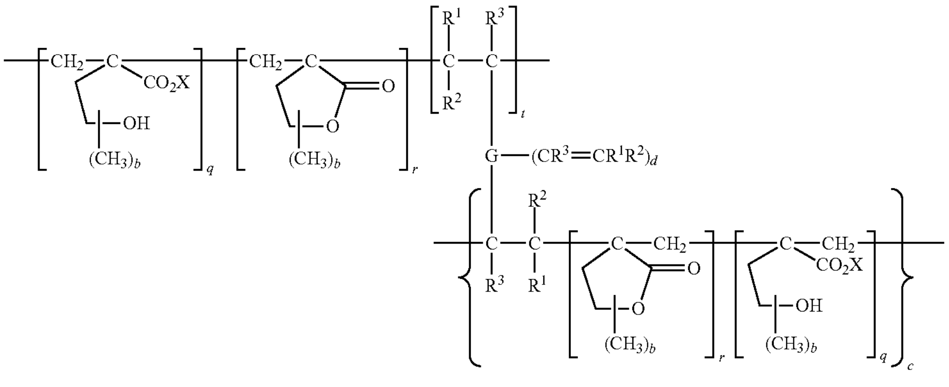

wherein each b=0 or 1;

each X is independently a hydrogen, 1/z of a metal ion of charge z, a protonated nitrogen base, or a tetrasubstituted organic ammonium compound;

the molar ratio of q:r:t=(99.99-0.1):(0-99.89):(0.01-30)

$R^1$, $R^2$, and $R^3$ are each independently a hydrogen or $C_{1-4}$ alkyl;

G is a single bond or a $C_{1-30}$ hydrocarbyl group; and for each instance of t, c=0-5 and d=0-5, provided that c+d=1-5, and wherein q and r as present in c are independent of any other value of q and r.

A method of preparing an ionic polymer VIb comprises contacting a base and a polymer of formula VIIb VIIb

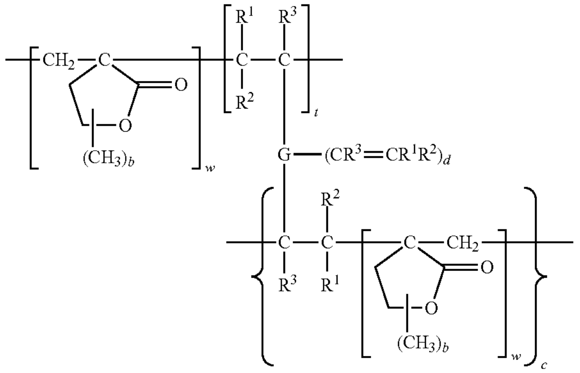

wherein each b=0 or 1;

each X is independently a hydrogen, 1/z of a metal ion of charge z, a protonated nitrogen base, or a tetrasubstituted organic ammonium compound;

the molar ratio of w:t=(99.99-70):(0.01-30);

$R^1$, $R^2$, and $R^3$ are each independently a hydrogen or $C_{1-4}$ alkyl;

G is a single bond or a $C_{1-30}$ hydrocarbyl group; and for each instance of t when t is not zero, c=0-5 and d=0-5, provided that c+d=1-5, and wherein q, r and s as present in c are independent of any other value of q, r and s.

A crosslinked ionic polymer is further described, comprising the crosslinked product of ionic polymer VIb or the reaction product of the polymers VIa and a crosslinking agent.

A method forming the foregoing crosslinked ionic polymer comprises crosslinking ionic polymer VIb.

Also disclosed is a composition including ionic polymer VIb or the crosslinked polymer VIb.

Still further disclosed is a binder-desiccant comprising ionic polymer I, VI, VIa, or VIb, the corresponding post-crosslinked ionic polymers, or a combination comprising at least one of the foregoing, and optionally a desiccant.

Also disclosed is a binder-sorbent comprising ionic polymer I, VI, VIa, or VIb, the corresponding post-crosslinked ionic polymers, or a combination comprising at least one of the foregoing, and optionally a sorbent.

Still further disclosed is a method of aggregating a material present in an liquid phase, comprising contacting the material in the liquid phase with an effective amount of the ionic polymer I, VI, VIa, or VIb polymer for a time sufficient to aggregate the one or more materials.

The invention is further illustrated by the following Detailed Description and Examples.

DETAILED DESCRIPTION

Ionic polymers have a variety of uses, including as desiccants, flocculants, ion exchangers, and the like. However, there remains a continuing need in the art for new types of ionic polymers, and in particular ionic polymers manufactured from biological, rather than petroleum feedstocks. It would further be useful if an ionic polymer could be manufactured to contain a selected mole percent of units bearing ionic groups. A still further advantage would be for such polymers to be crosslinked, or to have additional functionality for crosslinking. The option to incorporate various types of functionality into ionic polymers would further be useful, particularly if the type and amount of functional groups could be present in a selected mole percent.

A new class of ionic polymers is described, wherein each polymer contains a unit that can be biosourced, and that contains both a hydroxyl and a carboxyl functionality. The percent of ionic units can be selected to provide the desired properties. It is also possible to crosslink the polymers using the hydroxyl groups, carboxyl groups, or both, with or without an added crosslinking agent. In addition, the polymers can be crosslinked by the inclusion of a crosslinking monomer during polymerization of the polymer. The functionality and/or properties of the polymers can be modified by incorporation of a selected type and amount comonomer. Advantageously, the polymers can be derived from biological feedstocks, in particular lactones such as angelica lactone. Additionally, the polymers can be derived from petroleum or renewable building blocks such as succinic acid, butane-diol, or levulinic acid/esters.

In an embodiment, an ionic polymer comprises units as shown in formula I.

I

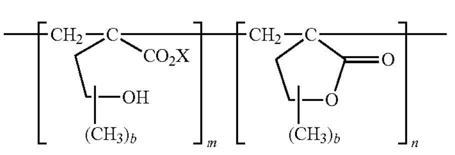

In formula I, each b is 0 or 1 (i.e., a single polymer can contain units wherein b=1 and m units wherein b=0). When b is 1, the methyl group can be located on the carbon gamma to the carbonyl group or beta to the carbonyl group. In an embodiment, the methyl group is located gamma to the carbonyl group.

Further in the polymer of formula I, each X is independently a hydrogen, 1/z of a metal ion of valence z, a protonated nitrogen base, or a tetrasubstituted organic ammonium compound.

In an embodiment, X is an ionized metal of groups IA, IIA, IIIA, IVA, VA, IIB, IVB, VIIB, or VIIIB of the Periodic Table of the Elements. Specific metals include alkali and alkaline earth metals. In another embodiment, X is an ion of Li, Na, K, Mg, Ca, Sr, Ba, Cs, Rb, Al, Ge, Sn, Sb, Bi, Zn, Ti, Zr, Mn, Co, Cu, Fe, and/or Ce, and still more specifically Na, K, Ca, and/or Zn. When the metal is divalent, trivalent, or higher, 1/z of the metal is associated with each carboxyl group.

Protonated nitrogen bases include the protonated forms of ammonia (i.e., ammonium) or organic bases of formulas $H_2NR$, $HNR^aR^b$, or $NR^aR^bR^c$, wherein each of $R^a$, $R^b$, and $R^c$ is independently a $C_{1-12}$ alkyl, $C_{3-6}$ cycloalkyl, or C6-12 aryl, or $R^a$ and $R^b$ or $R^a$, $R^b$, and $R^c$ together with the amine nitrogen form a cyclic or polycyclic aliphatic, unsaturated, or aromatic group optionally further comprising 1-2 oxygen and/or nitrogen atoms in the ring. Specific representative protonated nitrogen bases include ammonium ($NH_4^+$), protonated $C_{1-6}$ trialkylamines such as triethylamine, triethanolamine, 1,4-diazabicyclo[2.2.2]octane (DABCO), 1,8-diazabicyclo[5.4.0]undec-7-ene (DBU), N-alkylpiperidines, morpholine and its derivatives, and the like.

Tetrasubstituted organic ammonium compounds are compounds of formulas $NR^aR^bR^cR^d$ wherein each of $R^a$, $R^b$, $R^c$, and $R^d$ is independently a $C_{1-12}$ alkyl.

Specifically, each X can be the same or different, and is a hydrogen, an ionized alkali metal, ½ of an ionized alkaline earth metal, ammonium, protonated tri($C_{1-4}$)alkylamine, or tetra($C_{1-4}$)alkyl ammonium group. More specifically, each X is the same, and is a hydrogen, ionized alkali metal, ½ of an ionized alkaline earth metal, or ammonium. Still more specifically, each X is the same and is a hydrogen, ammonium, $K^+$, ½$Ca^{2+}$, or $Na^+$.

In the polymer of formula I, m, and n are relative number of each type of units used to define the molar ratio of the m and n units, and are not intended to imply the structure of the polymer or the distribution of the m and n units in the polymer. Thus, the m and n units can be randomly or non-randomly arranged. In a random arrangement, the m and n units are distributed randomly in the ionic polymer.

The values of m and n in the polymer of formula I will vary depending on the overall length of the polymer and the degree of hydrolysis as described in further detail below. In an embodiment, the molar ratio of m:n is (100-0.1):(0-99.9). In other words the ratio of m:n can be 100:0 (wherein no units n are present) to 0.1:99.9 (wherein 0.1 mole percent of m units are present. In either of the foregoing embodiments, the ratio of m:n can be (99-1):(1-99), specifically (98-2):(2-98), (97-3):(3-97), (95-5):(5-95), (90-10):(10-90), (80-20):(20-80), (70-30):(30-70), (60-40):(40-60), (40-60), (30-70):(70-30), (20-80):(80-20), (15-85):(85-15), (10-90):(90-10), or (5-95):(95-5).

The total number of units in ionic polymer I (i.e., m+n) can be 2-30,000, specifically 2-5,000, 4-1,000, 6-500, or 8-100. In an embodiment, m+n=2-50, specifically 2-40, 2-30, 2-20, 2-10, or 2-5, optionally wherein n=0. In another embodiment, m+n=50-5,000, specifically 100-1,000, still more specifically 100-500, optionally wherein n=0. In another embodiment m+n=50-30,000, specifically 500-20,000, 1,000-20,000, and more specifically 5,000-10,000. In another embodiment m+n is 1,900-30,000, more specifically 1,900-20,000, and more specifically 1,900-15,000. In another embodiment, m+n=50-10,000.

The weight average molecular weight of polymer I will depend the number of units, and can be up to 3,000,000 grams per mole (g/mol). In an embodiment, the weight average molecular weight (Mw) is 250 to 3,000,000 g/mol, specifically 250 to 2,000,000 g/mol, more specifically 250 to 1,000,000 g/mol, and more specifically 250 to 950,000 g/mol. It is also possible for the weight average molecular weight of polymer I to be 65,000 to 3,000,000 g/mol, or 250,000 to 3,000,000 g/mol.

In another embodiment an ionic polymer comprises units as shown in formula VI.

VI

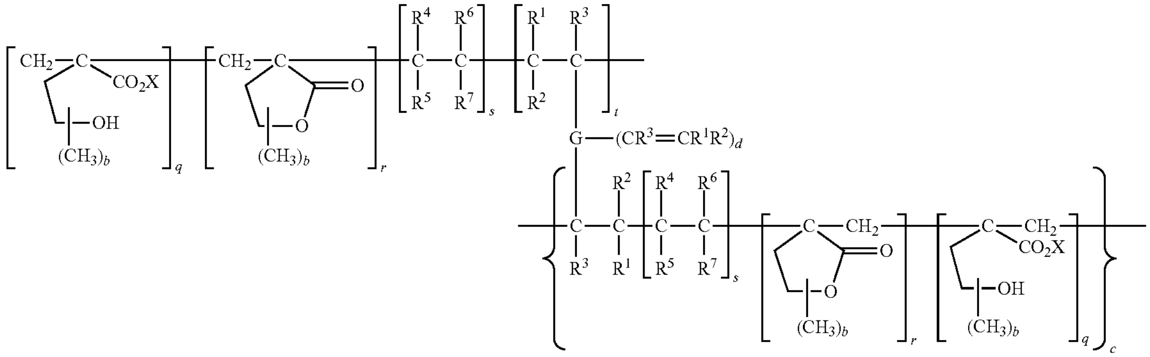

In ionic polymer of formula VI, each b is 0 or 1 (i.e. the polymer can contain q units wherein b=1 and q units wherein b=0). When b is 1, the methyl group can be located on the carbon gamma to the carbonyl group or beta to the carbonyl group. In an embodiment, the methyl group is located gamma to the carbonyl group.

Further in ionic polymer of formula VI, each X is independently a hydrogen, 1/z of a metal ion of charge z, a protonated nitrogen base, or a tetrasubstituted organic ammonium compound. Specifically, each X is as described in ionic polymer of formula I.

$R^1$, $R^2$, and $R^3$ in ionic polymer of formula VI are each independently a hydrogen or $C_{1-4}$ alkyl. In an embodiment, $R^1$ and $R^2$ are hydrogen and $R^3$ is a $C_{1-4}$ alkyl, specifically methyl. In another embodiment, $R^1$, $R^2$, and $R^3$ are each hydrogen.

$R^4$, $R^5$, $R^6$ and $R^7$ in ionic polymer of formula VI are each independently a hydrogen, $C_{1-4}$ alkyl or a substituent F, wherein at least one and no more than two of $R^4$, $R^5$, $R^6$ and $R^7$ are F. Each F can be the same or different. F is a functional substituent that imparts a property to the polymer VI. Without being limited, exemplary properties include solubility (for example hydrophobicity and/or hydrophilicity), charge, polarity, color, hygroscopicity, degradability (e.g., susceptibility to hydrolysis), or dectectability (e.g., via a fluorescent tag, radioactivity, luminosity, or the like). F can also be selected to modify the mechanical properties such as modulus or glass transition temperature. The property can affect the production and/or use of the compound. For example, when F is a charged group, the presence of the charged group can affect an emulsion polymerization process used to manufacture ionic polymer and/or the final properties of ionic polymer, and thus its use.

F can be an alcohol, carboxy acid, carboxy acid salt, carboxy ($C_{1-24}$ alkyl) ester, carboxy ($C_{1-24}$ hydroxyalkyl) ester, —NR'R" (wherein each R' and R" is independently hydrogen or $C_{1-24}$ alkyl), thio, carbamyl, carbamoyl, $C_{1-24}$ alkyl, $C_{2-24}$ alkenyl, $C_{2-24}$ alkynyl, $C_{3-8}$ cycloalkyl, $C_{3-7}$ heterocycloalkyl, $C_{6-12}$ aryl, or $C_{3-11}$ heteroaryl, or two F groups on adjacent carbon atoms can form a 5- or 6-membered cycloalkyl or heterocycloalkyl ring including the carbon atoms, wherein the foregoing hydrocarbyl groups can be unsubstituted or substituted with a carboxy acid, carboxy acid salt, carboxy ($C_{1-24}$ alkyl) ester, carboxy ($C_{1-24}$ hydroxy alkyl) ester, —NR'R" (wherein each R' and R" is independently hydrogen or $C_{1-24}$ alkyl,) thio, carbamyl, carbamoyl, nitrile, oxo (=O), or a combination comprising at least one of the foregoing. In an embodiment, $R^4$ and $R^5$ are hydrogen, $R^6$ is methyl or hydrogen, and $R^7$ is a carboxylic acid, ester, or salt, specifically a carboxylic acid. In another embodiment, the group F is derived from reaction of acrylic acid, methacrylic acid, fumaric acid, itaconic acid, maleic acid, maleic anhydride, itaconic anhydride, maleimide, butadiene, or a combination comprising at least one of the foregoing as a comonomer as described below.

G in ionic polymer of formula VI is a single bond or a $C_{1-30}$ hydrocarbyl group having a valence c+d+1. G is a residue of a crosslinking molecule having at least two (specifically, c+d+1) sites of ethylenic unsaturation, wherein crosslinking can occur upon polymerization as described below. As set forth below in the definitions, a hydrocarbyl group as used herein means a group having the specified number of carbon atoms and the appropriate valence in view of the number of substitutions shown in the structure. Hydrocarbyl groups contain at least carbon and hydrogen, and can optionally contain 1 or more (e.g., 1-8) heteroatoms selected from N, O, S, Si, P, or a combination comprising at least one of the foregoing. Hydrocarbyl groups can be substituted or unsubstituted. When G is a single bond, d=0, and the crosslinking molecule is butadiene.

More specifically, G can be a single bond or a $C_{1-12}$ alkyl substituted with 0-6 oxycarbonyl groups, 0-6 aminocarbonyl groups, or a combination comprising at least one of the foregoing, $C_{2-12}$ alkenyl substituted with 0-6 oxycarbonyl groups, 0-6 aminocarbonyl groups, or a combination comprising at least one of the foregoing, $C_{2-12}$ alkynyl substituted with 0-6 oxycarbonyl groups, 0-6 aminocarbonyl groups, or a combination comprising at least one of the foregoing, $C_{3-8}$ cycloalkyl substituted with 0-4 oxycarbonyl groups, 0-4 aminocarbonyl groups, or a combination comprising at least one of the foregoing, $C_{3-8}$ heterocycloalkyl substituted with 0-4 oxycarbonyl groups, 0-4 aminocarbonyl groups, or a combination comprising at least one of the foregoing, $C_{6-12}$ aryl substituted with 0-6 oxycarbonyl groups, 0-6 aminocarbonyl groups, or a combination comprising at least one of the foregoing, $C_{3-12}$ heteroaryl substituted with 0-4 oxycarbonyl groups, 0-4 aminocarbonyl groups, or a combination comprising at least one of the foregoing, or $C_{2-24}$ ($C_{1-4}$ alkyloxy)$_e$($C_{1-4}$alkyl) groups wherein e=1-16 substituted with 0-6 oxycarbonyl groups, 0-6 aminocarbonyl groups, or a combination comprising at least one of the foregoing. Specific types of G groups include ethers, triacrylates, amides, allyls, and isocyanurates.

In ionic polymer VI, q, r, s, and t are used to define the molar ratio of each of the units, and are not intended to imply the structure of the polymer or the distribution of the units in the polymer. Thus, each of the q, r, s, and t units can be randomly or non-randomly arranged, or some units can be randomly arranged and some non-randomly arranged (e.g., in blocks). In addition, the values of q, r, s, and t can vary independently for each crosslinked polymer fragment, i.e., the values of q, r, s, and t in the main polymer fragment of VI can be different from the values of q, r, s, and t in the c number of chains crosslinked to G. It will be understood that the c number of polymer fragments crosslinked to G can further contain units t (—$CR^1R^2$—$CR^3$G-) derived from the crosslinking monomer as described below, but for simplicity, such units have not been shown in formula VI.

The values of q, r, s, and t in ionic polymer VI will vary depending on the overall length of the polymer and the degree of hydrolysis as described in further detail below, as well as the ratio of monomers used to form the polymer. In an embodiment, the molar ratio of q:r:s:t=(99.99-0.1):(0-99.9):(0-98):(0-30), provided that at least one s unit or one t unit is present. In a specific embodiment, the molar ratio of q:r:s:t=(90-10):(9-80):(0-40):(0.1-25); more specifically, q:r:s:t=(80-20):(18-70):(0-40):(1-20); still more specifically q:r:s:t=(70-30):(27-60):(0-40):(3-10). In still another embodiment, q:r:s:t=(99.8-0.1):(0.1-99.7):(0.1-50):(0.1-30), or (90-10):(8-80):(1-40):(1-25); more specifically, q:r:s:t=(80-20):(16-70):(2-40):(2-20); still more specifically q:r:s:t=(70-30):(14-60):(3-40):(3-10). In still another embodiment, q:r:s:t=(99.8-0.1):(0.1-98):(0.1-50):(0-30), or (90-10):(8-80):(1-40):(0-25); more specifically, q:r:s:t=(80-20):(16-70):(2-40):(0-20); still more specifically q:r:s:t=(70-30):(14-60):(3-40):(0-10).

The total number of q+r+s+t backbone units in ionic polymer VI (all q+r+s+t not counting the units in c) can be 3-30,000, specifically 3-10,000, specifically 6-5,000, 9 to 1,000, 12-500, or 15-100. In an embodiment, q+r+s+t=3-50, specifically 3-40, 3-30, 3-20, 3-10, or 3-5. In another embodiment, q+r+s+t=50-5,000, specifically 100-1,000, still more specifically 100-500.

The number of polymer fragments c and ethylenically unsaturated groups d per crosslinker unit depends on the number ethylenically unsaturated groups in the crosslinker monomer and the extent to which the ethylenically unsaturated groups react. Accordingly, c=0-5 and d=0-5, provided that c+d=1-5. Alternatively, c=1-5 and d=0-4, provided that c+d=1-5, or c=2-5 and d=0-3, provided that c+d=1-5. When d=0, all ethylenically unsaturated units in the crosslinking monomer have reacted during polymerization.

In a specific embodiment, $R^1$, $R^2$ and $R^3$ in ionic polymer of formula VI are each hydrogen and d=0, to provide an ionic polymer of formula VIc, wherein each b=0 or 1;

each X is independently a hydrogen, 1/z of a metal ion of charge z, a protonated nitrogen base, or a tetrasubstituted organic ammonium compound;

the molar ratio of q:r:s=(99.99-0.1):(0-99.89):(0.01-99.9); and $R^4$, $R^5$, $R^6$, and $R^7$ are each independently a hydrogen, $C_{1-4}$ alkyl or F, wherein at least one and no more than two of $R^4$, $R^5$, $R^6$ and $R^7$ are F, F is a functional substituent that imparts a property to the polymer VI, and F is the same or different in each instance.

VIc

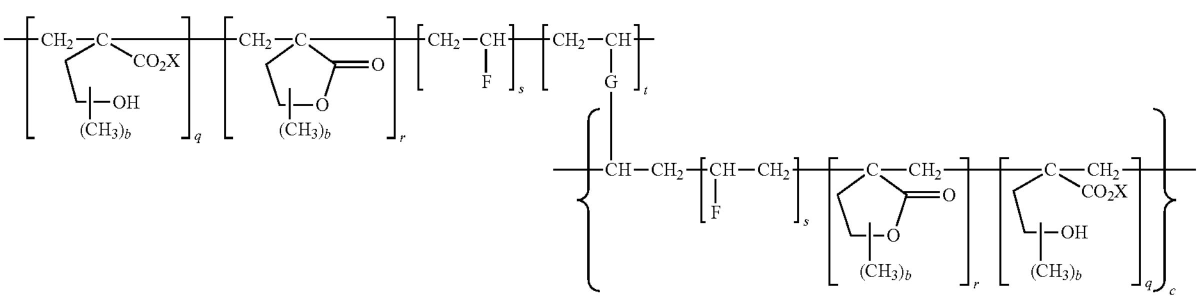

wherein X, F, G, c, q, r, s, and t are as defined in formula VI. Again, it will be understood that the c number of polymer fragments crosslinked to G can further contain units t ($—CR^1R^2—CR^3G$-) derived from the crosslinking monomer as described below, but for simplicity, such units have not been shown in formula VIc.

In a specific embodiment of ionic polymer VI, when t is zero the ionic polymers are of formula VIa VIa

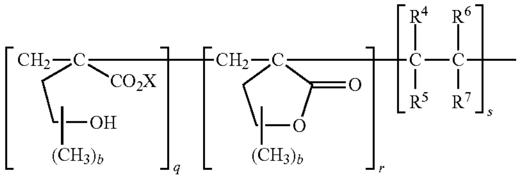

In ionic polymer VIa, the values of q, r, and s vary depending on the overall length of the polymer and the degree of hydrolysis as described in further detail below, as well as the ratio of monomers used to form the polymer. In an embodiment, the molar ratio of q:r:s=(99.9-0.1):(0-99.89):(0.01-98). In a specific embodiment, the molar ratio of q:r:s=(90-10):(0-89):(1-90), or q:r:s=(90-10):(0-50):(1-75); more specifically, q:r:s=(80-20):(0-75):(5-40); still more specifically q:r:s=(70-30):(0-60):(10-40). In still another embodiment, q:r:s=(99.8-0.1):(0.1-99.8):(0.1-50), or (98-10):(1-89):(1-40); more specifically, q:r:s=(80-20):(5-75):(5-40); still more specifically q:r:s=(70-30):(10-60):(10-40).

The total number of q+r+s backbone units in the polymer VIa (all q+r+s) can be 3-30,000, specifically 6-5,000, 9-1,000, 12-500, or 15-100. In an embodiment, q+r+s=3-50, specifically 3-40, 3-30, 3-20, 3-10, or 3-5. In another embodiment, q+r+s=50-5,000, specifically 100-1,000, still more specifically 100-500.

In another specific embodiment of ionic polymer VI, when s is zero the ionic polymers are of formula VIb VIb

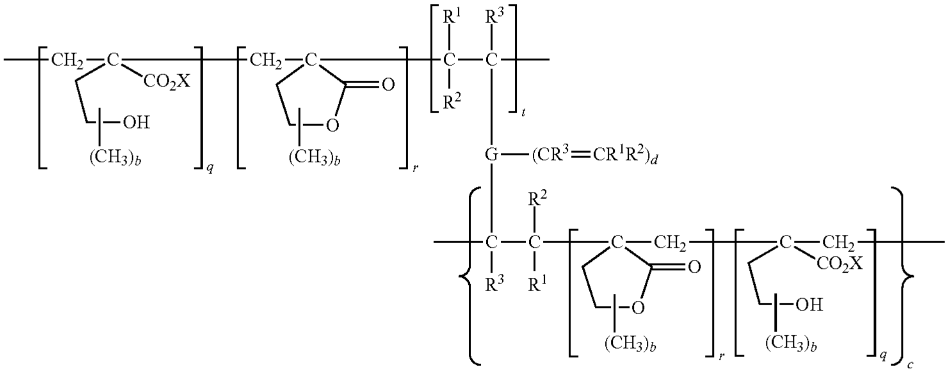

wherein each b=0 or 1;

each X is independently a hydrogen, 1/z of a metal ion of charge z, a protonated nitrogen base, or a tetrasubstituted organic ammonium compound;

the molar ratio of q:r:t=(99.99-0.1):(0-99.89):(0.01-30); and $R^1$, $R^2$, and $R^3$ are each independently a hydrogen or $C_{1-4}$ alkyl;

G is a single bond or a $C_{1-30}$ hydrocarbyl group; and for each instance of t, c=0-5 and d=0-5, provided that c+d=1-5, and wherein q and r as present in c are independent of any other value of q and r.

In ionic polymer VIb, the values of q, r, and t vary depending on the overall length of the polymer and the degree of hydrolysis as described in further detail below, as well as the ratio of monomers used to form the polymer. In an embodiment, the molar ratio of q:r:t=(99.9-0.1):(0-99.89):(0.01-30). In a specific embodiment, the molar ratio of q:r:t=(90-10):(0-89):(1-30), or q:r:t=(90-10):(0-50):(1-20); more specifically, q:r:t=(80-20):(0-75):(5-10); still more specifically q:r:t=(70-30):(0-60):(10-10). In still another embodiment, q:r:t=(99.8-0.1):(0.1-99.8):(0.1-30), or (98-10):(1-89):(1-20); more specifically, q:r:t=(80-20):(5-75):(5-20); still more specifically q:r:t=(70-30):(10-60):(10-20). The weight average molecular weight of polymer VIa can be up to 3,000,000 g/mol. In an embodiment, the weight average molecular weight is 250 to 3,000,000 g/mol, specifically 250 to 2,000,000 g/mol, more specifically 250 to 1,000,000 g/mol, and more specifically 250 to 950,000 g/mol. It is also possible for the weight average molecular weight of polymer IVa to be 65,000 to 3,000,000 g/mol, or 250,000 to 3,000,000 g/mol.

The total number of q+r+t backbone units in the polymer VIb (all q+r+t) can be 3-30,000, specifically 6-5,000, 9-1,000, 12-500, or 15-100. In an embodiment, q+r+t=3-50, specifically 3-40, 3-30, 3-20, 3-10, or 3-5. In another embodiment, q+r+t=50-5,000, specifically 100-1,000, still more specifically 100-500. The weight average molecular weight of polymer VIb can be up to 3,000,000 g/mol. In an embodiment, the weight average molecular weight is 250 to 3,000,000 g/mol, specifically 250 to 2,000,000 g/mol, more specifically 250 to 1,000,000 g/mol, and more specifically 250 to 950,000 g/mol. It is also possible for the weight average molecular weight of polymer IVb to be 65,000 to 3,000,000 g/mol, or 250,000 to 3,000,000 g/mol.

Any of the foregoing ionic polymers I, VI, VIa, VIb, and VIc can comprise additional repeat units in the polymer backbone. One type of additional repeat unit arises from the 1,4-type polymerization of butadiene, which incorporates unsaturated C4 units into the backbone.

The carboxylic acid-type polymer of formula I and the carboxylic acid-type polymers of formula VI (which as noted above includes ionic polymers Via, VIb, and Vic) wherein X is hydrogen can be substantially soluble in $C_{1-4}$ alcohols, such as methanol, ethanol, or isopropyl alcohol, and substantially insoluble in water. However, the neutralized ionic polymer I and neutralized ionic polymers of formula VI, wherein X is a metal ion or organoammonium counter-ion, can be water-soluble or have a water soluble fraction. Depending on the comonomer in ionic polymer VIa, the neutralized ionic polymer VIa can be water-soluble or have a water-soluble fraction. The carboxylic acid type polymer can be converted to the corresponding neutralized ionic polymers by neutralization of the acid groups or saponification of the lactone groups, for example by reaction with an alkaline material. Generally, the greater the extent of neutralization, the greater the water solubility. In an embodiment, at least 10 mole % of the acid/lactone groups are neutralized/saponified, specifically at least 20 mole %, at least 30 mole %, at least 40 mole %, at least 50 mole %, at least 60 mole %, at least 70 mole %, at least 80 mole %, or most specifically at least 90 mole %. In an embodiment essentially 100 mole % of the acid/lactone groups are neutralized/saponified.

The soluble portion of ionic polymers I and VI (which includes VIa and VIb) can have a weight average molecular weight (Mw) of 250-3,000,000 g/mole, specifically 250-2,000,000, 250-1,000,000, or 250-900,000 g/mole.

Ionic polymers I, VI, VIa, and VIb can have a water absorption of at least 0.01 gram of water per gram of ionic polymer I or ionic polymer VI, respectively, specifically 0.1-1000, specifically 0.5-500, or 1-250 or 1-100 grams of fluid per gram of ionic polymer when the fluid is DI water. Water absorption can be measured under a load of 3 pounds per square inch (psi). Ionic polymers I, VI, VIa, and VIb can have a saline (0.9% NaCl solution in water) absorption of at least 0.1-500 gram of saline per gram of ionic polymer I or ionic polymer VI, specifically 0.25-250, or 0.5-100 or 1-50 grams of fluid per gram of ionic polymer.

Crosslinked ionic polymers of I, VI, VIa, and VIb can have a water absorption under load of at least 0.1 gram of water per gram of ionic polymer specifically 0.1-100, specifically 0.5-50, or 1-30 grams of fluid per gram of ionic polymer I or ionic polymer VI, respectively. Water absorption can be measured under a load of 3 pounds per square inch (psi).

Ionic polymers I, VI, VIa, and VIb can have a water solubility of at least 10 wt. %, 20 wt. %, 30 wt. %, 40 wt. %, 50 wt. %, 60 wt. %, 70 wt. %, 80 wt. %, or 90 wt. %, specifically 10-90 wt. %, 10-80 wt. %, 10-70 wt. %, 10-60 wt. %, 10-50 wt. %, 10-40 wt. %, or 10-30 wt. %.

In an embodiment, ionic polymers I, VI, VIa, and VIb can have a glass transition temperature (Tg) of −20 to 220° C. when measured at 50% humidity, according to ASTM D3418. In another embodiment, the monomers and ratios of monomers are selected to provide ionic polymers I, VI, VIa, and VIb having a of greater than 50° C., greater than 100° C., greater than 120° C., greater than 150° C. or greater than 200° C.; and a Tg of less than 350° C., less than 300° C., less than 250° C. or less than 220° C., when measured at 50% humidity, according to ASTM D3418. In another embodiment where units s are present, or other units are in the backbone (e.g., units arising from 1,4-addition of butadiene), the ionic polymers VI, VIa, and VIb can have a Tg of less than 50° C. when measured at 50% humidity, according to ASTM D3418. The Tg of the ionic polymers is measured after drying, for example after drying to a constant weight at 50° C. Ionic polymers I, VI, VIa, and VIb can be obtained by ring opening of the corresponding polymeric lactone. In particular, ionic polymer I can be produced by ring opening of the corresponding poly(lactone) II

II

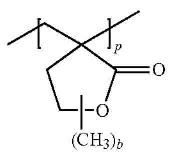

wherein each b=0 or 1 and p=m+n as described in formula I.

Ionic polymer VI can be obtained by ring opening of the corresponding polymeric lactone. In particular, ionic polymer VI can be produced by ring opening of the corresponding poly(lactone) VII

VII

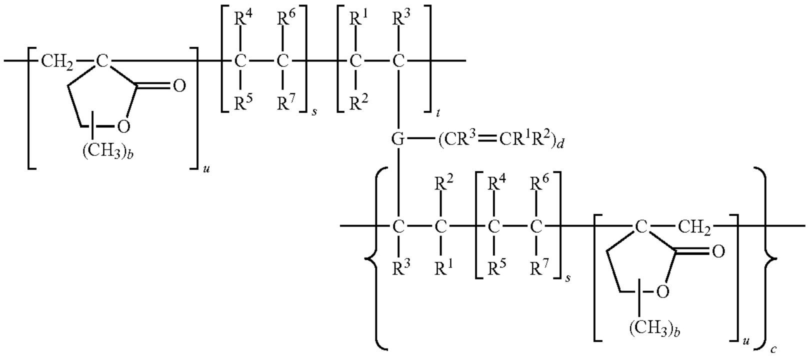

wherein each b=0 or 1;

each X is independently a hydrogen, 1/z of a metal ion of charge z, a protonated nitrogen base, or a tetrasubstituted organic ammonium compound;

the molar ratio of u:s:t=(99.99-2):(0-98):(0-30), wherein s+t=at least 1;

$R^1$, $R^2$, and $R^3$ are each independently a hydrogen or $C_{1-4}$ alkyl;

G is a single bond or a $C_{1-30}$ hydrocarbyl group;

$R^4$, $R^5$, $R^6$, and $R^7$ are each independently a hydrogen, $C_{1-4}$ alkyl or F, wherein at least one and no more than two of $R^4$, $R^5$, $R^6$ and $R^7$ are F and F is the same or different in each instance; and when t is not zero, c=1-5 and d=0-4, provided that c+d=1-5.

Again, it will be understood that in ionic polymer of Formula VII, u, s, and t are used to define the molar ratio of each of the units, and are not intended to imply the structure of the polymer or the distribution of the units in the polymer. Thus, each of the u, s, and t units can be randomly or non-randomly arranged, or some units can be randomly arranged and some non-randomly arranged (e.g., in blocks). In addition, the values of u, s, and t can vary independently for each crosslinked polymer fragment, i.e., the values of u, s, and t in the main polymer fragment of VII can be different from the values of u, s, and t in the c number of chains crosslinked to G. Further, the c number of polymer fragments crosslinked to G can further contain units t ($-CR^1R^2-CR^3G-$) derived from the crosslinking monomer as described below, but for simplicity, such units have not been shown in formula VII.

Ionic polymer VIa, of course, can be obtained by ring opening of the corresponding polymeric lactone VII as described above wherein t=0. In particular, ionic polymer VIa can be produced by ring opening of the corresponding poly (lactone) X

X

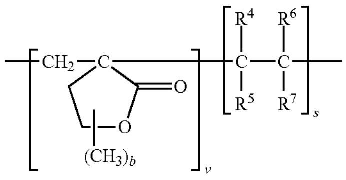

wherein each b=0 or 1;

each X is independently a hydrogen, 1/z of a metal ion of charge z, a protonated nitrogen base, or a tetrasubstituted organic ammonium compound; the molar ratio of v:s=(0.1-99.9):(0.1:99.9); and $R^4$, $R^5$, $R^6$, and $R^7$ are each independently a hydrogen, $C_{1-4}$ alkyl or F, wherein F is a functional group that imparts a property to the polymer VIa, and at least one and no more than two of $R^4$, $R^5$, $R^6$ and $R^7$ are F, wherein F is the same or different in each instance.

Similarly, ionic polymer VIb can be obtained by ring opening of the corresponding polymeric lactone VII as described above wherein s=0. In particular, ionic polymer VIb can be produced by ring opening of the corresponding poly(lactone) VIIb VIIb

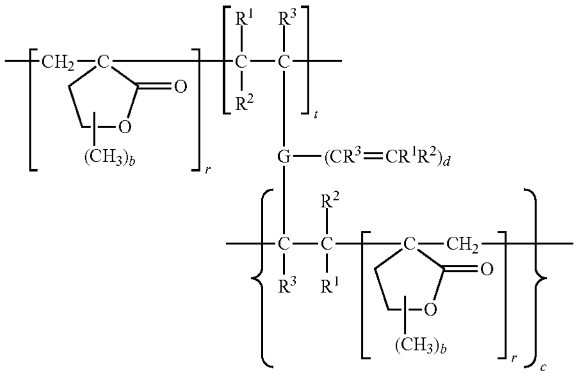

wherein each b=0 or 1;

each X is independently a hydrogen, 1/z of a metal ion of charge z, a protonated nitrogen base, or a tetrasubstituted organic ammonium compound;

the molar ratio of q:r:t=(99.99-0.1):(0-99.89):(0.01-30);

$R^1$, $R^2$, and $R^3$ are each independently a hydrogen or $C_{1-4}$ alkyl;

G is a single bond or a $C_{1-30}$ hydrocarbyl group; and for each instance of t, c=0-5 and d=0-5, provided that c+d=1-5, and wherein q and r as present in c are independent of any other value of q and r.

Ring opening of the poly(lactone)s of formula II and formula VII (which includes formulas VIIa and VIIb) can be accomplished by processes such as saponification. After saponification, X in ionic polymers I and VI is the counter-ion of the base used for saponification, e.g., $K^+$ if KOH, or $Na^+$ if NaOH is used as the base. Known precipitation and salt-exchange processes can be used to obtain the various salts or the acid form from the as-synthesized salts of ionic polymer I and ionic polymer VI.

The poly(lactone)s II and VII (which includes VIIa and VIIb) can be saponified using a base such as an oxide or a hydroxide of a metal ion of Groups IA, IIA, IIIA, IVA, VA, IIB, IVB, VIIB, VIIIB, or a combination comprising at least one of the foregoing groups, or a tetra($C_{1-12}$alkyl)ammonium salt. A strong base such as lithium hydroxide, sodium hydroxide, potassium t-butoxide, potassium hydroxide, or the like, can be used to obtain the corresponding polymer salts. A combination comprising at least one of the foregoing bases can be used. Sodium hydroxide, potassium t-butoxide, and potassium hydroxide can be specifically mentioned. Ammonium hydroxide can also be used. In some cases the salts of tetraorganoammonium compounds can be used, for example the halide salts of tetra($C_{1-12}$alkyl)ammonium compounds.

During saponification, basic conditions can be maintained at all times in all locations in the reaction in order to minimize side reactions using adequate agitation and limiting, stoichiometrically equivalent, or excess base. To obtain high levels of hydrolysis, an excess of about 5-200% over the theoretical amount of base can be used to prevent side reactions from consuming amounts of base beyond the amount required for the reaction of the desired all the ester groups. On the other hand, it is also preferred to avoid excessively high concentrations of base because high concentrations of base can also promote unwanted side reactions. In an embodiment the molar content of the base is equal to or less than 5 times the number of monomer units of u in the polymer, more specifically less than one time the number of monomer units of u in the polymer.

Temperature during saponification can vary widely, depending upon the other conditions such as reactant and reaction time, and can be, for example, 35-200° C., or 55-180° C., or 80-140° C.

The amount of water present during saponification can vary widely and the optimum level for use with any particular combination of the other conditions can be determined by routine experimentation. A solvent can be present during saponification. If a volatile solvent such as methylene chloride is present, a temperature high enough and a pressure low enough to effectively remove any solvent from the lactone almost immediately upon entering a saponification zone of a saponification process can be selected. When the solvent is methylene chloride or tetrahydrofuran, atmospheric pressure is satisfactory.

Sufficient reaction time is provided for the saponification reaction to proceed to the desired degree, for example essentially to completion. With appropriate selection of the other conditions (e.g., strength of the saponification reagent, reactant concentrations, temperature, particle size of the poly (lactone), chemical structure of the poly(lactone), and the like), the reaction can be completed in four hours or less for example.

During saponification, operation can be batch, semi-continuous or continuous, and rates of addition of the reactants can vary widely. The optimal rate of addition can be determined by routine experimentation. A rate that is too high can cause unwanted agglomeration of solid particles, excessive foaming as any solvent boils off, difficulty in temperature control, or excessive accumulation of reactants, for example. A rate that is too low can result in excessive reaction volume for a given production rate, and could cause incomplete reaction if it results in too little time available for completion of the reaction after all reactants have been added. Saponification can be conducted by adding the lactone polymer and the base to a reaction zone of a saponification process simultaneously. If a batch process is used, addition of some base prior to the start of addition of the lactone can be used in order to maintain a desired excess of the base throughout the reaction. The lactone can be added directly to the saponification zone, with or without a solvent.

A number of methods can be used to recover ionic polymers I and VI from the reaction mixture resulting from saponification. Unless desired, such conditions should not expose ionic polymer to conditions that cause depolymerization, such as excessively high temperatures for extended periods of time. Accordingly, the pH can be maintained to be 6-9.5, or 8-9, above 9.5, or above 10.0. The product can be recovered as a solution, slurry, gel, wet cake, or dry solid, depending upon its intended use. If the product is dried, excessive exposure to high temperature is avoided to prevent degradation and/or excess crosslinking. In an embodiment, the saponified polymer is isolated by filtering and drying under vacuum at room temperature until constant weight is reached. In another embodiment, the saponified polymer is neutralized to a pH of less than 9.0, for example pH 5.7 to 9.0, then isolated and dried, for example under vacuum to a constant weight at room temperature.

Ionic polymers I and VI (which includes VIa and VIb) can be obtained in yields of greater than 50% of theory, greater than 75% of theory, greater than 80% of theory, greater than 85% of theory, greater than 90% of theory, or greater than 93% of theory, up to 100% of theory.

The poly(lactone) II can be obtained by polymerization of the corresponding lactone. For example, poly(lactone) II can be obtained by polymerization of the corresponding ethylenically unsaturated lactone III

III

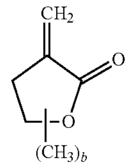

wherein each b=0 or 1.

The poly(lactone)s VII, VIIa, and VIIb can be obtained by co-polymerization of the ethylenically unsaturated lactone III, any additional comonomers, and a crosslinking monomer where present. The crosslinking monomer is a monomer having at least two polymerizable ethylenically unsaturated groups. The groups can react such that the crosslinking comonomer is incorporated into a first polymer backbone via a first ethylenically unsaturated group and into a second polymer backbone via a second ethylenically unsaturated group as the monomers polymerize. It is to be understood that the structures herein are representative of the polymers formed by copolymerization of the monomers III with the crosslinking monomer VIII and/or XI, but that other units or bonds may be present. Accordingly, in an embodiment, the ionic polymers herein are the polymers obtained by copolymerization of monomers III with the crosslinking monomer VIII and/or XI, followed by saponification to produce the ionic polymers.

For example, poly(lactone) VII and VIIb can be obtained by polymerization of the lactone monomer III with at one additional monomer, for example a crosslinking monomer of formula VIII.

VIII

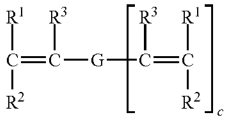

In formula VIII, $R^1$, $R^2$, and $R^3$ are each independently hydrogen or $C_{1-4}$ alkyl. In an embodiment, $R^1$ and $R^2$ are hydrogen and $R^3$ is a $C_{1-4}$ alkyl, specifically methyl. In another embodiment, $R^1$, $R^2$, and $R^3$ are each hydrogen.

The group G in formula VIII is the same as in formula VI, and c=1-5, specifically 1-4, still more specifically 1-3. In particular, G in formula VIa can be a single bond or a $C_{1-30}$ hydrocarbyl group having a valence c, for example a $C_{1-12}$ alkyl substituted with 0-6 oxycarbonyl groups, 0-6 aminocarbonyl groups, or a combination comprising at least one of the foregoing, $C_{2-12}$ alkenyl substituted with 0-6 oxycarbonyl groups, 0-6 aminocarbonyl groups, or a combination comprising at least one of the foregoing, $C_{2-12}$ alkynyl substituted with 0-6 oxycarbonyl groups, 0-6 aminocarbonyl groups, or a combination comprising at least one of the foregoing, $C_{3-8}$ cycloalkyl substituted with 0-4 oxycarbonyl groups, 0-4 aminocarbonyl groups, or a combination comprising at least one of the foregoing, $C_{3-8}$ heterocycloalkyl substituted with 0-4 oxycarbonyl groups, 0-4 aminocarbonyl groups, or a combination comprising at least one of the foregoing, $C_{6-12}$ aryl substituted with 0-6 oxycarbonyl groups, 0-6 aminocarbonyl groups, or a combination comprising at least one of the foregoing, $C_{4-12}$ heteroaryl substituted with 0-4 oxycarbonyl groups, 0-4 aminocarbonyl groups, or a combination comprising at least one of the foregoing, $C_{2-24}$ ($C_{1-4}$ alkyloxy)$_e$ ($C_{1-4}$alkyl)) groups wherein e=1-16 substituted with 0-6 oxycarbonyl groups, 0-6 aminocarbonyl groups, or a combination comprising at least one of the foregoing.

Exemplary crosslinking monomers of formula VIII include N,N'—($C_{1-12}$alkyl)bisacrylamide, N,N'—($C_{1-12}$alkyl)bismethacrylamide, a di-, tri-, tetra-, penta-, or hexa(meth) acrylic ester of a $C_{1-12}$ polyol, a di-, tri-, tetra-, penta- or hexa(meth)acrylic ester of a $C_{1-24}$ alkyleneoxide polyol, a mono-, di-, tri-, tetra-, or higher polyester of a mono- di-, tri-, tetra-, or higher carboxylic acid having 2-6 terminal unsaturations, a di-, tri-, tetra-, penta-, or hexa(meth)allyl($C_{1-12}$ alkane), and di-, tri-, and tetravinyl substituted $C_{6-12}$ aryl compounds. A combination of different ethylenically unsaturated groups can be used, for example a combination of an ally group and a (meth)acryloyl group.

Specific exemplary crosslinking monomers VIII include N,N-methylene bisacrylamide, N,N'-methylenebismethacrylamide, 1,2-, 1,3-, and 1,4-butanediol di(meth)acrylate, ethyleneglycol diacrylate, ethyleneglycol dimethacrylate, propylene glycol diacrylate, propylene glycol dimethacrylate, diethyleneglycol diacrylate, diethyleneglycol dimethacrylate, triethyleneglycol diacrylate, triethyleneglycol dimethacrylate, polyethyleneoxide glycol diacrylate, polyethyleneoxide glycol dimethacrylate, dipropyleneglycol diacrylate, dipropyleneglycol dimethacrylate, triethyleneglycol diacrylate, triethyleneglycol dimethacrylate, glycerol diacrylate, glycerol dimethacrylate, glycerol triacrylate, glycerol trimethacrylate, 1,2- and 1,3-propanediol diacrylate, 1,2- and 1,3-propanediol dimethacrylate, 1,2-, 1,3-, 1,4, 1,5- and 1,6-hexanediol diacrylate, 1,2-, 1,3-, 1,4, 1,5- and 1,6-hexanediol dimethacrylate, 1,2- and 1,3-cyclohexanediol diacrylate, 1,2- and 1,3-cyclohexanediol dimethacrylate, pentaerythritol diacrylate, pentaerythritol dimethacrylate, pentaerythritol triacrylate, pentaerythritol trimethacrylate, pentaerythritol tetraacrylate, pentaerythritol tetramethacrylate, trimethylolpropane triacrylate, trimethylolpropane trimethacrylate, ethoxylated trimethylolpropane triacrylate, ethoxylated trimethylolpropane trimethacrylate, tris (2-hydroxyethyl) isocyanurate tri(meth)acrylate, triallyl isocyanurate, allyl(meth)acrylate, pentaerythritol diallyl ether, pentaerythritol triallyl ether, pentaerythritol tetraallyl ether, diallyl ether, tetrallyloxyethane, tetrallyloxypropane, tetrallyloxybutane, divinylbenzene, divinyltoluene, divinyl xylene, trivinyl benzene, and divinyl ether. Other crosslinking monomers known in the art having two or more ethylenically unsaturated groups, in particular vinyl or allyl groups, can be used.

In another embodiment, poly(lactone) VII and VIIa can be obtained by polymerization of the lactone monomer III with at least one comonomer wherein the comonomer imparts functionality, for example a comonomer of formula XI

XI

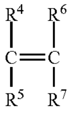

wherein $R^4$, $R^5$, $R^6$, and $R^7$ are each independently a hydrogen, $C_{1-4}$ alkyl or a substituent F, wherein at least one and no more than two of $R^4$, $R^5$, $R^6$ and $R^7$ are F as described in Formula VI, and F is the same or different in each instance. As discussed above, the substituent F is a functional group that imparts a property to ionic polymer VI. Specific examples of monomer XI include acrylic acid, methacrylic acid, fumaric acid, itaconic acid, maleic acid, maleic anhydride, itaconic anhydride, or a combination comprising at least one of the foregoing.

The relative concentration of each of the monomers in the polymerization is selected based on the desired values of u, s, and t. For example, when t is 0, the crosslinking monomer VIII is not present, and when s is 0, the functional monomer XI is not present. In an embodiment, when t is 0, the total number of u+s units=2-30,000, but in another embodiment, the total number of u+s units=2,000-30,000, or 2,555-30,000, such that the weight average molecular weight of the poly (lactone) VII and VIIa is greater than 200,000 g/mole. A combination of different crosslinking monomers VIII can be used, and a combination of different monomers XI can be used.

Methods for the polymerization of compounds with ethylenic unsaturation are known in the art. Conversion of monomer to polymer can be effected by a large number of reaction parameters such as temperature, degree of dilution, reaction time, level of active catalyst, chain length distribution, choice of solvent, choice of catalyst, and other variables. Selection of an appropriate combination of such variables to achieve a high conversion can be accomplished by routine experimentation in view of the present disclosure.

A solvent can be used during polymerization to maintain an acceptable viscosity, and is typically a polar or nonpolar aprotic solvent, for example, dimethyl formamide (DMF), benzene, tetrahydrofuran (THF), a halogenated hydrocarbon such as dichloromethane, and when emulsion polymerization is used, water. The solvent can be miscible with the polymer and other reactants, while not entering into unwanted side reactions. The amount of solvent used can vary widely and the optimum amount can be determined by routine experimentation. Too little solvent can result in excessive viscosity of the reaction mixture, sluggish reactions, and the like, while an excess can result in excessive reaction volume, excessive solvent recovery costs, and an undesirably low conversion of monomer to polymer during polymerization.

Polymerization can be batch, semi-batch, or continuous, and can include emulsion polymerization, for example. In either case, sufficient time is provided following mixing of the components and attainment of the final reaction temperature to allow the conversion of monomer to polymer to reach the desired level. Usually the desired level would be near the equilibrium conversion corresponding to the final conditions. The time to reach equilibrium varies with such conditions as temperature, viscosity, and catalyst level. The optimum reaction time can be determined for any particular combination of conditions by routine experimentation. Satisfactory results are obtained at atmospheric pressure although higher or lower pressures could be used. Emulsion polymerization can provide a polymer in water (e.g., polymer particles in water), and provide a high molecular weight polymer without the use of an organic solvent and in a process wherein isolation and recovery steps can be omitted if desired.

When emulsion polymerization is used, an anionic, nonionic, or cationic surfactant, specifically an anionic or nonionic surfactant, can be included. Representative surfactants include, but are not limited to, alkyl sulfonates, sodium dodecyl sulfate, sodium dodecylbenzene sulfonate, sorbitan fatty acid esters, ethoxylated sorbitan fatty acid esters, ethylene oxide and/or propylene oxide adducts of long chain fatty acids or alcohols, ethylene oxide and/or propylene oxide adducts of alkyl phenols, mixed ethylene oxide/propylene oxide block polymers, diblock and triblock polymers based on polyester derivatives of fatty acids and poly(ethyleneoxide), diblock and triblock polymers based on poly(ethyleneoxide) and poly(propyleneoxide), diblock and triblock polymers based on polyisobutylene succinic anhydride and poly(ethyleneoxide), or a combination comprising at least one of the foregoing. Specific surfactants include sorbitan monooleate, sorbitan sesquioleate, sorbitan trioleate, polyoxyethylene sorbitan monooleate, and surfactants sold by BASF under the Pluronic® trade name and surfactants by Uniqema under the Atlas® and Arlacel® trade names. Functional comonomers, such as acrylic acid and others known to those of skill in the art can be used to stabilize or enable the emulsion.

The chain length can be controlled by various means known to one skilled in the art, for example by control of the level of polymerization initiator present in the system during polymerization, as the average chain length tends to decrease with increases in the amount of polymerization initiator present. The polymerization initiator can be an azo compound, an inorganic peroxide, or an organic peroxide, for example. Representative polymerization initiators include 2,2'-azobis (isobutyronitrile), 2,2'-azobis(2,4-dimethylvaleronitrile), ammonium persulfate, hydroxymethanesulfinic acid, potassium persulfate, sodium persulfate, benzoyl peroxide, lauroyl peroxide, dicumyl peroxide, di-tert-butyl peroxide, and others known to those of skill in the art. The polymerization initiator can be used singly or in a combination comprising at least one of the foregoing. The polymerization initiator can be used in an amount of 0.001-10 wt. %, specifically 0.001-5 wt. %, or 0.01-1.0 wt. %, based on the total weight of the ethylenically unsaturated monomer.

In addition, ultraviolet (UV) polymerization can be employed, optionally in conjunction with a photo-initiator. Specific examples of photo-initiators can include, but are not limited to, benzophenone and substituted benzophenones, 1-hydroxycyclohexyl phenyl ketone, thioxanthones such as iso-45 propylthioxanthone, 2-hydroxy-2-methyl-1-phenylpropanl-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6-trimethylbenzoyldiphenylphosphine oxide, 2-methyl-1-[4-(meth-5-ylthio)phenyl]-2-morpholinopropan-1-one, 2,2-dimethoxyl, 2-diphenylethan-1-one or 5,7-diiodo-3-butoxy-6-fluorone, diphenyliodonium fluoride and triphenylsulfonium hexafluophosphate. A combination comprising at least one of the foregoing can be used. Suitable photo-initiators are disclosed in CRIVELLO, J. V., et al. VOLUME III: Photoinitiators for Free Radical Cationic and Anionic Photopolymerization, 2nd Edition, edited by BRADLEY, G., London, UK: John Wiley and Sons Ltd, 40 1998, pp. 287-294.

Also, the polymer chain lengths can be controlled by adding a chain transfer agent. Representative chain transfer agents include alcohols such as methanol, ethanol, 1-propanol, 2-propanol, butyl alcohol, glycerol, or polyethyleneglycol, sulfur compounds such as alkylthiols, thioureas, sulfites, or disulfides, carboxylic acids such as formic or malic acid, or their salts or phosphites such as sodium hypophosphite or sodium formate. A combination comprising at least one of the foregoing can be used. See Berger et al., "*Transfer Constants to Monomer, Polymer, Catalyst, Solvent, and Additive in Free Radical Polymerization*," Section II, pp. 81-151, in "*Polymer Handbook*," edited by J. Brandrup and E. H Immergut, 3d edition, John Wiley & Sons, New York (1989) and George Odian, *Principles of Polymerization*, second edition, John Wiley & Sons, New York (1981). When emulsion polymerization is used, the chain length can be controlled, for example, by the surfactant concentration, monomer concentration, the initiator, or chain transfer agent, if present.

It has been found that all or a portion of the ring-opened units of ionic polymers I and VI can be contacted with acid to cause ring-closure and reform the poly(lactone) units. For example, ionic polymer I can be contacted with an acid to reform 1-99 mol %, specifically 10-90 mol %, more specifically 20-80 mol % of the lactone units of the poly(lactone) II. For example, ionic polymer VI can be contacted with an acid to reform 1-99 mol %, specifically 10-90 mol %, more specifically 20-80 mol % of the lactone units of the poly(lactone) II and poly(lactone) VII. The acid can be a carboxylic acid, such as formic acid, acetic acid, or oxalic acid, or a diacid such as citric acid or malic acid, for example. The acid can also be a strong acid such as $H_2SO_4$, HCl, HF, HI, and the like.

As described above, when t is 1 or greater, the ionic polymers VI are a crosslinked product of the monomers used to manufacture the ionic polymers. In addition to crosslinking that occurs during manufacture, the ionic polymers I and VI (which includes VIa, Ib, and VIc) can be further crosslinked ("post-crosslinked") by a variety of mechanisms. For example, the ionic polymers I and VI can undergo intramolecular crosslinking at elevated temperature, in particular crosslinking between a hydroxyl group of one hydrolyzed lactone and the carbonyl group of a lactone, as shown schematically at IX.

IX

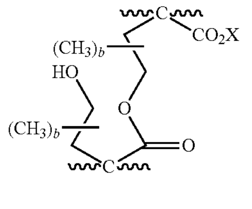

This type of crosslinking occurs between hydroxyl groups and lactone groups that are pendant from the polymer backbone. In another embodiment, crosslinking of this type is shown schematically at X, in a polymer containing units derived from lactone III and from acrylic acid.

X

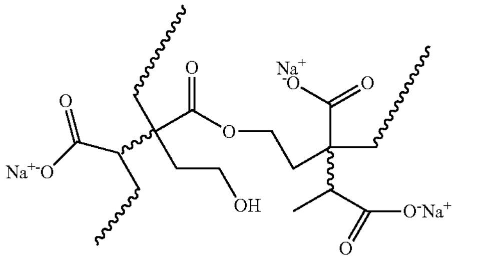

Crosslinking can be carried out, for example at 40-120° C., specifically 40-110° C. Crosslinking can be carried out at even higher temperatures, provided that the ionic polymer is not substantially degraded. Crosslinking can also be carried out at lower temperatures, but is slower. The crosslinking can occur in 0.01-100 hours, specifically 0.02-50 hours, or 5 minutes to 1 hour, to provide the desired degree of crosslinking. In some embodiments, the crosslinking can proceed through hydroxyl and/or carboxyl groups of the units containing F.

Such crosslinking can be particularly useful in ionic polymers VI wherein the crosslinking monomers contain ester groups such as (meth)acrylates. In this embodiment, the new ester crosslinking groups can be formed between the hydroxyl groups derived from ring-opening of the lactone and/or any hydrolyzed hydroxyl groups of the crosslinking monomer, with the lactone and/or any carboxyl groups derived from the crosslinking monomer and/or any carboxy groups derived from the (meth)acrylic monomer.

Alternatively, ionic polymers I and VI can be post-crosslinked by a crosslinking agent. The crosslinking agent can be any substance that promotes or regulates intermolecular covalent bonding between the polymer chains. The crosslinking agent can be a monomer or an oligomer that reacts with the hydroxyl, carboxyl, and/or lactone groups of ionic polymer; with functional groups derived from units containing F, when present; and/or functional groups derived from the crosslinking monomer. Exemplary crosslinking agents include polyisocyanates, including polyisocyanate oligomers, various diols and higher polyols, diamines and higher amines, di- or polymeric epoxides, and aminoalcohols, compounds having at least two sites of ethylenic unsaturation, as well as dicarboxyl and higher carboxylic acids and their $C_{1-3}$alkyl esters and acid halides. Such crosslinking produces crosslinked ionic polymers that can have crosslinks in the q, r, or s units. The crosslinks can accordingly form between the hydroxyl or carboxyl groups of the q units, the lactone groups of the r units, or the F groups of the s units. The crosslinks are the crosslink residues of the polyisocyanates, including polyisocyanate oligomers, various diols and higher polyols, diamines and higher amines, di- or polymeric epoxides, and aminoalcohols, compounds having at least two sites of ethylenic unsaturation as well as dicarboxyl and higher carboxylic acids and their $C_{1-3}$alkyl esters and acid halides.

Conditions for reaction of polyols and carboxylic acids with diisocyanates and higher isocyanates are known, and can be effected by contacting ionic polymer I and optionally another polyol and the appropriate stoichiometry of a di- or polyisocyanate and causing a reaction to occur by heating and/or with a catalyst to accelerate the reaction. Non-limiting examples of catalysts for making the polyurethanes and polyisocyanate compounds include tin catalysts such as dibutyl tin dilaurate, and tertiary amines such as 1,4-diazabicyclo[2.2.2]octane (DABCO™, TED), and the like. The reaction can be carried out in the presence of an inert solvent, which can optionally be removed at the end of the reaction by distillation or extraction. Non-limiting examples of organic polyisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)methane, 2,4'-dicyclohexyl-methane diisocyanate, 4,4'-dicyclohexyl-methane diisocyanate, 1,3-bis-(isocyanatomethyl)-cyclohexane, 1,4-bis-(isocyanatomethyl)-cyclohexane, bis-(4-isocyanato-3-methyl-cyclohexyl)methane, a,a,α',α'-tetramethyl-1,3-xylylene diisocyanate, a,a,α',α'-tetramethyl-1,4-xylylene diisocyanate, 1-isocyanato-1-methyl-4(3)-isocyanatomethyl cyclohexane, 2,4-hexahydrotolylene diisocyanate, 2,6-hexahydrotolylene diisocyanate, 1,3-phenylene diisocyanate, 1,4-phenylene diisocyanate, 2,4-tolylene diisocyanate, 2,6-tolylene diisocyanate, 2,2'-diphenylmethane diisocyanate, 2,4'-diphenylmethane diisocyanate, 4,4'-diphenylmethane diisocyanate, or 1,5-diisocyanato naphthalene. A combination comprising at least one of the foregoing can be used. The organic polyisocyanate can also be in the form of a polyisocyanate adduct. The polyisocyanate adducts include those containing isocyanurate, uretdione, biuret, urethane, allophanate, carbodiimide and/or oxadiazinetrione groups. Examples of polyisocyanate cross-linkers used in coatings and adhesives for outdoor applications where exterior durability is required are bis(4-isocyanatocyclohexyl)methane, the isocyanurate trimers of 1,6-hexanediisocyanate and isophorone diisocyanate, the biuret of 1,6-hexanediisocyanate, and the uretdione of 1,6-hexanediisocyanate. Specific polyisocyanates include diphenylmethane-4,4'-diisocyanate, the reaction product of trimethylolpropane with toluene diisocyanate, and the isocyanurate trimer of toluene diisocyanate.

When a diol or higher polyol is used, the ionic polymer I, VI, VIa, and VIb can be converted to the acid/lactone form, by ion exchange for example, and then contacted with the diol or higher polyol to crosslink the ionic polymer at the lactone group of the ionic polymer. Conditions for such esterification and transesterification reactions are known. Non-limiting examples of polyols include 1,2-ethanediol (ethylene glycol), 1,2-propanediol (propylene glycol), 1,3-propanediol, 2,2-dimethyl-1,3-propanediol(neopentyl glycol), 2-butyl-2-ethyl-1,3-propanediol, 3-mercaptopropane-1,2-diol (thioglycerol), dithiothreitol, 1,2-butanediol, 1,3-butanediol, 1,4-butanediol, 2,3-butanediol, 1,5-pentanediol, 3-methyl-1,5-pentanediol, 1,6-hexanediol, 2-ethyl-1,3-hexanediol, cyclohexane-1,2-diol, cyclohexane-1,4-diol, 1,4-dimethylolcyclohexane, 1,4-dioxane-2,3-diol, 3-butene-1,2-diol, 4-butenediol, 2,3-dibromobutene-1,4-diol, 1,8-octanediol, 1,10-decanediol, 1,12-dodecanediol, benzene-1,2-diol (catechol), 3-chlorocatechol, indane-1,2-diol, tartaric acid, and 2,3-dihydroxyisovaleric acid, diethylene glycol (DEG), methylene glycol, tetraethylene glycol, dipropylene glycol, tripropylene glycol, tetrapropylene glycol, xylene glycol, 1,3-benzenediol (resorcinol), 1,4-benzenediol (hydroquinone), o-, m-, or p-benzene dimethanol, o-, m-, or p-glycol phthalates, o-, m-, or p-bis-1,2-ethylene glycol phthalates, o-, m-, or p-bis-1,2-propylene glycol phthalates, o-, m-, or p-bis-1,3-propylene glycol phthalates, diols prepared by hydrogenation of dimer fatty acids, hydrogenated bisphenol A, hydrogenated bisphenol F, propoxylated bisphenol A, isosorbide, 2-butyne-1,4-diol, 3-hexyne-3,5-diol (SURFYNOL® 82, available from Air Products of Allentown, Pa.) and other alkyne-based polyol products marketed under the SURFYNOL® brand name by Air Products of Allentown, Pa. Polyether or polyester diols or polyols can be used, for example polyalkylene ethers such as polyethylene glycol, polypropylene glycol, polybutylene glycol, polyethylene polypropylene glycol, the oligomeric and polymeric ethers available under the trade name VORANOL from Dow, and the like.

A non-limiting example of crosslinking a saponified ionic polymer fragment containing pendant lactone groups with a crosslinking agent (1,1,1-trimethylol propane) is shown schematically at XII.

XII

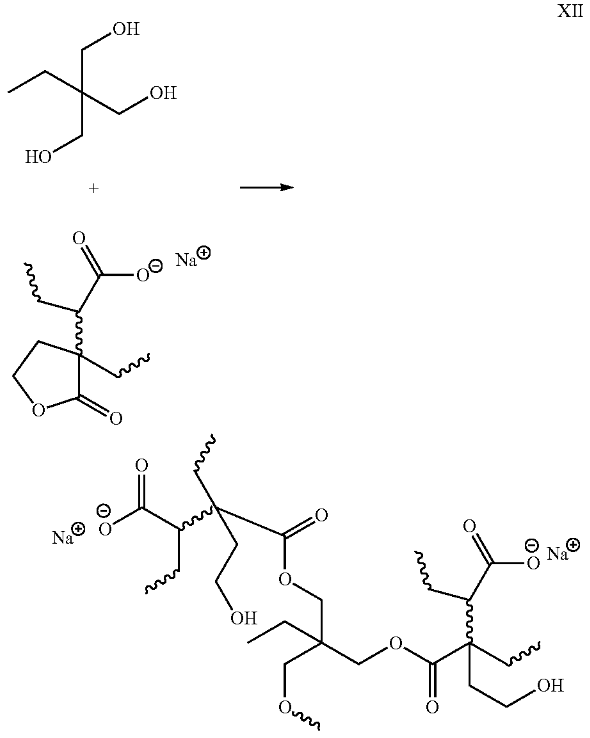

As can be seen in XII, a first hydroxyl group of the crosslinking agent reacts with a carbonyl group of a lactone, while a second hydroxyl group of the crosslinking agent reacts with another carbonyl group of another lactone, to crosslink the two polymer fragments.

When a diamine or higher amine is used, the metal-neutralized, ionic polymer can be first converted to the acid form, by ion exchange with a strong acid resin for example, and then contacted with the diamine or higher amine to crosslink ionic polymer at the carboxyl group of ionic polymer, to form water as a byproduct by amidation methods known in the art. Nonlimiting examples of polyamine crosslinking agents include primary or secondary diamine or polyamines in which the radicals attached to the nitrogen atoms can be saturated or unsaturated, aliphatic, alicyclic, aromatic, aromatic-substituted-aliphatic, aliphatic-substituted-aromatic, or heterocyclic. Nonlimiting examples of aliphatic and alicyclic diamines include 1,2-ethylene diamine, 1,2-propylene diamine, 1,8-octane diamine, isophorone diamine, or propane-2,2-cyclohexyl amine. Nonlimiting examples of aromatic diamines include the phenylene diamines and toluene diamines, for example o-phenylene diamine and p-toluene diamine. Representative commercially available polyamines include those available Huntsman Corp., of Houston, Tex. under the designation JEFFAMINE. Representative diamines and polyamines (e.g., tri-, tetra-, and pentamines) useful in crosslinking include JEFFAMINE D-230 (molecular weight 230), JEFFAMINE D-400 (molecular weight 400), and JEFFAMINE D-2000 (molecular weight 2000), JEFFAMINE XTJ-510 (D-4000) (molecular weight 4000), JEFFAMINE XTJ-50 (ED-600) (molecular 60 weight 600), and JEFFAMINE XTJ-501 (ED900) (molecular weight 900), for example. In another embodiment a diamine is used to react with two lactone groups of the polymer to form a di-amide crosslinked polymer.

In still another embodiment, an aminoalcohol can be used to crosslink ionic polymer. Exemplary aminoalcohols are include a primary or secondary amino groups and a primary or secondary hydroxyl group linked by a saturated or unsaturated, aliphatic, alicyclic, aromatic, aromatic-substituted-aliphatic, aliphatic-substituted-aromatic, or heterocyclic $C_{1-18}$ radical.

When a dicarboxylic or higher carboxylic acid (or acid halide or $C_{1-3}$ alkyl ester thereof) is used to crosslink the ionic polymer, the ionic polymer can be contacted with the dicarboxyl or higher carboxylic acid (or the $C_{1-3}$ alkyl ester or carboxylic halide thereof) to react at the hydroxyl group, to form water, a $C_{1-3}$ alcohol, or hydrogen halide as a byproduct. Conditions for such esterification, trans-esterification, or nucleophilic addition are known. Exemplary dicarboxylic acids include $C_{4-32}$ linear or branched saturated or unsaturated aliphatic dicarboxylic acids, $C_{8-20}$ aromatic dicarboxylic acids, polyether dicarboxylic acids, dimethyl terephthalate, or the like, as well as the corresponding $C_{1-3}$ alkyl esters and carboxylic halides, or a combination comprising at least one of the foregoing. Exemplary aliphatic dicarboxylic acids include succinic acid, adipic acid, sebacic acid, decane dicarboxylic acid, malonic acid, glutaric acid, adipic acid, pimelic acid, suberic acid, azelaic acid, dodecanedioic acid, brassylic acid, α,β-diethylsuccinic acid, α-butyl-α-ethyl glutaric acid, and the like as well as the corresponding $C_{1-3}$ alkyl esters and carboxylic halides. Exemplary aromatic dicarboxylic acids include phthalic acid, terephthalic acid, isophthalic acid, and the like, as well as the corresponding $C_{1-3}$ alkyl esters and carboxylic halides. Exemplary polyether dicarboxylic acids can include polyalkylene ethers such as polyethylene glycol, polypropylene glycol, polybutylene glycol, polyethylene polypropylene glycol, and the like, as well as the corresponding $C_{1-3}$ alkyl ester carboxylic halides.

When the group F includes a site of unsaturation, compounds having at least two sites of ethylenic unsaturation can be used for crosslinking, including compounds of formula III, the crosslinking monomer. Conditions for crosslinking include those used for polymerization as described above.

Alternatively, post-crosslinking can be provided by use of a base comprising a multi-valent metal, such as a divalent or trivalent metal, such as $Ca^{2+}$, for example. Thus if the base is $Ca(OH)_2$, the crosslinked polymer can include polyvalent crosslink units, as shown in formula XII.

XII

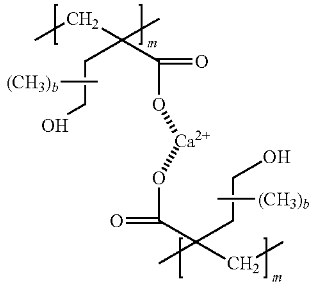

The multi-valent metal can be of Groups IA, IIA, IIIA, IVA, VA, IIB, IVB, VIIB, and VIIIB of the Periodic Table of the Elements. Specific metals include alkaline earth metals. In another embodiment, the multi-valent metal is an ion of Mg, Ca, Sr, Ba, Cs, Rb, Al, Ge, Sn, Sb, Bi, Zn, Ti, Zr, Mn, Fe and/or Ce, and still more specifically Ca, and/or Zn. The maximum content of the metal ion will be m/z, where z is the valence of the metal. In some embodiments, not all carboxyl groups are crosslinked. Ionic polymers VIa can be crosslinked by this mechanism.

The degree of crosslinking can be controlled by use of a combination of monofunctional, difunctional, or polyfunctional compounds to provide the crosslinked polymer, the relative amounts of the crosslinking agent, the number of reaction sites in the crosslinking agent, reaction conditions, and like considerations. For example, the crosslinking agent can be present in the crosslinking composition in an amount of 0.25-80 weight percent (wt. %), specifically 0.5-60 wt. %, 1 to 40 wt. %, or 1-30 wt. %, or 1-15 wt. %, based on a total weight of the ionic polymer and the crosslinking agent. In an embodiment, the residue of the crosslinking agent can be present in the crosslinked ionic polymer in an amount of 0.01-60 wt. %, specifically 0.01 to 10 wt. %, 0.05-5 wt. %, or more specifically 0.1-1 wt. %, based on the total weight of the crosslinked ionic polymer. In another embodiment, the ionic polymer is more heavily crosslinked, such that the residue of the crosslinking agent is present in an amount 10-60 wt. %, or 20-40 wt. % based on the total weight of the crosslinked ionic polymer.

Ionic polymers I, VI (which as stated above includes VIa and VIb), or the corresponding post-crosslinked ionic polymer have a wide variety of uses, depending on their properties, such as molecular weight, ratio of hydrolyzed and unhydrolyzed groups, acid number, degree of basification, counter-ion, degree of crosslinking and crosslinking agent if used. For example, ionic polymers I, VI, VIa, VIb, or the corresponding post-crosslinked ionic polymer can be used in paper manufacturing, textile finishes, oil production, plastics, coatings, personal care compositions (such as diapers, pull-ups, feminine hygiene products, incontinence products, all of which could be used as either pads or wearable garments, hair sprays and shampoo additives or superabsorbents for personal care), detergent formulations, aqueous ink compositions, semipermeable membranes, food packaging, construction materials (e.g., masonry, grout, concrete formulations, and the like, for example to retard drying time) and biomedical applications, among others. Ionic polymer I, VI, VIa, VIb, or the corresponding post-crosslinked ionic polymers can function as absorbents, adsorbents, coagulants, flocculants, coatings, drainage aids, soil conditioners, soil retention aids, horticultural additives, rheology modifiers and grease thickeners, desiccants, adhesives, or binders.

Ionic polymers I, VI, VIa, VIb, or the corresponding post-crosslinked ionic polymers can be used in specific applications such as gel mouse pads, wipes for spills, deco gel for flowers, air fresheners, wound dressings, feminine hygiene products, baby diapers, controlled release gels, horticultural or growth media for plants, or as thickening agents for example for water based paints and coatings.

When ionic polymer I, VI, VIa, VIb, or the corresponding post-crosslinked ionic polymer is to be used as a chelant, dispersant, or detergent builder, the total number of units can be 20-200, or 50-100.

As stated above, the as-synthesized ionic polymer or post-crosslinked ionic polymer can undergo ion exchange to provide a wide variety of protonated amines in addition to those listed above. When X is a long-chain protonated amine, having, e.g., a C12-C32 alkyl or a C12-C32 alkenyl, ionic polymer or crosslinked ionic polymer can be used as an additive for a detergent or shampoo.

Depending on the use, ionic polymer I, VI, VIa, VIb, or the corresponding post-crosslinked ionic polymers can be formulated with a modifying agent such as a compatible polymer, plasticizer, fragrance, colorant, desiccant, preservative, filler, or superabsorbent polymer. Ionic polymer I, VI, VIa, VIb, or the corresponding post-crosslinked ionic polymers or formulations containing these polymers, can be deposited onto fabrics, including, woven substrates, knitted substrates, or non-woven substrates of either natural fibers or synthetic fibers. They can be deposited onto filter cartridges or substrates for use in filtration systems for allergen removal, blood filtration, water purification, and the like.

In a specific embodiment, ionic polymer I, VI, VIa, VIb, or the corresponding post-crosslinked ionic polymers function as a superabsorbent polymer. A superabsorbent polymer is water-swellable and water-insoluble, and is capable of absorbing at least about 10 times its own weight, or at least about 15 times its own weight, or at least about 20 times its own weight, or at least about 25 times its own weight in an aqueous solution containing 0.9 weight percent sodium chloride. The superabsorbent polymer can further include a natural, synthetic, or modified natural polymer or material. The superabsorbent polymer differs from a desiccant in that absorbency is typically driven by osmotic pressure resulting in incorporation of water without chemical bonds, and accompanied by a substantial increase in volume of the superabsorbent material.

Ionic polymer I, VI, VIa, VIb, or the corresponding post-crosslinked ionic polymers can be used as an absorbent in an absorbent material with or without a superabsorbent polymer. In another embodiment, ionic polymer I, VI, VIa, VIb, or the corresponding post-crosslinked ionic polymer can be used as a superabsorbent in an absorbent material with or without an additional superabsorbent polymer. Ionic polymer or crosslinked ionic polymer is particularly suitable for use in applications where it is desired to absorb a salt-containing aqueous liquid. Examples of such liquids include in particular blood (such as menses) and urine. The absorbent material can be used as the filling in absorbent pads or diapers, generally in admixture with a fibrous absorbent such as cellulose fluff or in wipes or in absorbent particulates such as beads, or in garments.

In an embodiment, when ionic polymer I, VI, VIa, VIb, or the corresponding post-crosslinked ionic polymer is used to absorb saline, for example in the form of salt containing liquids such as urine or menses, there can be advantages in using ionic polymer or crosslinked ionic polymer in nonionic form. Without being bound by theory, it is believed that the of the ionic polymer is.

In another embodiment, ionic polymer I, VI, VIa, VIb, or the corresponding post-crosslinked ionic polymer can be used as an aggregant for the purpose of aggregating particles. "Aggregation" and "aggregating" as used herein includes the formation of larger particles from smaller particles or solutions by any mechanism, including coagulation (charge destabilization), flocculation (bridging of particles), and the like, and thus includes the formation of agglomerates, aggregates, coalesced particles, floccs, and the like. A method for aggregating one or more particulate materials present in an liquid phase (which includes a solution, suspension, colloid, dispersion, emulsion, and the like) comprises contacting the liquid phase with an effective amount of ionic polymer or crosslinked ionic polymer for a time sufficient to aggregate the one or more particulate materials. The liquid phase can be aqueous, for example a dispersion comprising a papermaking stock such as a pulp of a hardwood, a softwood, or a combination comprising at least one of the foregoing, a wort, a clay slurries containing suspended clay fines, or a composition to be dewatered, such as a sewage sludge, or corn stillage, for example. Other liquid phases include municipal or industrial wastewater, such as can result from mining, for example.

In a specific embodiment, the ionic polymers I, VI, VIa, VIb, or the corresponding post-crosslinked ionic polymers can be used as flocculants, i.e., a reagent for causing aggregation and precipitation of micro-sized particles. The flocculants can aggregate colloidal particles dispersed in a liquid to purify said liquid. When used as flocculants, the ionic polymers I, VI, VIa, VIb, or the corresponding post-crosslinked ionic polymers can further be used in conjunction with inorganic flocculants or flocculation assistant agents. Examples of inorganic flocculants include aluminum sulfate, aluminum polycholide, sodium aluminate, ferrous chloride, ferric sulfate, copper chloride, modified basic aluminum sulfate, activated silica, and the like, or combinations thereof. Examples of the flocculant assistant agents include slaked lime, sodium silicate, borosilicate, bentonite, flyash, and the like, or combinations thereof. The amount of flocculant for different processes differs with the composition of the solution for processing and with the combination with other starting materials and/or flocculation assistant agents. If the amount is too small, the particles of the starting material cannot be flocculated sufficiently, whereas, if the amount is too large, the proportion of the high-molecular flocculant not contributing to the flocculation is increased to lead to wastage of the flocculant. In an embodiment, the flocculant is added in an amount of 0.001 to 2000 ppm of the solution to be treated.

Ionic polymer I, VI, VIa, VIb, or the corresponding post-crosslinked ionic polymer can be useful in coating compositions, for example a coating composition for a substrate on which an ink, dye, or a surface modifier will be fixed. The coating composition can be applied to a surface to enhance attachment of an ink, dye, or other surface modifier. Ionic polymer can act as a single layer or can be used in connection with other materials, for example, as a primer layer or a topcoat. Representative coating applications include coating paper, or fabric, for example. Alternatively, ionic polymer or crosslinked ionic polymer can be used in a decorative or protective coating, such as a coating for the interior or exterior of a can, for a surface of a building, or a transport system, for example. Ionic polymer can also be used as an additive in a coating to enhance the hardness of the coating. Ionic polymer can also serve to alter the viscosity of a coating composition and/or to alter its dry time or open time when used as an additive in a coating formulation. When used as an additive in a coating composition (for example, to modify rheology, to change adhesion characteristics, or to retard dry time), a relatively low concentration of ionic polymer (e.g., less than 10 wt. %, specifically less than 5 wt. %, less than 2 wt. %, or less than 1 wt. %) can be present.

In use, the coating composition can be applied to fibrous or non-fibrous substrates. Examples of substrates include paper, paperboard, textiles, non-wovens, wood, a woven web, a knitted fabric, cellulose tissue, plastic film, a stranded composite, an elastomer net composite, a metal substrate, glass, or glass fiber, for example, or a combination comprising at least one of the foregoing substrates. Examples of plastic film substrates include those made of polypropylene, low density polyethylene, high density polyethylene ("HDPE," a polyethylene having a density of about 0.95 g/cm$^3$ or greater), linear low density polyethylene ("LLDPE," polymers of ethylene and a higher alpha-olefin comonomer such as a C3-C12 comonomer, or a combination comprising at least one of the foregoing, having a density of about 0.900-0.935 g/cm$^3$), and ultra-low density polyethylene ("ULDPE," polymers of ethylene and a higher alpha-olefin comonomer such as a C3-C12 comonomer, or a combination comprising at least one of the foregoing, having a density of about 0.860-less than 0.900 g/cm$^3$).

The water-absorbent polymers of this invention can be used in any application wherein absorption and binding of aqueous fluids is desired. In a preferred embodiment, the water-absorbent polymer particles of this invention are mixed into or attached to a structure of absorbent material such as synthetic or natural fibers or paper based woven or non-woven fibers to form a structure. In such a structure the woven or non-woven structure functions as a mechanism for wicking and transporting via capillary action the fluid to the water-absorbent polymer particles which bind and retain such fluids. Examples of such structures are diapers, adult incontinence structures, and sanitary napkins. In addition, there are various applications of the superabsorbent polymers in non-personal care applications, such as, for example, in medical care, agriculture, horticulture, gardening, fertilizer, pet litter, packaging, and food packaging.

Ionic polymer I, VI, VIa, VIb, or the corresponding post-crosslinked ionic polymer can be applied to the substrate using any suitable application process, including knife over roll coating, or roll coating, for example, to provide either a continuous coverage or a patterned coverage. Printing methods are other suitable application techniques, including gravure, screen, and jet printing. Ionic polymer I, VI, VIa, VIb, or the corresponding post-crosslinked ionic polymer can also be applied to the substrate using a spray. Specifically, a composition comprising ionic polymer or crosslinked ionic polymer can be applied to a side of a substrate by roll, pond, or fountain application and metering with a roll, rod, blade, bar, or air knife. Also applicable are gate roll, three-roll, anilox, gravure, film press, curtain, spray, and foam application methods to provide a continuous or patterned coating. Ionic polymer I, VI, VIa, VIb, or the corresponding post-crosslinked ionic polymer can also be applied by screen printing or screen coating, or by rotary screen printing or rotary screen coating, which is a combination of roll printing or coating and screen printing or coating. Ionic polymer I, VI, VIa, VIb, or the corresponding post-crosslinked ionic polymer can also be applied by brushing, foaming, or immersing, for example.

Ionic polymer I, VI, VIa, VIb, or the corresponding post-crosslinked ionic polymer and polymer, optionally as part of a coating composition, can be applied to the substrate and dried without crosslinking to form a film. Drying conditions can be selected to provide for removal of a solvent or water from the polymer without crosslinking as described in further detail below. However, in another embodiment, the polymer can be coated onto a substrate and subsequently dried and crosslinked. Alternatively, the polymer can be partially crosslinked, to provide a polymer that is insoluble but swells when contacted by a selected solvent, or the polymer can be highly crosslinked, to provide a polymer that does not significantly swell when contacted by a variety of solvents.

The moisture sensitivity or solubility of the film comprising ionic polymer I, VI, VIa, VIb, or the corresponding post-crosslinked ionic polymer can be adjusted by selection of an appropriate counter-ion. Specifically, to provide a film that is substantially insoluble in water (i.e., water resistant) and is removable (e.g., strippable), a volatile base can be used. Bases useful in the coating composition include ammonia, morpholine, diethylaminoethanol, 2-amino-2-methyl-1-propanol, sodium hydroxide, and potassium hydroxide. Representative volatile bases include ammonia, morpholine, diethylaminoethanol, and 2-amino-2-methyl-1-propanol. The base, such as ammonium hydroxide or ammonia, can be included in an amount of 0.1-10 wt. %, specifically 0.5-7 wt. %, or 1-5 wt. %, based on the total weight of ionic polymer or crosslinked ionic polymer.

Alternatively, the moisture sensitivity or solubility of the film comprising ionic polymer I, VI, VIa, VIb, or the corresponding post-crosslinked ionic polymer can be adjusted by selective reaction of the hydroxyl and/or carboxyl group with a monofunctional agent, for example a monoisocyanate, a mono-ol, or a monocarboxylic acid. The degree of reaction can be adjusted by adjusting the concentration of monofunctional agent, reaction conditions, and the like.

In another advantageous embodiment, ionic polymer I, VI, VIa, VIb, or the corresponding post-crosslinked ionic polymer acts as an adhesive binder that can provide sorptive or fluid retention properties in addition to adhesive properties. While adhesives and binders beneficially hold products together, adhesives can also have a tendency to interfere with the absorbency of fluids in absorbent products. Adhesives and binders are typically hydrophobic and therefore are not conducive to absorbency or liquid transfer functions. When water-absorbent, the crosslinked ionic polymer can be used as an absorbent binder or adhesive. Because the crosslinked ionic polymer can be less soluble in water, the crosslinked ionic polymer can maintain its binding and/or adhesive properties in the presence of water.

A binder-desiccant composition includes ionic polymer I, VI, VIa, VIb, or the corresponding post-crosslinked ionic polymer as a binder (e.g., polymer matrix), and optionally a second desiccant. Representative desiccants include compounds that absorb water and compounds that reversibly bond with water. Suitable desiccants have sufficient affinity for water to render the desiccant capable of absorbing moisture from the surrounding atmosphere. The desiccant can be an anhydrous salt that absorbs water or moisture to form a stable hydrated salt, or a capillary desiccant that comprises fine capillaries between and/or within adjacent desiccant particles to absorb moisture. Examples of the anhydrous salt include sodium sulfate, calcium sulfate, zinc chloride, zinc bromide, and calcium oxide. A combination comprising at least one of the foregoing can be used. Examples of a capillary desiccant include montmorillonite clay, a molecular sieve (e.g., a synthetic zeolite), a silica gel, and a starch. Ionic polymer I, VI, VIa, VIb, or the corresponding post-crosslinked ionic polymer can also have desiccant properties.

Alternatively, ionic polymer I, VI, VIa, VIb, or the corresponding post-crosslinked ionic polymer can be used to provide a binder-sorptive composition that includes ionic polymer I, VI, VIa, VIb, or the corresponding post-crosslinked ionic polymer as a binder component, and a sorbent component. Exemplary sorbents include inorganic solids such as metal, non-metal, or inorganic compounds, and organic solids. A combination comprising at least one of the foregoing can be used. The inorganic solid or the organic solid can be porous. Representative inorganic compounds include oxides, hydroxides, carbonates, silicates, phosphates, sulfates, and halides. Representative oxides include the oxides of aluminum, magnesium, silicon, titanium, or zirconium such as porous aluminum oxide, for example. The silicate can be fumed silica, diatomaceous earth, CELITE®, talcum, a magnesium silicate such as FLORISIL®, a zeolite such as a molecular sieve, a clay such as kaolin, mormorillonite, an organically modified montmorillonites, bentonite, or fuller's earth. Other inorganic solids having useful sorptive properties include hydroxyapatite, graphite, and activated carbon, for example.

The organic solid can be naturally occurring or chemically produced. The organic solid can comprise an organic polymer, for example a poly(hydroxyalkanoate), polylactate, polybutyrate, polyvinylpyrrolidone, and a polysaccharide. The polysaccharide can include cellulose, or a cellulose derivative, as well as agarose and an agarose derivative. Representative organic polymers include a cross-linked polystyrene resin, chemically functionalized cross-linked polystyrene, cross-linked polyacrylic, or chemically functionalized cross-linked polyacrylic. The organic solid can also comprise a chelating resin, mixed bed resin, affinity resin, or molecular imprinted polymer, for example. A combination comprising at least one of the foregoing can be used.

The binder-desiccant composition can include ionic polymer I, VI, VIa, VIb, or the corresponding post-crosslinked ionic polymer and the desiccant in dry weight ratios of 100:1-1:10, or 100:1-1:10, or 50:1-1:5, particularly 10:1-1:3, based on the total weight of the absorbent binder and the desiccant. The weight ratio ionic polymer I, VI, VIa, or the corresponding post-crosslinked ionic polymer to desiccant can vary depending on the type of polymer and desiccant used, the specific application, the amount or duration of the humidity reduction that is needed, or the temperature of the environment. Similarly, the binder-sorbent composition can include ionic polymer I, VI, VIa, or the corresponding post-crosslinked ionic polymer and the sorbent in dry weight ratios of 100:1-1:10, or 100:1-1:10, or 50:1-1:5, particularly 10:1-1:3, based on the total weight of the polymer and the sorbent. The weight ratio of ionic polymer I, VI, VIa, or the corresponding post-crosslinked ionic polymer binder to desiccant or sorbent can vary depending on the type of ionic polymer I, VI, VIa, VIb, or the corresponding post-crosslinked ionic polymer and desiccant or sorbent used, the specific application, the amount or duration of the sorbtion that is needed, or the temperature of the environment.

The ionomeric polymer ionic polymer I, VI, VIa, VIb, or the corresponding post-crosslinked ionic polymer can be combined with the desiccant or sorbent and applied to a substrate such as a release liner, as a powder, in a liquid, or in another flowable form. The substrate is not particularly limited, and representative substrates are disclosed above. After applying the combination to a substrate, the polymer can be dried and optionally crosslinked to form an absorbent binder that is bound to the substrate. The resulting polymer binder-desiccant or polymer binder-sorbent composition can comprise particles, fibers or other domains of the desiccant or sorbent dispersed within the binder. Ionic polymer I, VI, VIa, VIb, or the corresponding post-crosslinked ionic polymer binder can optionally absorb liquid (e.g., water) or vapor from the surroundings and carry it to the desiccant or sorbent via diffusion, thus reducing or eliminating the need for a channeling agent or channels. The binding feature of ionic polymer I, VI, VIa, VIb, or the corresponding post-crosslinked ionic polymer binder reduces or eliminates the need for a separate adhesive, allowing easy application and binding of the absorbent binder-desiccant or ionic polymer I, VI, VIa, VIb, or the corresponding post-crosslinked ionic polymer binder-sorbent composition to a wide variety of substrates.

The binder-desiccant structure (e.g., a film) can be included with a device, apparatus, or package, for example, to provide humidity protection, or can be joined to a substrate on a surface thereof. The binder-desiccant composition is thus useful for the coating of paper and plastic cartons for carrying food, the internal coating of lids in medicine bottles, and the internal coating of a metal, glass, or paper containers and packages to control the environment within such containers, for example.

The binder-sorptive composition can provide an immobilized sorbent which is useful for protein recovery from unclarified broths or homogenates, for example. For example, the binder-sorptive composition can provide non-fouling barrier properties that allow diffusion of the desired materials while excluding undesired colloidal solids, such as whole cells, cell debris, or macromolecular precipitates.

The invention is further illustrated by the following Examples, which are not limiting.

EXAMPLES

The following are illustrative examples in which all parts and percentages are by weight and all temperatures are in degrees Centigrade unless otherwise noted.

Number average molecular weight average (Mn), weight average molecular weight (Mw), and polydispersity were determined by gel permeation chromatography using a dimethylformamide mobile phase containing 1 wt. % LiBr relative to a poly(methyl methacrylate) (PMMA) standard, unless otherwise indicated.

Measurement of absorption under load (AUL) was determined as follows. A 100-mesh nylon screen was put onto a perforated metal plate with holes of 4 millimeters (mm) followed by a filter paper. A stainless steel cylinder with an inside diameter of 25.4 mm and wall thickness of 4 mm with a height of 50 mm whose both sides were open, was put onto the nylon screen. 167 milligrams (mg) of polymer was placed into the cylinder and evenly distributed, covered by a filter paper of a diameter of 25.4 mm. It was pressed down with a plastic piston of 25.4 mm, which carries a weight. The total weight of piston and cylinder is 106.8 g to give a 2.1 kilopascals (kPa) (0.3 pounds per square inch (psi)) load. The metal plate with the product in the cylinder on top was immersed into a 0.9% saline solution. The level of the saline solution had the same level as the nylon screen so that the filter paper and the particles could absorb water. A soak time of 1 hour was applied. The plate was then removed from the saline solution and the excess water in the holes of the plate was removed with a tissue. The weight was removed from the swollen gel and the gel was weighed. The ratio of absorbed saline solution to polymer particles was reported as the absorption under load.

Free Absorbency (tea bag method) was measured as follows. Approximately 0.25 g of dried, crushed polymer was placed in a tea bag (small Press 'N Brew tea bag from Mountain Rose Herbs of Eugene, Oreg.), which was then heat-sealed with a hot iron. The masses of the empty bag and the polymer were recorded before the start of the experiment. Beakers of the test solutions were prepared by taring the beakers, rinsing them with the test liquid (either DI water, 0.9% NaCl solution in water, or 8% NaCl solution in water), and filling with 125 g of the test liquid. A single sealed tea bag was then placed in each of the test solutions. The tea bags were periodically pulled from the test solutions by tweezers, allowed to drain until liquid no longer freely dripped, and then weighed on a tared balance. The total mass (bag+polymer+absorbed liquid) was recorded as a function of time. The amount of absorbed liquid was calculated by subtracting the starting masses of the dried bag and the dried polymer. Blank bags were soaked in separate containers of the test liquids to estimate how much liquid was absorbed by the bag. The mass uptake per gram of polymer (free absorbency capacity) was calculated according to the following equation, where $m_{blank}$ is the average absorbency of an empty tea bag in the test liquid:

$$\text{free absorbency capacity} = \frac{m_{absorbed} - m_{blank}}{m_{polymer}} \qquad \text{Equation 1}$$

Water solubility was visually assessed by dissolving 0.1 g of polymer in 1 g of water and visually assessing whether a clear solution formed or whether a gel formed.

Glass transition temperature was determined by differential scanning calorimetry (DSC) at a heating/cooling rate of 10° C./min. The sample was initially heated to 250° C. and cooled to −60° C. after a 2-minute hold at 250° C. The Tg was measured on the second scan to 250° C.

Example 1

Synthesis of ionic polymer derived from poly(α-methylene-γ-butyrolactone). Poly(α-methylene-γ-butyrolactone) was prepared by free-radical polymerization of α-methylene-γ-butyrolactone in benzene according to scheme 1.

Scheme 1

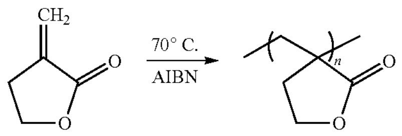

To a 250 milliliter (mL) one-neck flask was added 16.23 grams (g) (0.165 mol) freshly distilled α-methylene-γ-butyrolactone (obtained from TCI America, ≥95.0%), 200 mg (1.22 mmol) 2,2'-azobis(2-methylpropionitrile) (AIBN, obtained from Sigma-Aldrich), and 150 mL benzene. The flask was freeze-pump-thawed for 3 cycles. The flask was then heated in a 70° C. oil bath under nitrogen for 16 hours (h). A thick, light yellow suspension was formed. After the flask was cooled to room temperature, the suspension was filtered by vacuum filtration to provide poly(α-methylene-γ-butyrolactone) as a white solid powder. The white solid powder was collected, and dried overnight under vacuum (1-2 Torr) at 100° C. Total amount of solid collected: 15.69 g (yield 96.7%). The polymer was characterized by GPC and DSC: $M_n$=48,800, PDI=2.00 (mobile phase: DMF with 0.1 wt. % LiBr, PMMA standards), $T_g$=190° C. (10° C./min, second scan, under nitrogen).

Ionic polymer derived from poly(α-methylene-γ-butyrolactone) was prepared by saponification of the product of Scheme 1, according to Scheme 2.

Ionic polymer derived from poly(α-methylene-γ-butyrolactone) was prepared by saponification of the product of Scheme 1, according to Scheme 2.

Scheme 2

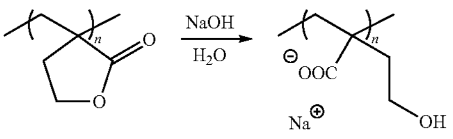

Polymer I Polymer II

To a 250 mL one-neck flask was added 15.02 g (0.153 mol repeat unit) of the white powder of Example 1, 6.15 g (0.154 mol) sodium hydroxide (obtained from Fisher Chemicals), and 190.20 g de-ionized water. The mixture was refluxed in a 110° C. oil bath for 41 hours. The light yellow reaction solution was almost clear and homogeneous, and was slightly hazy. The polymer solution was completely clear after it was filtered through a 0.45-micrometer (μm) polytetrafluoroethylene ("PTFE") filter. The water was evaporated from the polymer solution to yield ionic polymer of poly(α-methylene-γ-butyrolactone). After drying to evaporate water, the polymer is not soluble in dimethyl sulfoxide ("DMSO") or dimethylformamide (DMF).

Example 2

Synthesis of ionic polymer derived from poly(α-methylene-γ-valerolactone)

Poly(α-methylene-γ-valerolactone) was prepared by free-radical polymerization of α-methylene-γ-valerolactone in benzene according to Scheme 3.

Scheme 3

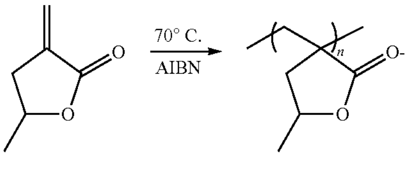

To a 100 mL one-neck flask was added 5.29 g (0.0472 mol) freshly distilled α-methylene-γ-valerolactone (obtained from TCI America), 60 mg (0.365 mmol) 2,2'-azobis(2-methylpropionitrile) (AIBN, obtained from Sigma-Aldrich), and 50 mL benzene. The flask was freeze-pump-thawed for 3 cycles. The flask was heated in a 70° C. oil bath under nitrogen for 16 hours. A white suspension was formed. After the flask was cooled down to room temperature, the suspension was filtered by vacuum filtration to yield poly(α-methylene-γ-valerolactone) as a white solid powder. The white solid powder was collected, and dried under vacuum (<1 Torr) at 100° C. overnight. Total amount of white solid powder collected: 5.07 g (yield 95.8%). The polymer was characterized by GPC and DSC: $M_g$=37,700, PDI=2.31 (mobile phase: DMF with 0.1 wt. % LiBr, PMMA standards), $T_g$=215° C. (10° C./min, second scan, under nitrogen).

Ionic polymer derived from poly(α-methylene-γ-valerolactone) was prepared by saponification of the product of Scheme 3 according to Scheme 4.

Scheme 4

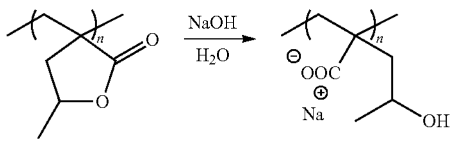

To a 100 mL one-neck flask was added 4.70 g (0.0419 mol repeat unit) of the white solid powder of Example 3 (poly(α-methylene-γ-valerolactone)), 1.69 g (0.0422 mol) sodium hydroxide (obtained from Fisher Chemicals), and 57.39 g de-ionized water. The mixture was refluxed in a 110° C. oil bath for 110 h to provide ionic polymer of poly(α-methylene-γ-valerolactone) as a white suspension. The reaction mixture comprising ionic polymer of poly(α-methylene-γ-valerolactone) was stable as a stable white suspension, at both 110° C. and room temperature.

Example 3

Synthesis of ionic polymer derived from crosslinked poly(α-methylene-γ-butyrolactone-acrylic acid-pentaerythritol tetraallyl ether)

The crosslinked polymer poly(α-methylene-γ-butyrolactone-acrylic acid-pentaerythritol allyl ether) was prepared by emulsion polymerization of α-methylene-γ-butyrolactone and acrylic acid with the crosslinking monomer pentaerythritol allyl ether. To a four neck round bottom glass flask, equipped with a mechanical stirrer and a thermocouple with a nitrogen inlet at the side of the inlet-tube and two dropping funnels was added the initial charge of 44.03 g of water and 0.51 g of a 20% solution of sodium dodecyl sulfate surfactant. Into the monomer dropping funnel a mixture of 20.8 g of α-methylene-γ-butyrolactone, 1.1 g of acrylic acid and 0.16 g of pentaerythritol allyl ether were added. Into the second dropping funnel the aqueous mixture consisting of 83.43 g water, 1.32 g 20% sodium dodecylsulfate, 0.14 g sodium persulfate and 0.17 g 20% sodium hydroxide solution were added. The initial charge was heated to 75° C. dropwise addition of the monomer was started. Dropwise addition of the aqueous mixture started 5 minutes later. The monomer feed ended 120 minutes after the start of monomer addition, and the aqueous stream ended 5 minutes after the monomer stream ended. After a cook-down time of one hour, the reaction mixture was cooled to room temperature.

Ionic polymer derived from the crosslinked poly(α-methylene-γ-butyrolactone-acrylic acid-pentaerythritol tetraallyl ether) was prepared by saponification of the polymer dispersion. To 90 g of the polymer dispersion 15.25 g of 20% sodium hydroxide solution was added and the dispersion was heated to 95° C. After 3 hours a gel formed. The gel was heated at 95° C. and a vacuum of 30 Torr overnight to dry the gel at which point a transparent film was observed on the wall of the glassware. It was then cooled down to room temperature and diluted with 900 ml of water under stirring. The gel dispersion in water was backtitrated with a 5% citric acid solution to a pH of 8.5 and dried again. It was crushed in a laboratory grinder and sieved with a 30 mesh and 50-mesh sieve. Particles between 30 and 50 mesh were used for further investigations.

2.0 g of the resulting ring-opened polymer was shaken with 400 g of DI water for 16 hours. The mixture was then filtered through a 100 μm mesh with the resulting solids being set aside. The resulting solution was re-acidified to a pH of 2 with HCl resulting in a white precipitate forming. This indicates that solubility of the polymer can be controlled by adjusting the pH of the system.

Example 4

Synthesis of ionic crosslinked polymer derived from poly(α-methylene-γ-valerolactone-acrylic acid-acrylamide-methylene bisacrylamide)

Crosslinked poly(α-methylene-γ-valerolactone-acrylic acid-acrylamide-bisacrylamide) was prepared by emulsion polymerization of α-methylene-γ-butyrolactone, acrylic acid, and acrylamide with the crosslinking monomer methylene bisacrylamide.

To a four neck round bottom glass flask, equipped with a mechanical stirrer and a thermocouple with a nitrogen inlet at the side of the inlet-tube and two dropping funnels, was added 50.34 g of water and 0.88 g of a 20% solution of sodium dodecyl sulfate surfactant. In the monomer dropping funnel a mixture of 39.64 g of α-methylene-γ-valerolactone, 2.1 g of acrylic acid and 0.21 g of a 37.1:1 mixture of acrylamide: methylene bisacrylamide ((acrylamide/methylene bisacrylamide 37.1:1, Research Organics, Cleveland, Ohio, USA) were added. Into the second dropping funnel the aqueous mixture consisting of 0.05 g sodium persulfate and 14.68 g water were added. The initial charge was heated to 75° C. and 10% of the monomer mixture was added dropwise to the reaction flask over the first 20 minutes. Then over the next 30 minutes the aqueous mixture was added dropwise. The aqueous mixture dropping funnel was then recharged with a solution of 41.95 g water, 2.94 g of 20% sodium dodecyl sulfate, 25 g of sodium persulfate and 0.31 g of 20% caustic. The rest of the monomer mixture was added to the reaction flask dropwise over the next 170 minutes and the aqueous mixture was added over the next 190 minutes. After all the feeds were finished the reaction mixture was stirred at 75° C. for an additional two hours to ensure complete conversion of the residual monomers. Ionic polymer derived from the crosslinked poly(α-methylene-γ-valerolactone-acrylic acid-acrylamide-methylene bisacrylamide) was prepared by saponification of the polymer dispersion. The polymer emulsion obtained above was dried in a vacuum oven set at 100° C. for 16 hours. 1 g of dried polymer was added 10 g of deionized water followed by addition of 1.03 g of a 20% aqueous NaOH solution. The polymer suspension was then placed in an oven set at 100° C. for 2 days. The white suspension changed to a viscous liquid.

Example 5

Synthesis of ionic polymer derived from crosslinked poly(α-methylene-γ-valerolactone-trimethylolpropane trimethacrylate-acrylic acid)

A crosslinked polymer of α-methylene-γ-valerolactone, acrylic acid, and trimethylolpropane triacrylate (TMPTA) as a crosslinking monomer was prepared by emulsion polymerization. Without being bound by theory, a proposed schematic representation of the polymer product is shown in Scheme 5.

Scheme 5

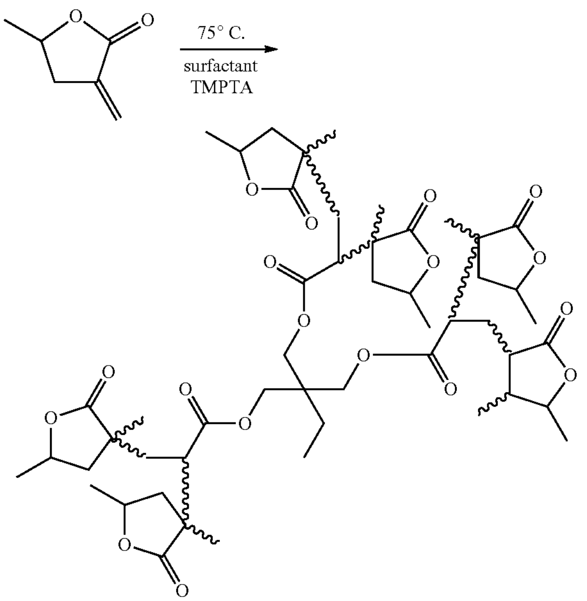

To a four neck round bottom glass flask, equipped with a mechanical stirrer and a thermocouple with a nitrogen inlet at the side of the inlet-tube and two dropping funnels, was added 30.2 grams (g) of water and 0.77 g of a 20% solution of sodium dodecyl sulfate surfactant. In the monomer dropping funnel a mixture of 35.4 g of α-methylene-γ-valerolactone, 3 g of acrylic acid and 0.5 g of trimethylol propane triacrylate (TMPTA) were added. Into the second dropping funnel the aqueous mixture consisting of 0.04 g sodium persulfate and 9.17 g water was added. The initial charge was heated to 75° C. and 10% of the monomer mixture was added dropwise to the reaction flask over the first 20 minutes. Then over the next 30 minutes the aqueous mixture was added dropwise. The aqueous mixture dropping funnel was then recharged with a solution of 22.7 g water, 2.2 g of 20% sodium dodecyl sulfate and 0.18 g of sodium persulfate. The rest of the monomer mixture was added to the reaction flask dropwise over the next 170 minutes and the aqueous mixture was added over the next 190 minutes. After all the feeds were finished the reaction mixture was stirred at 75° C. for an additional two hours to react residual monomers and obtain a dispersion. Ionic polymer derived from the crosslinked poly(α-methylene-γ-valerolactone-trimethylolpropane trimethacrylate-acrylic acid) was prepared by saponification of the obtained dispersion. The polymer emulsion obtained above was dried in a vacuum oven set at 100° C. for 16 hrs. 1 g of dried polymer was added 10 g of deionized water followed by addition of 1.03 g of a 20% aqueous NaOH solution. The polymer suspension was then placed in an oven set at 100° C. for 2 days. The white suspension changed to a viscous liquid.

Example 6

Synthesis of crosslinked poly(α-methylene-γ-butyrolactone) and its ionic Polymer To a 250 mL one-neck flask was added 5.00 g (0.051 mol) freshly distilled α-methylene-γ-butyrolactone (TCI America, ≥95.0%), 75 mg (0.255 mmol) trimethylolpropane triacrylate (Sigma-Aldrich St Louis Mo.) 61.9 mg (0.35 mmol) 2,2'-azobis(2-methylpropionitrile) (AIBN, Sigma-Aldrich), and 100 mL benzene. The flask was freeze-pump-thaw for 3 cycles. The flask was then heated in a 70° C. oil bath under nitrogen for 16 hours. A light yellow thick suspension was formed. After the flask was cooled to room temperature, the suspension was filtered by vacuum filtration. The white solid powder was collected, and dried overnight under vacuum (0.5-1.0 Torr) at 60° C. Total amount of solid collected: 4.5 g (yield 90.0%). The soluble fraction of the polymer (in DMF) was characterized by GPC $M_n$=20037, PDI=3.31 (mobile phase: DMF with 0.1 wt. % LiBr, PMMA standards). The soluble fraction of the polymer (in $DMSOd_6$) was analyzed by $^1$HNMR. 2.05 (br, 4H, —$CH_2$ repeat unit and —$CH_2$ in lactone next to repeat unit); 4.31 (br, 2H, —$CH_2$ next to lactone/ester oxygen).

To a 250 mL one-neck flask was added 4.42 g (0.045 mol repeat unit) of the above cross-linked polymer white powder, 1.8 g (0.045 mol) sodium hydroxide Fisher Chemicals), and 88 g de-ionized water. The mixture was refluxed in a 100° C. oil bath for 17 hours. The dark orange reaction solution was almost clear and homogeneous, but with a little solids. The polymer solution turned completely clear after it was filtered through a 0.45 μm PTFE filter. The solution was transferred onto a 6-inch watch glass and place in a vacuum oven set at 45° C. The solution was dried for 48 hours under vacuum. The AUL of the resulting polymer at 0.3 psi was 8.7. Free absorbency capacity (3.6 hour soak time): 81.5 (DI water) 20.9 (8.0% saline). Without being bound by theory, it is believed in that in this example, the ester crosslinker saponified, to provide a clear solution; and that the drying cycle after ring opening induced crosslinking so that the sample then formed a gel in water and was able to support a load.

Example 7

Synthesis of crosslinked ionic polymer derived from an ionic polymer derived from poly(α-methylene-γ-butyrolactone)

Ionic polymer of poly(α-methylene-γ-butyrolactone) was cross-linked according to the schematic representation in Scheme 7.

Scheme 7

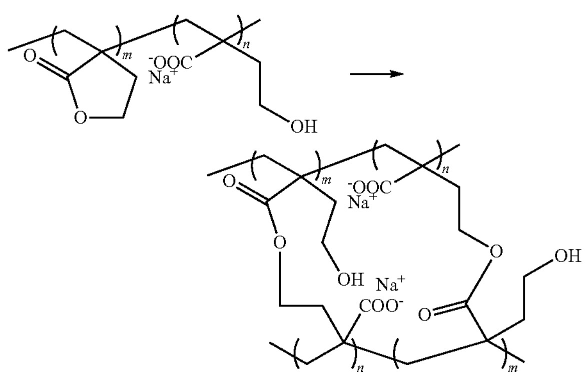

To a 6 inch watch glass was added 20 μm (7.1% solids, 0.0126 mol) solution of ionic polymer of poly(α-methylene-γ-butyrolactone) (product from Scheme 2 above). The watch glass was placed in an Isotemp vacuum oven (Fischer Scientific Model 280 A) set at 45° C. The polymer was dried under vacuum for 72 hours. AUL at 0.3 psi load was 12.0

Example 8

Synthesis of cross-linked poly(α-methylene-γ-butyrolactone-n,n'-methylene bis(acrylamide)) and its ionic polymer To a 250 mL one-neck flask was added 5.00 g (0.051 mol) freshly distilled α-methylene-γ-butyrolactone (obtained from TCI America, ≥95.0%), 39 mg (0.253 mmol) N,N'-methylene bis(acrylamide) (Sigma-Aldrich St Louis Mo., 99%) 61.9 mg (0.35 mmol) 2,2'-azobis(2-methylpropionitrile) (AIBN, Sigma-Aldrich), and 100 mL benzene. The flask was freeze-pump-thaw for 3 cycles. The flask was then heated in a 70° C. oil bath under nitrogen for 20 hours. A white thick suspension was formed. After the flask was cooled to room temperature, the suspension was filtered by vacuum filtration. The white solid powder was collected, and dried overnight under vacuum (0.5-1.0 Torr) at 60° C. Total amount of solid collected: 4.5 g (yield 90.0%). The soluble fraction of the polymer (in DMF) was characterized by GPC $M_n$=18700, PDI=3.22 (mobile phase: DMF with 0.1 wt. % LiBr, PMMA standards).

To a 10 mL scintillation vial was added 0.5 g (5.1 mmol repeat unit) of the above cross linked polymer white powder, 0.61 gm (3.1 mmol), 20% sodium hydroxide (obtained from Fisher Chemicals, USA) in water, and 2.83 mL $H_2O$ (obtained from Sigma Aldrich, St Louis, USA). The mixture was place in an isotemp oven (Fisher Scientific Model 280) set at 100° C. for 2 hours. A clear gel was observed in 2 hours. The gel was dried in a vacuum oven (30 torr) at 100° C. for 3 hours. AUL was performed on the dried polymer at 0.3 psi load AUL=6.1.

Comparative Example 9

Synthesis of Cross-Linked Poly(Acrylic Acid-Trimethylolpropane Triacrylate)

To a three neck round bottom glass flask, equipped with a mechanical stirrer and a thermocouple with a nitrogen inlet at the side of the inlet-tube was added 70.38 g of 20% caustic (0.353 mol) and 15.63 g water. Next, 26 g of acrylic acid (0.36 mol) were added slowly via a dropping funnel. After the mixture was cooled to room temperature, 0.28 g of a 40 wt. % active solution of Versenex 80 (diethylene glycol triamine pentaacetate from Aldrich) were added. Then 0.8 g trimethylolpropane triacrylate (TMPTA) were dissolved in 13.75 g acrylic acid (0.19 mol) and added to the reaction flask. The dropping funnel was taken off and the opening was covered by a septum. An amount of 0.2 ml of a 0.1% solution of $FeSO_4x7H_2O$ was added by a syringe through the septum, followed by 0.635 ml of a 10% $Na_2S_2O_8$ solution. The reaction started immediately. A gel formed. After the temperature peaked the flask was heated for another hour at 70° C. using a heating mantle. Then the aqueous gel was removed and was minced in a lab grinder. One portion was heated in a vacuum oven for 2 hours at 170° C. and a second portion was heated for several hours at 220° C. The products were ground and sieved with 30 mesh (595 μm) and 50 mesh (297 μm) sieves.

Table 1 shows the solubility in the hydrolysis media after the hydrolysis reaction, water absorption under load (AUL) and free absorbency of the polymers of the foregoing examples.

TABLE 1

| Ex. | Solubility | AUL | Free absorbency 0.9% saline After 30 min | Free absorbency 0.9% saline After 2 hours | Free absorbency Distilled water After 30 min | Free absorbency Distilled water After 2 hours |
|---|---|---|---|---|---|---|
| 1 | Soluble | — | — | — | — | — |
| 2 | ** | — | — | — | — | — |
| 3 | Gel | 15.7 | 22.3 | 19.1 | 50.8 | 65.2 |
| 4 | soluble | — | — | — | — | — |
| 5 | soluble | — | — | — | — | — |
| 6 | Gel | 8.7 | | 30.6 | | 70.1 |
| 7 | Gel | 12.0 | | | | |
| 8 | Gel | 6.1 | | | | |
| 9* | Gel | 19.6 | 15.0 | 13.7 | 36.7 | 36.2 |

*Comparative
** White suspension

Example 10

Synthesis of 191 KDa poly(α-methylene-γ-butyrolactone-acrylic acid)

To a 250 mL round bottom flask equipped with a magnetic stir bar was added 44.080 g (2.45 mol) water and 0.523 g ($1.81\times10^{-3}$ mol) sodium dodecyl sulfate (20% aqueous solution). The mixture was heated under flowing nitrogen to 75° C., at which time a monomer mixture consisting of 20.81 g ($2.12\times10^{-1}$ mol) α-methylene-γ-butyrolactone that had been previously filtered over basic alumina and 1.100 g ($1.83\times10^{-2}$ mol) acrylic acid was added dropwise over 110 minutes. After 10 minutes of monomer mixture addition, an aqueous mixture consisting of 83.48 g (4.63 mol) water, 1.32 g ($4.58\times10^{-3}$ mol) sodium dodecyl sulfate (20% aqueous solution), 0.065 g ($2.73\times10^{-4}$ mol) sodium persulfate, and 0.18 g of a 20% aqueous sodium hydroxide solution was added dropwise over 110 minutes. After both the monomer and aqueous mixtures were added completely, the emulsion was allowed to stir for an additional 60 minutes, after which the reaction was cooled to room temperature and dried under vacuum at 90° C. overnight. Size exclusion chromatography yielded a weight average molecular weight of 191 kDa and a polydispersity of 1.62, relative to polystyrene standards.

Example 11

Synthesis of 507 kDa poly(α-methylene-γ-butyrolactone-acrylic acid)

To a 250 mL round bottom flask equipped with a magnetic stir bar was added 44.045 g (2.44 mol) water and 0.512 g ($1.78\times10^{-3}$ mol) sodium dodecyl sulfate (20% aqueous solution). The mixture was heated under flowing nitrogen to 74° C., at which time a monomer mixture consisting of 20.805 g ($2.13\times10^{-1}$ mol) α-methylene-γ-butyrolactone that had been previously filtered over basic alumina and 1.100 g ($1.83\times10^{-3}$ mol) acrylic acid was added dropwise over 110 minutes. After 10 minutes of monomer mixture addition, an aqueous mixture consisting of 83.37 g (4.63 mol) water, 1.32 g ($4.58\times10^{-3}$ mol) sodium dodecyl sulfate (20% aqueous solution), 0.047 g ($1.97\times10^{-4}$ mol) sodium persulfate, and 0.175 g of a 20% aqueous sodium hydroxide solution was also added via syringe pump over 110 minutes. After both the monomer and aqueous mixtures had added completely, the emulsion was allowed to stir for an additional 60 minutes, after which the reaction was cooled to room temperature and dried under vacuum at 90° C. overnight. Size exclusion chromatography yielded a weight average molecular weight of 507 kDa and a polydispersity of 1.75, relative to polystyrene standards.

Example 12

Synthesis of 817 kDa poly(α-methylene-γ-butyrolactone-acrylic acid)

To a 50 mL round bottom flask equipped with a magnetic stir bar was added 5.890 g (0.327 mol) water and 0.090 g ($3.12\times10^{-4}$ mol) sodium dodecyl sulfate (20% aqueous solution). The mixture was heated under flowing nitrogen to 74° C., at which time a monomer mixture consisting of 2.850 g ($2.91\times10^{-2}$ mol) α-methylene-γ-butyrolactone that had been previously fractionally distilled and filtered over basic alumina and 0.150 g ($2.50\times10^{-3}$ mol) acrylic acid was added via syringe pump over 130 minutes. After 10 minutes of monomer mixture addition, an aqueous mixture consisting of 11.130 g (0.618 mol) water, 0.185 g ($6.42\times10^{-4}$ mol) sodium dodecyl sulfate (20% aqueous solution), 0.002 g ($9.24\times10^{-6}$ mol) sodium persulfate, and 0.061 g of a 20% aqueous sodium hydroxide solution was also added via syringe pump over 130 minutes. After both the monomer and aqueous mixtures were added completely, the emulsion was allowed to stir for an additional 60 minutes, after which the reaction was cooled to room temperature and dried under vacuum under vacuum at 90° C. overnight. Size exclusion chromatography yielded a weight average molecular weight of 817 kDa and a polydispersity of 1.87, relative to polystyrene standards.

Example 13

Synthesis of 647 kDa poly(α-methylene-γ-valerolactone-acrylic acid)

To a 50 mL round bottom flask equipped with a magnetic stir bar was added 6.172 g (0.343 mol) water and 0.078 g ($2.70\times10^{-4}$ mol) sodium dodecyl sulfate (20% aqueous solution). The mixture was heated under flowing nitrogen to 73° C., at which point a monomer mixture consisting of 2.913 g ($2.58\times10^{-2}$ mol) α-methylene-γ-valerolactone that had been previously fractionally distilled and filtered over basic alumina and 0.154 g ($2.56\times10^{-3}$ mol) acrylic acid were added via syringe pump over 120 minutes. After 10 minutes of monomer mixture addition, an aqueous mixture consisting of 11.677 g (0.649 mol) water, 0.198 g ($6.87\times10^{-4}$ mol) sodium dodecyl sulfate (20% aqueous solution), 0.004 g ($1.68\times10^{-5}$ mol) sodium persulfate, and 0.029 g of a 20% aqueous sodium hydroxide solution was also added via syringe pump over 120 minutes. After both the monomer and aqueous mixtures were added completely, the emulsion was allowed to stir for an additional 60 minutes, after which the reaction was cooled to room temperature and dried under vacuum under vacuum at 90° C. overnight. Size exclusion chromatography yielded a weight average molecular weight of 647 kDa and a polydispersity of 2.77, relative to polystyrene standards.

Example 14

Synthesis of 931 kDa poly(α-methylene-γ-valerolactone-acrylic acid)

To a 50 mL round bottom flask equipped with a magnetic stir bar was added 7.3769 g (0.343 mol) water and 0.084 g ($2.70\times10^{-4}$ mol) sodium dodecyl sulfate. (20% aqueous solution). The mixture was heated under flowing nitrogen to 73° C., at which point a monomer mixture consisting of 3.4691 g ($2.58\times10^{-2}$ mol) α-methylene-γ-valerolactone and 0.184 g ($2.56\times10^{-3}$ mol) acrylic acid was added via syringe pump over 115 minutes. After 10 minutes of monomer mixture addition, an aqueous mixture consisting of 13.9194 g (0.649 mol) water, 0.2360 g ($6.87\times10^{-4}$ mol) sodium dodecyl sulfate (20% aqueous solution), 0.0201 g ($1.68\times10^{-5}$ mol) sodium persulfate, and 0.0376 g of a 20% aqueous sodium hydroxide solution was also added via syringe pump over 120 minutes. After both the monomer and aqueous mixtures were added completely, the emulsion was allowed to stir for an additional 60 minutes, after which the reaction was cooled to room temperature and dried under vacuum at 100° C. Analysis of the polymer by DSC showed a single $T_g$ at 210° C. Size exclusion chromatography yielded a molecular weight of 931 kDa and a PDI of 2.00.

Example 15

Addition of caustic solution to 191 kDa poly(α-methylene-γ-butyrolactone-acrylic Acid)

To a high-pressure stainless steel reactor containing 0.201 g of the 191 kDa poly(α-methylene-γ-butyrolactone-acrylic acid) prepared in Example 10 was added 3.993 g of a 10% caustic solution. The reactor was sealed tightly and placed in a 140° C. oven for 5 hours. After the allotted time, the reactor was removed and cooled to room temperature in air. The contents of the reactor were emptied into a 120 mL jar and the residual NaOH was back-titrated to pH 7 using 81 mL of 0.1 N HCl, suggesting 93% saponification of the lactone groups.

Example 16

Addition of KOH to 191 kDa poly(α-methylene-γ-butyrolactone-acrylic acid)

To a high pressure stainless steel reactor, 0.2505 g of the 191 kDa poly(α-methylene-γ-butyrolactone-acrylic acid) prepared in Example 10 sample was added along with 3.3066 g of a 4.25% KOH. The reactor was sealed and heated in a 140° C. oven for 5 hours, at which point it was cooled to room temperature. Once cool, the reactor contents were emptied into a 60 mL jar and the residual base was back-titrated to a pH of 7 with 0.1 N HCl. Using 3.0 mL of titrant, the degree of ring opening was calculated to be 73%.

Example 17

Addition of 0.1 molar equivalents based on the number of lactone groups of NaOH to 191 kDa poly(α-methylene-γ-butyrolactone-acrylic acid)

To a scintillation vial charged with 0.198 g of the 191 kDa poly(α-methylene-γ-butyrolactone-acrylic acid) prepared in Example 10 was added 0.0420 g of a 20% NaOH(aq) solution (0.1 molar equivalents based on the number of lactone groups). The vial was capped and heated at 90° C. for 2 hours before being removed from the oven and left to cool in air. The reaction had a measured pH of 7, suggesting complete conversion of the base and 10% saponification of the lactone groups.

Example 18

Addition of 0.3 molar equivalents based on the number of lactone groups of NaOH to 191 kDa poly(α-methylene-γ-butyrolactone-acrylic acid)

To a scintillation vial charged with 0.190 g of the 191 kDa poly(α-methylene-γ-butyrolactone-acrylic acid) prepared in Example 10 was added 0.1167 g of a 20% NaOH(aq) solution (0.3 molar equivalents based on the number of lactone groups). The vial was capped and heated at 90° C. for 2 hours before being removed from the oven and left to cool in air. The unreacted NaOH was back-titrated to pH 7 using 0.4 mL 0.1 N HCl, suggesting 92% conversion of the base and 27% saponification of the lactone groups.

Example 19

Addition of DMF to 191 kDa poly(α-methylene-γ-butyrolactone-acrylic acid)

To a scintillation vial equipped with a magnetic stir bar was added 0.82 g of the 191 kDa poly(α-methylene-γ-butyrolactone-acrylic acid) prepared in Example 10, 2.95 mL DMF, and 0.041 g triethylamine. The reaction was capped and stirred at 65° C. before the dropwise addition of 0.92 g of a 51% KOH solution and 7 mL water. The reaction was stirred for an additional 90 minutes before being allowed to cool and the residual base backtitrated to pH 7 with 27 mL 0.1 N HCl, suggesting 74% saponification.

Example 20

Prophetic—addition of LiOH to poly(α-methylene-γ-butyrolactone-acrylic acid)

To a high-pressure stainless steel reactor containing 0.200 g ($1.05\times10^{-6}$ mol) of the 191 kDa poly(α-methylene-γ-butyrolactone-acrylic acid) prepared in Example 10 is added 0.0451 g ($1.88\times10^{-3}$ mol) LiOH. The reactor is sealed tightly and placed in a 140° C. oven. When the reaction is complete, the reactor is cooled to room temperature in air, emptied into a 120 mL jar and the residual LiOH is back-titrated to pH 7 using 0.1 N HCl to determine the degree of ring opening. The anticipated degree of ring opening is expected to be greater than 50%.

Example 21

Prophetic-Addition of CsOH to poly(α-methylene-γ-butyrolactone-acrylic acid)

To a high-pressure stainless steel reactor containing 0.200 g ($1.05\times10^{-6}$ mol) of the 191 kDa poly(α-methylene-γ-butyrolactone-acrylic acid) prepared in Example 10 is added 0.2823 g ($1.88\times10^{-3}$ mol) CsOH. The reactor is sealed tightly and placed in a 140° C. oven. When the reaction is complete, the reactor is cooled to room temperature in air, emptied into a 120 mL jar and the residual LiOH is back-titrated to pH 7 using 0.1 N HCl to determine the degree of ring opening. The anticipated degree of ring opening is expected to be greater than 50%.

Example 22

Addition of a caustic solution to 507 kDa poly(α-methylene-γ-butyrolactone-acrylic acid)

A 0.510 g sample of the poly(α-methylene-γ-butyrolactone-acrylic acid) prepared in Example 11 with a weight-average molecular weight of 507 kDa and a polydispersity of 1.75 was added to a scintillation vial, along with 3.40 g (0.189 mol) of water and homogenized in a sonication bath to create a stable suspension of polymer particles in water. The suspension was then exposed to 24 kHz ultrasonic oscillations in 0.5-second bursts via a 14 mm titanium ultrasonic horn placed just below the liquid surface in the scintillation vial. After 5 minutes of ultrasonic agitation, 1.38 g of a 20% caustic solution was added to the vial and the reaction mixture was loosely capped and placed in a 90° C. oven for 125 minutes. The reaction cooled to room temperature under vacuum before $^{1}H$ NMR analysis. Comparison of the protons corresponding to the ring opened lactone with those of the ring close lactone showed 86% of the original lactone groups had been successfully saponified.

Example 23

Addition of a 20% NaOH solution to 507 kDa poly(α-methylene-γ-butyrolactone-acrylic acid)

To a scintillation vial charged with 0.6321 g of the 507 kDa poly(α-methylene-γ-butyrolactone-acrylic acid) prepared in Example 11 was added 4.988 g water and 1.1802 g of a 20% NaOH(aq) solution. The vial was capped and placed in a 90° C. oven for 120 minutes before removing the vial and adjusting the pH of the reaction mixture to 7 using a 5% aqueous citric acid solution before drying. The resulting dry polymer was completely soluble in water, as determined optically as a homogenous solution.

Example 24

Addition of a 50% NaOH solution to 507 kDa poly(α-methylene-γ-butyrolactone-acrylic acid)

To a scintillation vial charged with 0.4866 g of a the 507 kDa poly(α-methylene-γ-butyrolactone-acrylic acid) prepared in Example 11 was added 2.7303 g water and 1.8717 g of a 50% NaOH solution. The reaction was mixed ultrasonically using 0.5-second bursts of 24 kHz agitation for 120 minutes at 90° C. The reaction was allowed to cool to room temperature before being transferred to a 250 mL beaker and the residual NaOH was back-titrated using 171 mL of 0.1 N HCl, corresponding to 66% of the lactone rings being saponified.

Example 25

Formation of a clear poly(α-methylene-γ-valerolactone-acrylic acid) film

To a scintillation vial was added 267 mg of the poly(α-methylene-γ-butyrolactone-acrylic acid) prepared in Example 14 and 5.14 mL DMSO on a platform shaker. Once dissolved, the solution was pipetted onto a foil-lined steel panel and placed in a 100° C. oven. Vacuum was applied to remove the solvent over approximately 60 minutes. The result was a 2 cm×2 cm transparent poly(α-methylene-γ-valerolactone-acrylic acid) film.

Examples 26-30

Degree of Ring Opening of 191 kDa Poly(α-Methylene-γ-Butyrolactone-Acrylic Acid)

To a scintillation vial was added a prescribed amount of the 191 kDa poly(α-methylene-γ-butyrolactone-acrylic acid) prepared in Example 10 polymer along with approximately 1 molar equivalent of a 10% NaOH(aq) solution. The vials were capped and placed in a 95° C. oven for 120 minutes before being removed from the oven and allowed to cool to room temperature in air. The residual base was then back-titrated using 0.1 N HCl(aq) to a pH of 7. The conversion of base was calculated and used to calculate the degree of ring opening, with the results summarized in Table 2.

TABLE 2

Results of saponification as a function of reaction media dilution.

| Example | Mass Polymer (g) | Mass 10% $NaOH_{(aq)}$ solution (g) | Volume $H_2O$ Added (mL) | % Ring Opened |
|---|---|---|---|---|
| 26 | 0.2514 | 0.9930 | 2.148 | 53.0 |
| 27 | 0.2557 | 0.9940 | 0.915 | 56.9 |
| 28 | 0.2520 | 1.0190 | 0.493 | 61.0 |
| 29 | 0.2460 | 1.0010 | 0.287 | 61.1 |
| 30 | 0.2529 | 1.0002 | 0.156 | 62.1 |

As can be seen from the results in Table 2, decreasing the amount of water added results in a greater percent of rings opened.

Examples 31-32 and Comparative Examples 33-35

Post-Synthesis Crosslinking of 507 kDa Poly(α-Methylene-γ-Butyrolactone-Acrylic Acid) Through the Pendant Lactone Groups Examples 31-32 were prepared according to the following procedure. Approximately 50 mg of the 507 kDa poly(α-methylene-γ-butyrolactone-acrylic acid) prepared in Example 11 that had been dried, ground, and sieved to a particle size between 297 and 595 μm (30 and 50 mesh sieves, respectively) was added to a vial with approximately 15 mg of a 50 wt. % methanolic solution of the dinucleophile to be tested. In some cases, a catalyst was added to increase the reactivity of the crosslinking reagent. The sample was then placed in a 100° C. oven for 120 minutes or until the methanol had evaporated, whichever was longer. After removing the vials and allowing them to cool, 0.300 mL DMSO was added to each vial and the solubility or insolubility of the sample was determined optically (i.e. the sample was either optically homogeneous or optically heterogeneous). Insolubility was taken as evidence for the formation of a crosslinked network. Comparative Examples 33 and 34 were prepared in the same manor except no crosslinker solution was added. Comparative Example 35 was prepared in the same manor except no crosslinker was solution was added and the sample was not heated. The results of solubility experiments are shown in Table 3.

TABLE 3

Results of post-synthesis crosslinking experiments using dinucleophillic reagents through pendant lactone groups.

| Example | Crosslinker | Mass Polymer | Mass 50% Crosslinker Solution | Catalyst 20% $NaOH_{(aq)}$ | Time at 100° C. | Solubility in DMSO |
|---|---|---|---|---|---|---|
| 31 | 1,6-Hexanediol | 44.4 mg | 47 mg | 10 µL | 2 hr | Insoluble |
| 32 | 1,6-Hexanediamine | 51.0 mg | 16 mg | — | 2 hr | Insoluble |
| CE 33 | None | 42.2 mg | — | 10 µL | 2 hr | Soluble |
| CE 34 | None | 55 mg | — | — | 2 hr | Soluble |
| CE 35 | None | 51 mg | — | — | — | Soluble |

As can be seen from the results in Table 3, the formation of an insoluble, crosslinked polymer was observed with the addition of a crosslinker.

Examples 36-37

Prophetic-Post-Synthesis Crosslinking of 647 kDa Poly(α-Methylene-γ-Valerolactone-Acrylic Acid) Through the Pendant Lactone Groups Similar to examples 31-32, except the polymer sample to be crosslinked is a poly(α-methylene-γ-valerolactone-acrylic acid) sample similar to that prepared in Example 13. Example 36 is reacted with 1,6-hexanediol in the presence of a NaOH catalyst to yield a cross-linked, insoluble network, while Example 37 is reacted with 1,6-Hexanediamine without a catalyst also yielding a cross-linked, insoluble network. Insolubility, as in the above examples, is determined by eye as the presence of either a homogenous solution or two-phase mixture.

Examples 3840 and Comparative Examples 41-42

Post-Synthesis Crosslinking of 507 kDa Poly(α-Methylene-γ-Butyrolactone-Acrylic Acid) Using Dielectrophilic Reagents In addition to post-synthesis crosslinking through the pendant lactone groups, post-synthesis crosslinking of the saponified poly(α-methylene-γ-butyrolactone-acrylic acid) can be accomplished using dielectrophilic reagents. In these examples, the vials were charged with approximately 0.50 g of the poly(α-methylene-γ-butyrolactone-acrylic acid) prepared in Example 11 in which 67% of the lactone rings had been saponified by aqueous caustic solution at 90° C. for 120 minutes. To each vial was added approximately 40 µL of a crosslinker and the reaction mixtures were heated at 90° C. for 120 minutes. Comparative Examples 41 and 42 were prepared in the same manor except no crosslinker solution was added.

TABLE 4

Results of post-Synthesis crosslinking of partially saponified poly(α-methylene-γ-butyrolactone-acrylic acid) experiments using dielectrophilic reagents.

| Example | Crosslinker | Mass Polymer | Vol of 20% NaOH Catalyst | Vol of 50% Crosslinker solution | Time at 90° C. (hr) | Soluble in Water? |
|---|---|---|---|---|---|---|
| 38 | Diethyl Sebacate | 48 mg | 2.3 µL | 40 µL | 2 | Insoluble |
| 39 | Butanediol Diglycidyl Ether | 45 mg | 2.3 µL | 40 µL | 2 | Insoluble |
| 40 | Isophorone Diisocyanate | 51 mg | — | 80 µL | 2 | Insoluble |
| CE 41 | None | 48 mg | 2.3 µL | — | 2 | Soluble |
| CE 42 | None | 47 mg | — | — | — | Soluble |

As can be seen from the results in Table 4, the formation of an insoluble, cross-linked polymer formed in Examples 38 through 40.

Examples 43-45

Prophetic-Post-Synthesis Crosslinking of 647 kDa Poly(α-Methylene-γ-Valerolactone-Acrylic Acid) Using Dielectrophilic Reagents Similar to examples 38-41, except the polymer sample to be crosslinked is a poly(α-methylene-γ-valerolactone-acrylic acid) sample similar to that prepared in Example 18. Example 43 is cross-linked with diethyl sebacate in the presence of a NaOH catalyst to yield a cross-linked, insoluble network. Example 44 is reacted with butanediol diglycidyl ether in the presence of a NaOH catalyst, to yield a cross-linked, insoluble network. Finally, Example 45 is reacted with isophorone diisocyanate without a catalyst to yield a cross-linked, insoluble network. Insolubility, as in the above examples, is determined by eye as the presence of either a homogenous solution or two-phase mixture.

Examples 46-48

Sol-Gel Determination of Poly(α-Methylene-γ-Valerolactone-Acrylic Acid)

To a 150 mL round bottom flask equipped with a magnetic stir bar was added 11.730 g (0.651 mol) water and 0.140 g ($4.85\times10^{-4}$ mol) sodium dodecyl sulfate (20% aqueous solution). The mixture was heated under flowing nitrogen to 71° C., at which time a monomer mixture consisting of 5.561 g ($4.91\times10^{-2}$ mol) α-methylene-γ-valerolactone, 0.290 g ($4.83\times10^{-3}$ mol) acrylic acid, and either 0.2%, 0.5%, or 1.0% by weight of pentaerythritol allyl ether crosslinker (70% purity) were added dropwise over 110 minutes. After 5 minutes of monomer mixture addition, an aqueous mixture consisting of 22.270 g (1.237 mol) water, 0.355 g ($1.23\times10^{-3}$ mol) sodium dodecyl sulfate (20% aqueous solution), 0.039 g ($1.63\times10^{-4}$ mol) sodium persulfate, and 0.053 g of a 20% aqueous sodium hydroxide solution was also added dropwise over 110 minutes. After both the monomer and aqueous mixtures were added completely, the emulsion was allowed to stir for an additional 60 minutes, after which the reaction was cooled to room temperature and dried for 16 hours at 90° C. under vacuum. In each experiment, a 100-fold excess of DMF was added to the polymer sample and allowed to sit on a platform shaker for 22 hours. The DMF was then decanted and the solvent removed under vacuum to determine the mass of the soluble chains. The insoluble portion was also dried under vacuum to determine the insoluble fraction.

TABLE 5

Sol and Gel fraction determination for Examples 46-48.

| Example | Pentaerythritol Allyl Ether Loading (wt. %) | Mass Gel Fraction (g) | Mass Soluble Fraction (g) | Gel % | Sol % |
|---|---|---|---|---|---|
| 46 | 0.2% | 0.165 | <0.001 | >99% | <1% |
| 47 | 0.5% | 0.178 | <0.001 | >99% | <1% |
| 48 | 1.0% | 0.155 | <0.001 | >99% | <1% |

The results in Table 5 show the soluble and insoluble fractions obtained from three poly(α-methylene-γ-valerolactone-acrylic acid) polymerizations utilizing varying amounts of pentaerythritol allyl ether crosslinker.

Example 49

Prophetic-Synthesis of poly(α-methylene-γ-valerolactone-triallyl amine-acrylic acid) copolymer To a 150 mL round bottom flask equipped with a magnetic stir bar is added 10.00 g (0.555 mol) water and 0.115 g ($3.99\times10^{-4}$ mol) sodium dodecyl sulfate (20% aqueous solution). The mixture is pre-heated under flowing nitrogen to 75° C., at which time a monomer mixture consisting of 4.725 g ($4.18\times10^{-2}$ mol) α-methylene-γ-valerolactone, 0.250 g ($4.16\times10^{-3}$ mol) acrylic acid, and 0.036 g ($2.62\times10^{-4}$ mol) triallyl amine is added dropwise over 120 minutes. After 5 minutes of monomer mixture addition, an aqueous mixture consisting of 18.937 g (1.05 mol) water, 0.300 g ($1.04\times10^{-3}$ mol) sodium dodecyl sulfate (20% aqueous solution), 0.033 g ($1.39\times10^{-4}$ mol) sodium persulfate, and 0.037 g of a 20% aqueous sodium hydroxide solution is also added dropwise over 120 minutes. After addition of both the monomer and aqueous mixtures are complete, the emulsion stirs for an additional 60 minutes, after which the reaction is cooled to room temperature and the polymer can be dried under vacuum for isolation.

The resulting polymer can be saponified as described above.

Example 50

Prophetic-Synthesis of poly(α-methylene-γ-butyrolactone-triallyl amine-acrylic acid) copolymer Similar to Example 49, except α-methylene-γ-butyrolactone is used in place of α-methylene-γ-valerolactone.

The resulting polymer can be saponified as described above.

Example 51

Synthesis of poly(α-methylene-γ-butyrolactone-n-butyl acrylate-acrylic acid) copolymer To a 100 mL round bottom flask equipped with a magnetic stir bar was added 8.819 g (0.490 mol) water and 0.116 g ($4.02\times10^{-4}$ mol) sodium dodecyl sulfate (20% aqueous solution). The mixture was heated under flowing nitrogen to 73° C., at which time a monomer mixture consisting of 2.102 g ($2.14\times10^{-2}$ mol) α-methylene-γ-butyrolactone, 2.102 g n-butyl acrylate ($1.64\times10^{-2}$ mol) and 0.220 g ($3.66\times10^{-3}$ mol) acrylic acid was added via syringe pump over 115 minutes. After 10 minutes of monomer mixture addition, an aqueous mixture consisting of 16.711 g (0.928 mol) water, 0.267 g ($9.26\times10^{-4}$ mol) sodium dodecyl sulfate (20% aqueous solution), 0.026 g ($1.09\times10^{-4}$ mol) sodium persulfate, and 0.033 g of a 20% aqueous sodium hydroxide solution was added via syringe pump over 115 minutes. After both the monomer and aqueous mixtures were added completely, the emulsion was allowed to stir for an additional 60 minutes, after which the reaction was cooled to room temperature and dried under vacuum under vacuum at 90° C. overnight. Size exclusion chromatography yielded a monomodal peak with a weight average molecular weight of 296 kDa and a polydispersity of 2.84, relative to polystyrene standards. Differential scanning calorimetry showed a single first order transition at approximately 21° C.

The resulting polymer can be saponified as described above.

Example 52

Synthesis of poly(α-methylene-γ-butyrolactone-n-butyl acrylate-acrylic acid) copolymer Similar to Example 51, with the following exception: 3.390 g ($3.46\times10^{-2}$ mol) α-methylene-γ-butyrolactone and 1.075 g ($8.39\times10^{-3}$ mol) n-butyl acrylate were used in the monomer mixture, yielding a polymer with a glass transition temperature of 145° C. Comparison to the Fox equation suggests the statistical copolymer contains approximately 11% n-butyl acrylate repeat units.

The resulting polymer can be saponified as described above.

Example 53a and b

Prophetic-Synthesis of poly(α-methylene-γ-valerolactone-n-butyl acrylate-acrylic acid) copolymer Similar to Example 51 and Example 52, except α-methylene-γ-valerolactone is used in place of α-methylene-γ-butyrolactone.

The resulting polymer can be saponified as described above.

Example 54

Synthesis of poly(α-methylene-γ-butyrolactone-styrene-acrylic acid) copolymer To a 100 mL round bottom flask equipped with a magnetic stir bar was added 8.825 g (0.490 mol) water and 0.117 g ($4.06\times10^{-4}$ mol) sodium dodecyl sulfate (20% aqueous solution). The mixture was heated under flowing nitrogen to 73° C., at which time a monomer mixture consisting of 3.079 g ($3.14\times10^{-2}$ mol) α-methylene-γ-butyrolactone, 1.082 g styrene ($1.04\times10^{-2}$ mol) and 0.220 g ($3.66\times10^{-3}$ mol) acrylic acid was added via syringe pump over 130 minutes. After 10 minutes of monomer mixture addition, an aqueous mixture consisting of 16.694 g (0.927 mol) water, 0.269 g ($9.33\times10^{-4}$ mol) sodium dodecyl sulfate (20% aqueous solution), 0.033 g ($1.39\times10^{-4}$ mol) sodium persulfate, and 0.041 g of a 20% aqueous sodium hydroxide solution was added via syringe pump over 130 minutes. After both the monomer and aqueous mixtures were added completely, the emulsion was allowed to stir for an additional 60 minutes, after which the reaction was cooled to room temperature and dried under vacuum under vacuum at 90° C. overnight. Size exclusion chromatography yielded a monomodal peak with a weight average molecular weight of 104 kDa and a polydispersity of 1.96, relative to polystyrene standards. Differential scanning calorimetry showed a single first order transition at approximately 167° C.

The resulting polymer can be saponified as described above.

Example 55

Prophetic-Synthesis of poly(α-methylene-γ-valerolactone-styrene-acrylic acid) copolymer Similar to Example 54, except α-methylene-γ-valerolactone is used in place of α-methylene-γ-butyrolactone.

The resulting polymer can be saponified as described above.

Example 56

Synthesis of poly(α-methylene-γ-butyrolactone-acrylic acid) copolymer

To a 100 mL round bottom flask equipped with a magnetic stir bar was added 8.800 g (0.489 mol) water and 0.108 g ($3.75\times10^{-4}$ mol) sodium dodecyl sulfate (20% aqueous solution). The mixture was heated under flowing nitrogen to 73° C., at which time a monomer mixture consisting of 4.103 g ($4.18\times10^{-2}$ mol) α-methylene-γ-butyrolactone and 0.278 g ($4.63\times10^{-3}$ mol) acrylic acid was added via syringe pump over 135 minutes. After 15 minutes of monomer mixture addition, an aqueous mixture consisting of 16.661 g (0.926 mol) water, 0.282 g ($9.78\times10^{-4}$ mol) sodium dodecyl sulfate (20% aqueous solution), 0.034 g ($1.43\times10^{-4}$ mol) sodium persulfate, and 0.032 g of a 20% aqueous sodium hydroxide solution was added via syringe pump over 135 minutes. After both the monomer and aqueous mixtures were added completely, the emulsion was allowed to stir for an additional 60 minutes, after which the reaction was cooled to room temperature and dried under vacuum under vacuum at 90° C. overnight. Size exclusion chromatography yielded a monomodal peak with a weight average molecular weight of 126 kDa and a polydispersity of 2.12, relative to polystyrene standards. Differential scanning calorimetry showed a single first order transition at approximately 174° C.

The resulting polymer can be saponified as described above.

Example 57

Prophetic-Synthesis of poly(α-methylene-γ-valerolactone-acrylic acid) copolymer Similar to Example 56, except α-methylene-γ-valerolactone is used in place of α-methylene-γ-butyrolactone. The resulting polymer can be saponified as described above.

Example 58

Synthesis of poly(α-methylene-γ-butyrolactone-N,N-dimethyl acrylamide) copolymer To a 100 mL round bottom flask equipped with a magnetic stir bar was added 8.844 g (0.491 mol) water and 0.121 g ($4.20\times10^{-4}$ mol) sodium dodecyl sulfate (20% aqueous solution). The mixture was heated under flowing nitrogen to 73° C., at which time a monomer mixture consisting of 2.053 g ($2.09\times10^{-2}$ mol) α-methylene-γ-butyrolactone and 2.113 g ($2.13\times10^{-2}$ mol) N,N-dimethyl acrylamide was added via syringe pump over 120 minutes. After 10 minutes of monomer mixture addition, an aqueous mixture consisting of 16.658 g (0.925 mol) water, 0.264 g ($9.15\times10^{-4}$ mol) sodium dodecyl sulfate (20% aqueous solution), 0.029 g ($1.22\times10^{-4}$ mol) sodium persulfate, and 0.028 g of a 20% aqueous sodium hydroxide solution was added via syringe pump over 120 minutes. After both the monomer and aqueous mixtures were added completely, the emulsion was allowed to stir for an additional 60 minutes, after which the reaction was cooled to room temperature and dried under vacuum under vacuum at 90° C. overnight. Size exclusion chromatography yielded a monomodal peak with a weight average molecular weight of 200 kDa and a polydispersity of 3.32, relative to polystyrene standards. Differential scanning calorimetry showed a first order transition at approximately 162° C.

The resulting polymer can be saponified as described above.

Example 59

Prophetic-Synthesis of poly(α-methylene-γ-valerolactone-n,n-dimethyl acrylamide) copolymer Similar to Example 58, except α-methylene-γ-valerolactone is used in place of α-methylene-γ-butyrolactone.

The resulting polymer can be saponified as described above.

Example 60

Prophetic-Synthesis of poly(α-methylene-γ-butyrolactone-itaconic acid-acrylic acid)

To a 100 mL round bottom flask with a magnetic stir bar and reflux condenser is added 25 g (1.389 mol) water and 22.75 g ($1.75\times10^{-1}$ mol) itaconic acid. The mixture is heated under flowing nitrogen to 75° C., at which time a monomer mixture consisting of 17.20 g ($1.75\times10^{-1}$ mol) α-methylene-γ-butyrolactone and 2.00 g ($3.33\times10^{-2}$ mol) acrylic acid is added via syringe pump over 300 minutes at reflux. After 10 minutes of monomer mixture addition, an aqueous mixture consisting of 18.015 g (1.00 mol) water, 1.42 g ($5.97\times10^{-3}$ mol) sodium persulfate, and 1.32 g ($3.33\times10^{-2}$ mol) sodium hydroxide is added via syringe pump over 300 minutes at reflux. After both the monomer and aqueous mixtures are added completely, the emulsion is allowed to stir for an additional 60 minutes before cooling to room temperature and drying under vacuum at elevated temperature for isolation.

The resulting polymer can be saponified as described above.

Example 61

Prophetic-Synthesis of poly(α-methylene-γ-valerolactone-acrylic acid)

Similar to Example 60, except α-methylene-γ-valerolactone is used in place of α-methylene-γ-butyrolactone.

The resulting polymer can be saponified as described above.

Example 62

Prophetic—Synthesis of poly(α-methylene-γ-butyrolactone-octadecyl acrylate) copolymer To a high-pressure reactor with a magnetic stirrer is charged 31.50 g (1.75 mol) water, 13.50 g (0.232 mol) acetone, 25.0 g ($7.70\times10^{-2}$ mol) octadecyl acrylate, 25.0 g (0.255 mol) α-methylene-γ-butyrolactone, 1.25 g ($4.08\times10^{-3}$ mol) sodium stearate, and 0.13 g ($5.46\times10^{-4}$ mol) sodium persulfate. Two freeze-pump-thaw cycles using liquid nitrogen sufficiently degass the reaction medium prior to sealing the reactor and heating to 60° C. The reaction is stirred for 16 hours at 60° C. before cooling to room temperature and drying under vacuum at elevated temperature for isolation.

The resulting polymer can be saponified as described above.

Example 63

Prophetic-Synthesis of poly(α-methylene-γ-valerolactone-octadecyl acrylate) copolymer Similar to Example 62, except α-methylene-γ-valerolactone is used in place of α-methylene-γ-butyrolactone.

The resulting polymer can be saponified as described above.

Example 64

Prophetic—Synthesis of poly(α-methylene-γ-butyrolactone-acrylonitrile-p-styrene sulfonate) copolymer To a high-pressure stainless steel reactor with overhead stirring is added 7.82 g (0.147 mol) of acrylonitrile, 7.82 g ($7.97\times10^{-2}$ mol) of α-methylene-γ-butyrolactone, 0.50 g ($2.42\times10^{-3}$ mol) of sodium p-styrene sulfonate and 36.88 g (2.05 mol) of water. The reactor is purged with nitrogen and 0.78 g ($5.33\times10^{-3}$ mol) di-tert-butyl peroxide is added to the reaction mixture before the reactor is tightly closed and heated to 160° C. After 10 minutes at 160° C., the polymerization is allowed to cool to room temperature before drying the polymer under vacuum at elevated temperature for isolation.

The resulting polymer can be saponified as described above.

Example 65

Prophetic-Synthesis of poly(α-methylene-γ-valerolactone-acrylonitrile-p-styrene sulfonate) copolymer Similar to Example 64, except α-methylene-γ-valerolactone is used in place of α-methylene-γ-butyrolactone.

The resulting polymer can be saponified as described above.

Example 66

Prophetic—Synthesis of poly(α-methylene-γ-butyrolactone-butadiene-acrylic acid) copolymer A 150 mL round bottom flask with a magnetic stir bar is charged with 17 g (0.943 mol) of water, 0.01 g ($6.49\times10^{-5}$ mol) of sodium hydroxymethylsulfinate and 0.001 g ($2.63\times10^{-6}$ mol) of tetrasodium ethylene diamine tetraacetate. The reactor is heated to 80° C. under nitrogen. After 5 minutes at 80° C., 8 g of a monomer pre-emulsion consisting of 26.5 g (0.490 mol) of butadiene, 18.5 g (0.189 mol) of α-methylene-γ-butyrolactone, 1.5 g ($2.50\times10^{-2}$ mol) of acrylic acid, 1.332 g ($3.82\times10^{-3}$ mol) of sodium dodecyl benzenesulfonate (15% aqueous solution), 0.25 g ($1.24\times10^{-3}$ mol) of tert-dodecylmercaptan and 22 g (1.22 mol) of water is added by cannula over 3 minutes. Additionally, 1 g of an aqueous mixture consisting of 0.25 g ($4.20\times10^{-3}$ mol) of sodium persulfate and 7 g (0.389 mol) of water is added over 2 minutes. After stirring for 20 minutes at 80° C., the remainder of the monomer pre-emulsion and aqueous mixture is added uniformly over 300 minutes. When all additions were completed, the polymerization is allowed to stir for an additional 7 hours at 80° C. Upon completion, steam is passed through the mixture under reduced pressure and a solution of 0.25 g ($1.62\times10^{-3}$ mol) of sodium hydroxymethylsulfinate in 1 g ($5.55\times10^{-2}$ mol) of water is added slowly, with stirring. The pH of the dispersion is brought to 7 with 10% strength aqueous ammonia before the dispersion is dried under vacuum at elevated temperature for isolation.

The resulting polymer can be saponified as described above.

Example 67

Prophetic-Synthesis of poly(α-methylene-γ-butyrolactone-butadiene-acrylic acid) copolymer Similar to Example 66, except α-methylene-γ-valerolactone is used in place of α-methylene-γ-butyrolactone.

The resulting polymer can be saponified as described above.

Example 68

Prophetic—Synthesis of core-shell particles of poly (α-methylene-γ-butyrolactone-butadiene)

A 250 mL flask with stirring is charged with 42.3 g (2.35 mol) water, 0.06 g ($2.83\times10^{-4}$ mol) tripotassium phosphate, 6.53 g of a 10% $C_{14}$-$C_{18}$ unsaturated potassium salt solution, 0.54 g of a 20% solution of a disproportionate rosin acid potassium salt, 0.12 g of a 47.5% sodium naphthalene sulfonate formaldehyde active dispersion. The pH of the solution is adjusted with a 20% aqueous potash solution to between 10.5-11. To the reactor is added 1.01 g of an activator stock solution (containing 10 g (0.555 mol) water, 0.1 g ($6.49\times10^{-4}$ mol) hydroxymethane-sulfinic acid monosodium salt dihydrate, and 0.03 g ($8.17\times10^{-5}$ mol) EDTA ferric sodium complex) and 23.75 g (0.242 mol) of α-methylene-γ-butyrolactone. The reactor is purged with nitrogen before the addition of 1.25 g ($2.31\times10^{-2}$ mol) of 1,3-butadiene. The reactor is sealed and heated at 23° C. with stirring before the addition of 0.02 g of a 44% active pinane hydroperoxide solution. The seed polymerization is deemed complete when solids content reached a plateau.

Polymerization of the shell begins with the addition of 23.3 g of the above emulsion, 46.7 g (2.59 mol) water and 1.01 g of the activator stock solution from above to a 250 mL flask with stirring. The mixture is purged with nitrogen before the addition of 7.5 g (0.139 mol) 1,3-butadiene is added and the reactor is sealed and heated to 23° C. with stirring. Polymerization is initiated with the addition of 0.02 g of a 44% active pinane hydroperoxide solution. The polymerization is deemed complete when the solids content reached a plateau, at which point the core shell particles are isolated via drying at elevated temperature.

The resulting polymer can be saponified as described above.

Example 69

Prophetic-Synthesis of core-shell particles of poly(α-methylene-γ-valerolactone-butadiene)

Similar to Example 68, except α-methylene-γ-valerolactone is used in place of α-methylene-γ-butyrolactone.

The resulting polymer can be saponified as described above.

Example 70

Prophetic—Synthesis of particles with poly(α-methylene-γ-butyrolactone) core and polystyrene shell A reactor is charged with water (2358 g), seed latex (0.39 g), and sodium persulfate (3.1 g) and heated to 80° C. A monomer mixture of 382.8 g α-methylene-γ-butyrolactone, 277.2 g methacrylic acid, and 2.8 g sodium alkyl benzene sulfonate are added over 120 minutes to the initial charge. The emulsion is allowed to stir for an additional 60 minutes, after which the reactor is cooled to room temperature and the polymer core is removed A reactor is charged with 1713 g water, 192.2 g the core latex, and 3.27 g sodium persulfate and heated to 92° C. A monomer mixture of 733.6 g styrene and 8.5 g acrylic acid are added over the course of 100 minutes while simultaneously feeding an aqueous mixture of 112.3 g water and 0.71 g sodium alkylbenzene sulfonate. The emulsion is allowed to stir for an additional 60 minutes, after which the reactor is cooled to room temperature and the core/shell latex is removed.

Saponification of the core/shell latex: A high-pressure reactor is charged with 45 g water, 100 g of the core/shell latex, 0.6 g sodium alkyl sulfonate, and 0.9 g sodium hydroxide. The mixture is heated at 140° C. for 10-14 hours.

Example 71

Prophetic—Synthesis of particles with poly(of α-methylene-γ-valerolactone) core and polystyrene shell Similar to Example 70, except α-methylene-γ-valerolactone is used in place of α-methylene-γ-butyrolactone.

Example 72

Synthesis of poly(α-methylene-γ-butyrolactone-2-vinylpyridine) copolymer

To a dry 500 mL round bottom flask with a magnetic stir bar was added 1 g ($3.28\times10^{-3}$ mol) sodium oleate and 71.43 g (3.96 mol) water. The reaction is heated to 60° C. while stirring under nitrogen. After 10 minutes at 60° C., a monomer mixture consisting of 22.86 g (0.217 mol) 2-vinylpyridine and 21.33 g (0.217 mol α-methylene-γ-butyrolactone, as well as an aqueous mixture consisting of 1.14 g ($3.74\times10^{-3}$ mol) sodium oleate, 0.36 g ($9.00\times10^{-3}$ mol) NaOH, 0.36 g ($1.51\times10^{-3}$ mol) sodium persulfate, and 142.86 g (7.93 mol) water are added over 210 minutes. The polymerization is allowed to stir at 60° C. for an additional 90 minutes before cooling to room temperature and drying under vacuum for isolation.

The resulting polymer can be saponified as described above.

Example 73

Prophetic-Synthesis of poly(α-methylene-γ-valerolactone-2-vinylpyridine) copolymer Similar to Example 72, except α-methylene-γ-valerolactone is used in place of α-methylene-γ-butyrolactone.

The resulting polymer can be saponified as described above.

Example 74

Prophetic—Synthesis of poly(α-methylene-γ-butyrolactone-hydroxyethyl methacrylate-4-vinyl benzoic acid) copolymer To a 250 mL round bottom flask equipped with a magnetic stir bar is added 50 g (2.78 mol) water and 1.67 g of the surfactant Abex EP-110 (Rhodia). The mixture is heated under flowing nitrogen to 75° C., at which time a monomer mixture consisting of 14.70 g ($1.50\times10^{-1}$ mol) α-methylene-γ-butyrolactone, 19.55 g ($1.50\times10^{-1}$ mol) hydroxyethyl methacrylate, and 1.71 g ($1.16\times10^{-2}$ mol) 4-vinyl benzoic acid is added via syringe pump over 180 minutes at reflux. After 10 minutes of monomer mixture addition, an aqueous mixture consisting of 16.667 g (0.925 mol) water, 0.12 g ($5.04\times10^{-4}$ mol) sodium persulfate, is added via syringe pump over 180 minutes at reflux. After both the monomer and aqueous mixtures are completely added, the emulsion is allowed to stir for an additional 60 minutes, after which the reaction is allowed to cool to room temperature and dried under vacuum at elevated temperature for isolation.

The resulting polymer can be saponified as described above.

Example 75

Prophetic-Synthesis of poly(α-methylene-γ-valerolactone-hydroxyethyl methacrylate-4-vinyl benzoic acid) copolymer Similar to Example 74, except α-methylene-γ-valerolactone is used in place of α-methylene-γ-butyrolactone.

The resulting polymer can be saponified as described above.

Example 76

Prophetic—Synthesis of poly(α-methylene-γ-butyrolactone-n-vinyl pyrrolidone-methacrylic acid) copolymer To a 100 mL flask with stirring is added 15.1 g (0.838 mol) water, 0.3 wt. % of a phosphate ester acid surfactant at pH=6.5 (Gafac RE-410 by GAF Corporation, for example), 0.08 g ($8.87\times10^{-4}$ mol) t-butyl mercaptan, 0.02 g ($1.41\times10^{-4}$ mol) disodium pyrophosphate, 0.01 g ($4.02\times10^{-5}$ mol) sodium persulfate, 0.01 wt. % metal complexing agent (such as picolinic acid), 9.1 g ($9.28\times10^{-2}$ mol) α-methylene-γ-butyrolactone, 0.5 g ($4.50\times10^{-3}$ mol) N-vinyl pyrrolidone, and 0.3 g ($3.49\times10^{-3}$ mol) methacrylic acid. The flask is sealed and heated at 65° C. for 12 hours before cooling and drying under vacuum for isolation.

The resulting polymer can be saponified as described above.

Example 77

Prophetic-Synthesis of poly(α-methylene-γ-valerolactone-n-vinyl pyrrolidone-methacrylic acid) copolymer Similar to Example 76, except α-methylene-γ-valerolactone is used in place of α-methylene-γ-butyrolactone.

The resulting polymer can be saponified as described above.

Example 78

Synthesis of poly(α-methylene-γ-valerolactone-divinyl benzene) copolymer

To a dry 100 mL round bottom flask equipped with a magnetic stir bar was charged 1.0153 g ($8.98\times10^{-3}$ mol) α-methylene-γ-valerolactone, 16.78 g (0.215 mol) benzene, 0.0561 g ($4.31\times10^{-4}$ mol) divinyl benzene, and 0.0067 g ($4.08\times10^{-5}$ mol) azobisisobutylnitrile. The reactor was purged with nitrogen for 30 minutes before heating to 65° C. The reactor was held at 65° C. for 5 hours before letting cooling the reaction mixture to room temperature and drying under vacuum.

The resulting polymer can be saponified as described above.

Example 79

Prophetic-Ring opening of poly(α-methylene-γ-butyrolactone-styrene) copolymer

To a scintillation vial is charged 0.200 g of a poly(α-methylene-γ-butyrolactone-styrene) copolymer akin to Example 54, along with approximately 0.5 g of a 20% aqueous caustic solution. The vial is capped and placed in a 100° C. oven until the solution turns from milky to clear. Once the solution turns clear the reaction is allowed an additional 60 minutes at elevated temperature before being removed from the oven. The degree of ring opening is expected to be greater than 50% with respect to the number of lactone rings in the copolymer.

Example 80

Formation of a clear film of poly(methylene-butyrolactone-n-butyl acrylate) copolymer To a scintillation vial was charged 0.020 g of the poly (methylene-butyrolactone-n-butyl acrylate) copolymer prepared in Example 51 and 2.00 mL DMSO. The vial was capped and agitated on a platform shaker until the polymer had dissolved, at which time the solution was placed on a clean stainless steel coupon coated with aluminum foil and placed in a vacuum oven at 100° C. for 30 minutes. After baking at reduced pressure, the coupon was removed and cooled to room temperature before the film was removed. A tough, optically clear film resulted.

Example 81

Measurement of Ionic Sensitivity

The ionic sensitivity of the polymers of Examples 6 and Comparative Example 9 based on measurements after 2 hours of soak time were calculated according to the following equation:

$$f = 1 - \frac{\text{free absorbency capacity in 0.9\% saline}}{\text{free absorbency capacity in } DI \text{ water}} \quad (1)$$

TABLE 6

| Example | f |
|---|---|
| 6 | 0.35 |
| Comparative 9 | 0.62 |

The results from Table 6 show that the lower value off in example 6 demonstrates superior ionic sensitivity compared to the comparative example or in other words, more of the absorptive power of Example 6 is retained in saline versus Comparative Example 9.

As used herein, the terms “a” and “an” do not denote a limitation of quantity, but rather denote the presence of at least one of the referenced item. “Or” means “and/or.” Unless defined otherwise, technical and scientific terms used herein have the same meaning as is commonly understood by one of skill in the art to which this invention belongs. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

"Ionic polymer" as used herein refers to a polymer containing pendant carboxy groups in acid or salt form, irrespective of the relative mole % of units containing the carboxy groups.

"Crosslinked" as used herein refers to a covalent or ionic bond that links one polymer or polymer chain to another polymer or polymer chain.

"Carboxy" as used herein refers to both the acid (—COOH) and ionized (COO— or —COO—X) groups. It will be appreciated that there is an equilibrium between ionic forms of the ionized carboxy groups (i.e., when the X (e.g., amine) group has been protonated and the carboxylic acid group deprotonated) and the corresponding nonionic form (i.e., when the counter-ion (e.g., amine) and carboxylic acid groups are neutral). Ionic and nonionic forms and equilibrium mixtures thereof are all within the scope of formulas shown herein.

A "hydrocarbyl group" as used herein means a group having the specified number of carbon atoms and the appropriate valence in view of the number of substitutions shown in the structure. Hydrocarbyl groups contain at least carbon and hydrogen, and can optionally contain 1 or more (e.g., 1-8) heteroatoms selected from N, O, S, Si, P, or a combination comprising at least one of the foregoing. Hydrocarbyl groups can be unsubstituted or substituted with one or more substituent groups up to the valence allowed by the hydrocarbyl group independently selected from a $C_{1-30}$ alkyl, $C_{2-30}$ alkenyl, $C_{2-30}$ alkynyl, $C_{6-30}$ aryl, $C_{7-30}$ arylalkyl, $C_{1-12}$ alkoxy, $C_{1-30}$ heteroalkyl, $C_{3-30}$ heteroarylalkyl, $C_{3-30}$ cycloalkyl, $C_{3-15}$ cycloalkenyl, $C_{6-30}$ cycloalkynyl, $C_{2-30}$ heterocycloalkyl, halogen (F, Cl, Br, or I), hydroxy, nitro, cyano, amino, azido, amidino, hydrazino, hydrazono, carbonyl, carbamyl, thiol, carboxy ($C_{1-6}$alkyl) ester, carboxylic acid, carboxylic acid salt, sulfonic acid or a salt thereof, and phosphoric acid or a salt thereof.

"Alkyl" refers to a straight or branched chain saturated aliphatic hydrocarbyl group having the specified number of carbon atoms and the appropriate valence in view of the structure. "Alkenyl" refers to a straight or branched chain hydrocarbyl group that comprises at least one carbon-carbon double bond and the appropriate valence in view of the structure. "Cycloalkyl" refers to a groups having the indicated number of carbon atoms in the ring of the valence dictated by the structure, and that comprises one or more saturated and/or partially saturated rings in which all ring members are carbon, such as cyclopropyl, cyclobutyl, cyclopentyl, cyclohexyl, and cycloheptyl. "Cycloalkenyl" refers to a cycloalkyl group that is at least partially unsaturated. "Aryl" refers to a cyclic moiety having the appropriate valence in view of the structure, in which all ring members are carbon and at least one ring is aromatic, the moiety having the specified number of carbon atoms. More than one ring can be present, and any additional rings can be independently aromatic, saturated or partially unsaturated, and can be fused, pendant, spirocyclic or a combination comprising at least one of the foregoing.

"Alkoxy" refers to an alkyl moiety that is linked via an oxygen (i.e., —O-alkyl). Nonlimiting examples of $C_1$-$C_{30}$ alkoxy groups include methoxy groups, ethoxy groups, propoxy groups, isobutyloxy groups, sec-butyloxy groups, pentyloxy groups, iso-amyloxy groups, and hexyloxy groups. "Hetero" means a group or compound including at least one heteroatom (e.g., 1-4 heteroatoms) each independently N, O, S, Si, or P. (Meth)acryl is inclusive of both acryl and methacryl groups.

While this disclosure describes representative embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the scope thereof. Therefore, it is intended that this disclosure not be limited to the particular embodiments disclosed as the best mode contemplated for carrying out this disclosure.

What is claimed is:

1. A polymer comprising units of formula VI

VI

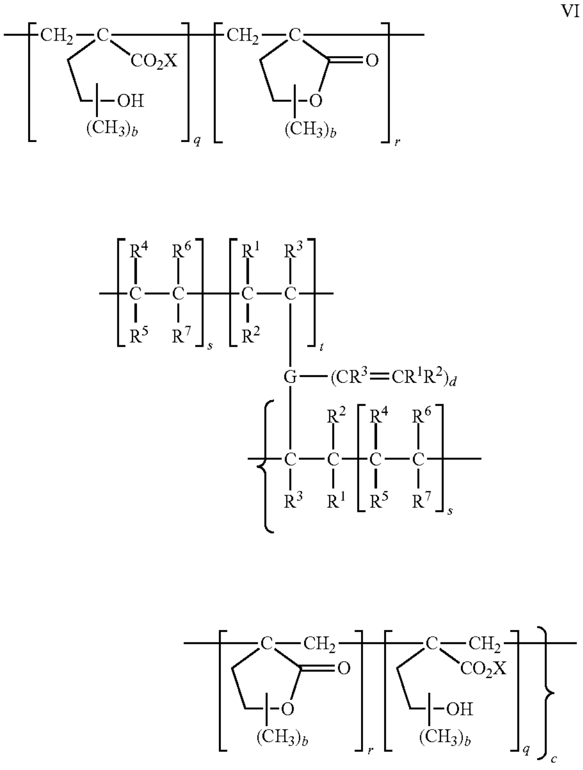

wherein each b=0 or 1;

each X is independently a hydrogen, 1/z of a metal ion of charge z, a protonated nitrogen base, or a tetrasubstituted organic ammonium compound;

the molar ratio of q:r:s:t=(99.99-0.1):(0-99.9):(0-98):(0-30), wherein s+t is at least 1;

$R^1$, $R^2$, and $R^3$ are each independently a hydrogen or $C_{1-4}$ alkyl;

$R^4$, $R^5$, $R^6$ and $R^7$ are each independently a hydrogen, $C_{1-4}$ alkyl or F, wherein F is a functional group that imparts a property to the polymer VI, at least one and no more than two of $R^4$, $R^5$, $R^6$ and $R^7$ are F and F is the same or different in each instance;

G is a single bond or a $C_{1-30}$ hydrocarbyl group; and for each instance of t when t is not zero, c=0-5 and d=0-5, provided that c+d=1-5, and wherein q, r and s as present in c are independent of any other value of q, r and s.

2. The polymer of claim 1, wherein X is a metal ion having a valence of z and is present in an amount of q/z.

3. The polymer of claim 1, wherein t is not zero, and G is a single bond or a $C_{1-12}$ alkyl substituted with 0-6 oxycarbonyl groups, 0-6 aminocarbonyl groups, or a combination comprising at least one of the foregoing, $C_{2-12}$ alkenyl substituted with 0-6 oxycarbonyl groups, 0-6 aminocarbonyl groups, or a combination comprising at least one of the foregoing, $C_{2-12}$ alkynyl substituted with 0-6 oxycarbonyl groups, 0-6 aminocarbonyl groups, or a combination comprising at least one of the foregoing, $C_{3-8}$ cycloalkyl substituted with 0-4 oxycarbonyl groups, 0-4 aminocarbonyl groups, or a combination comprising at least one of the foregoing, $C_{3-8}$ heterocycloalkyl substituted with 0-4 oxycarbonyl groups, 0-4 aminocarbonyl groups, or a combination comprising at least one of the foregoing, $C_{6-12}$ aryl substituted with 0-6 oxycarbonyl groups, 0-6 aminocarbonyl groups, or a combination comprising at least one of the foregoing, $C_{4-12}$ heteroaryl substituted with 0-4 oxycarbonyl groups, 0-4 aminocarbonyl groups, or a combination comprising at least one of the foregoing, $C_{2-24}$ ($C_{1-4}$ alkyloxy)$_e$($C_{1-4}$-alkyl)) groups wherein e=1-16 substituted with 0-6 oxycarbonyl groups, 0-6 aminocarbonyl groups, or a combination comprising at least one of the foregoing.

4. The polymer of claim 1, wherein s is not zero and $R^4$ and $R^5$ are hydrogen, $R^6$ is methyl or hydrogen, and $R^7$ is carboxylic acid.

5. The polymer of claim 1, wherein t is not zero and c=1-4.

6. The polymer of claim 1, having a weight average molecular weight of 250-3,000,000 g/mole.

7. The polymer of claim 1, wherein the polymer is water soluble in an amount of at least 10% of the polymer by weight in water.

polyol, a diisocyanate or higher isocyanate, a diamine or higher amine, a diacid or higher acid, the $C_{1-3}$alkyl esters thereof, or the acid halide thereof, a diepoxide or higher epoxide, an alcohol-amine, a compound having two or more ethylenic unsaturations, a polyvalent ion, or a combination comprising at least one of the forgoing crosslinkers.

13. The polymer of any of claim 11, wherein the at least one further crosslink exists through hydroxyl, lactone, or carboxylic acid groups of unit q.

14. The polymer of claim 11, wherein the at least one further crosslink exists through the F group of unit s.

15. A binder-desiccant comprising the polymer of claim 1; and optionally a desiccant.

16. A binder-sorptive composition comprising the polymer of claim 1.

17. The binder-sorptive composition of claim 16, further comprising a sorbent.

18. A biological fluid absorptive article comprising the binder-sorptive composition of claim 16.

19. A method of aggregating a material present in an liquid phase, comprising contacting the material in the liquid phase with an amount of the polymer of claim 1, to aggregate the one or more materials.

20. The method of claim 19, wherein the material in the liquid phase is in the form of a solution, suspension, colloid, dispersion, or emulsion.

21. A method of preparing the polymer of claim 1, the method comprising contacting a base and a polymer of formula VII under conditions effective to at least partially hydrolyze the lactones,

VII

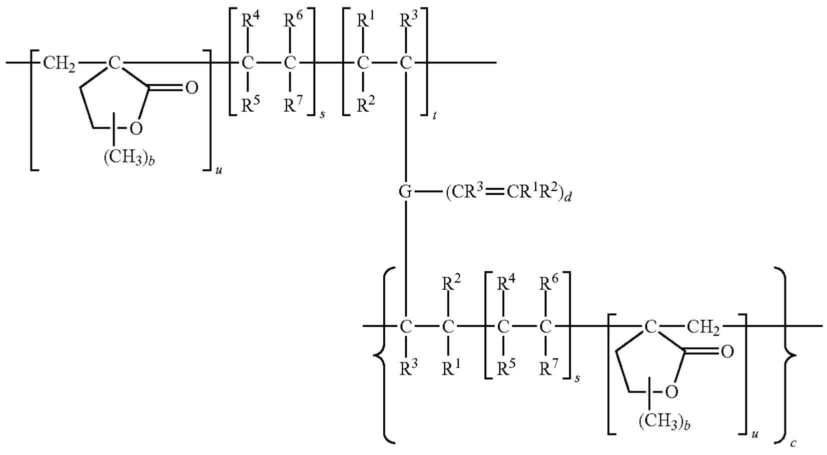

8. The polymer of claim 1, having a water absorption under a load of 3 psi of at least 0.1 gram of water per gram of ionic polymer.

9. The polymer of claim 1, having a glass transition temperature of greater than 50° C. when dried.

10. The polymer of claim 1, wherein the molar amount of q is 40-99.9.

11. A crosslinked product of the polymer of claim 1, comprising at least one further crosslink in any of the q, r, or s units.

12. The polymer of claim 11, wherein the at least one further crosslink is the crosslink residue of a diol or higher wherein each b=0 or 1;

the molar ratio of u:s:t=(99.99-20):(0-50):(0-30), wherein s+t=at least 1 and wherein u and s as present in c are independent of any other value of u and s;

$R^1$, $R^2$, and $R^3$ are each independently a hydrogen or $C_{1-4}$ alkyl;

G is a single bond or a $C_{1-30}$ hydrocarbyl group;

$R^4$, $R^5$, $R^6$ and $R^7$ are each independently a hydrogen, $C_{1-4}$ alkyl or F, wherein F is a functional group that imparts a property to the polymer VI, at least one and no more than two of $R^4$, $R^5$, $R^6$ and $R^7$ are F and F is the same or different in each instance; and for each instance of t when t is not zero, c=0-5 and d=0-5, provided that c+d=1-5; and optionally contacting the polymer with a crosslinking agent under conditions effective to crosslink the polymer.

22. The method of claim 21, wherein the molar content of the base is equal to or less than 5 times the moles of monomer units of u in the polymer.

23. The method of claim 21, wherein the base is an oxide or a hydroxide of a metal ion of Groups IA, IIA, IIIA, IVA, VA, IIB, IVB, VIIB, VIIIB, or a combination comprising at least one of the foregoing groups, or a tetra($C_{1-12}$alkyl)ammonium salt.

24. The method of claim 23, wherein the base is sodium hydroxide, calcium hydroxide, or potassium hydroxide, and the contacting is performed at a temperature of 25-200° C.

25. The method of claim 21 further comprising neutralizing the polymer after the contacting to a pH less than 9.0, and optionally drying the polymer thereafter.

26. The method of claim 21, wherein the crosslinking monomer is a diol or higher polyol, a diisocyanate or higher isocyanate, a diamine or higher amine, a diacid or higher acid, the $C_{1-3}$alkyl esters thereof, or the acid halide thereof, a diepoxide or higher epoxide, an alcohol-amine, a compound having two or more ethylenic unsaturations, a polyvalent ion, or a combination comprising at least one of the forgoing crosslinkers.

27. A polymer comprising units of formula VIa

VIa

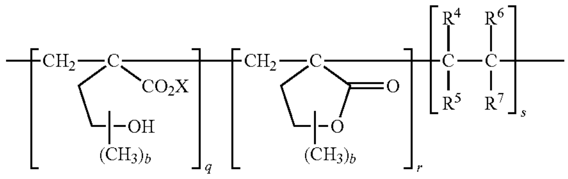

wherein each b=0 or 1;

each X is independently a hydrogen, 1/z of a metal ion of charge z, a protonated nitrogen base, or a tetrasubstituted organic ammonium compound;

the molar ratio of q:r:s=(99.99-0.1):(0-99.89):(0.01-99.9); and $R^4$, $R^5$, $R^6$, and $R^7$ are each independently a hydrogen, $C_{1-4}$ alkyl or F, wherein F is a functional group that imparts a property to the polymer VI, and at least one and no more than two of $R^4$, $R^5$, $R^6$ and $R^7$ are F and F is the same or different in each instance, provided that formula VIa comprises at least one q unit having an ionizable group or at least one s unit having an ionizable group.

28. The polymer of claim 21, wherein unit s is a polymerization residue of acrylic acid, fumaric acid, itaconic acid, maleic acid, maleic anhydride, itaconic anhydride, styrene, n-butyl acrylate, N,N-dimethyl acrylamide, octadecyl acrylate, p-styrene sulfonate, butadiene, 2-vinylpyridine, 4-vinyl benzoic acid, N-vinyl pyrrolidone, methacrylic acid, butadiene, acrylonitrile, ethylene, or a combination comprising at least one of the foregoing.

29. A cross Inked product of the polymer of claim 27, comprising at least one further crosslink in any of the q, r, or s units.

30. The polymer of claim 29, wherein the at least one further crosslink is the crosslink residue of a diol or higher polyol, a diisocyanate or higher isocyanate, a diamine or higher amine, a diacid or higher acid or the C1-3alkyl esters thereof, a diepoxide or higher epoxide, an alcohol-amine, a polyvalent ion, a compound having at least two sited of ethylenic unsaturation, or a combination comprising at least one of the forgoing crosslinkers.

31. The polymer of claim 30, wherein the at least one further crosslink exists through hydroxyl, lactone, or carboxylic acid groups of unit q.

32. The polymer of claim 30, wherein the at least one further crosslink exists through the F group of unit s.

33. A method of preparing the polymer of claim 27, the method comprising contacting a base and a polymer of formula VIIa under conditions effective to at least partially hydrolyze the lactone,

X

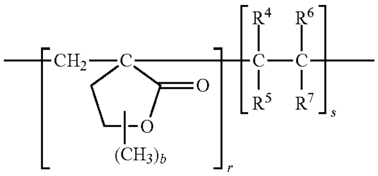

wherein each b=0 or 1;

each X is independently a hydrogen, 1/z of a metal ion of charge z, a protonated nitrogen base, or a tetrasubstituted organic ammonium compound;

the molar ratio of r:s=(0.1-99.9):(0.1:99.9); and $R^4$, $R^5$, $R^6$, and $R^7$ are each independently a hydrogen, $C_{1-4}$ alkyl or F, wherein at least one and no more than two of $R^4$, $R^5$, $R^6$ and $R^7$ are F, F is a functional group that imparts a property to the polymer VI, and F is the same or different in each instance; and optionally contacting the ionic polymer with a crosslinking agent under conditions effective to crosslink the ionic polymer.

34. The method of claim 33, wherein the crosslinking agent is a compound having two or more ethylenic unsaturations, a diol or higher polyol, a diisocyanate or higher isocyanate, a diamine or higher amine, a dicarboxylic acid or higher carboxylic acid, the $C_{1-3}$alkyl esters thereof, or the acid halide thereof, a polyvalent ion, an alcohol-amine, or a combination comprising at least one of the forgoing crosslinking agents.

35. A polymer comprising units of formula VIb

VIb

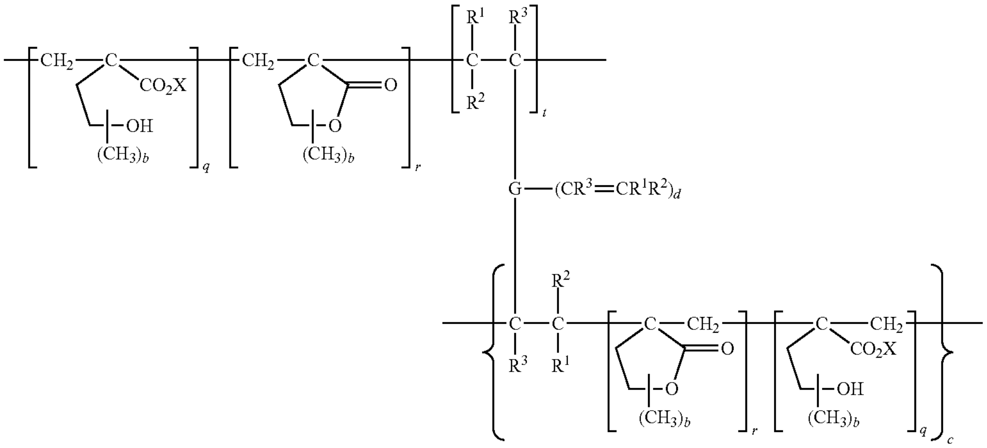

wherein each b=0 or 1;

each X is independently a hydrogen, 1/z of a metal ion of charge z, a protonated nitrogen base, or a tetrasubstituted organic ammonium compound;

the molar ratio of q:r:t=(99.99-0.1):(0-99.89):(0.01-30);

$R^1$, $R^2$, and $R^3$ are each independently a hydrogen or $C_{1-4}$ alkyl;

G is a single bond or a $C_{1-30}$ hydrocarbyl group; and for each instance of t, c=0-5 and d=0-5, provided that c+d=1-5, and wherein q and r as present in c are independent of any other value of q and r.

36. A crosslinked product of the polymer of claim 35, comprising at least one further crosslink in any of the q or r units.

37. The polymer of claim 36, wherein the at least one further crosslink is a residue of a diol or higher polyol, a diisocyanate or higher isocyanate, a diamine or higher amine, a diacid or higher acid or the $C_{1-3}$alkyl esters thereof, a diepoxide or higher epoxide, an alcohol-amine, a polyvalent ion, a compound having at least two sited of ethylenic unsaturation, or a combination comprising at least one of the forgoing crosslinkers.

38. The polymer of claim 36, wherein the at least one further crosslink exists through hydroxyl, lactone, or carboxylic acid groups of unit q.

39. The polymer of claim 36, wherein the crosslink exists through the F group of unit s.

40. A method of preparing the polymer of claim 35, the method comprising contacting a base and a polymer of formula VIIb VIIb

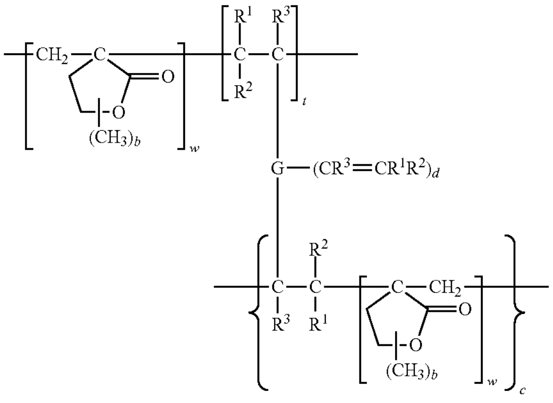

wherein each b=0 or 1;

each X is independently a hydrogen, 1/z of a metal ion of charge z, a protonated nitrogen base, or a tetrasubstituted organic ammonium compound;

the molar ratio of w:t=(99.99-70):(0.01-30);

$R^1$, $R^2$, and $R^3$ are each independently a hydrogen or $C_{1-4}$ alkyl;

G is a single bond or a $C_{1-30}$ hydrocarbyl group; and for each instance of t when t is not zero, c=0-5 and d=0-5, provided that c+d=1-5, and wherein q, r and s as present in c are independent of any other value of q, r and s; and optionally contacting the ionic polymer with a crosslinking agent under conditions effective to crosslink the ionic polymer.

41. The method of claim 33, wherein the crosslinking agent is a diol or higher polyol, a diisocyanate or higher isocyanate, a diamine or higher amine, a dicarboxylic acid or higher carboxylic acid, the $C_{1-3}$alkyl esters thereof, or the acid halide thereof, a polyvalent ion, an alcohol-amine, or a combination comprising at least one of the forgoing crosslinking agents.

* * * * *